United States Patent [19]
Yamamoto

[11] Patent Number: 6,005,862
[45] Date of Patent: Dec. 21, 1999

[54] NODE DEVICE USED IN NETWORK SYSTEM FOR PERFORMING PACKET COMMUNICATIONS, NETWORK SYSTEM USING THE SAME, AND COMMUNICATION METHOD USED IN THE SYSTEM

[75] Inventor: Mitsuru Yamamoto, Yokohama, Japan

[73] Assignee: Canon Kabushiki Kaisha, Tokyo, Japan

[21] Appl. No.: 08/694,245

[22] Filed: Aug. 8, 1996

[30] Foreign Application Priority Data

| Aug. 9, 1995 | [JP] | Japan | 7-224712 |
| Aug. 9, 1995 | [JP] | Japan | 7-224713 |
| Jul. 31, 1996 | [JP] | Japan | 8-217778 |

[51] Int. Cl.[6] .............................. H04L 12/28; H04L 12/56
[52] U.S. Cl. ........................................... 370/392; 370/428
[58] Field of Search .................................. 370/412, 428, 370/429, 452, 460, 401, 403, 404, 405, 406, 407, 408, 389, 392, 424

[56] References Cited

U.S. PATENT DOCUMENTS

| 5,570,360 | 10/1996 | Klausmeier et al. | 370/412 |
| 5,577,035 | 11/1996 | Hayter et al. | 370/412 |
| 5,629,928 | 5/1997 | Calvignac et al. | 370/412 |
| 5,703,875 | 12/1997 | Burnett | 370/412 |

FOREIGN PATENT DOCUMENTS

755138A2  1/1997  European Pat. Off. .

OTHER PUBLICATIONS

B. Mukherjee, "WDM–Based Local lightwave Networks." Jul. 1992, pp. 20–31, IEEE Network.

*Primary Examiner*—Ajit Patel
*Attorney, Agent, or Firm*—Fitzpatrick, Cella, Harper & Scinto

[57] ABSTRACT

A node device that is used in a network system has a packet processing circuit, a buffer for temporarily storing a packet and a selector for selecting a channel to which the buffer is to be connected. The selector can select either a first channel connected to another node device or a second channel connected to the packet processing circuit. The buffer can store a number of packets, and of these packets the one that is addressed to the packet processing circuit is read out when the buffer is connected to the second channel.

98 Claims, 33 Drawing Sheets

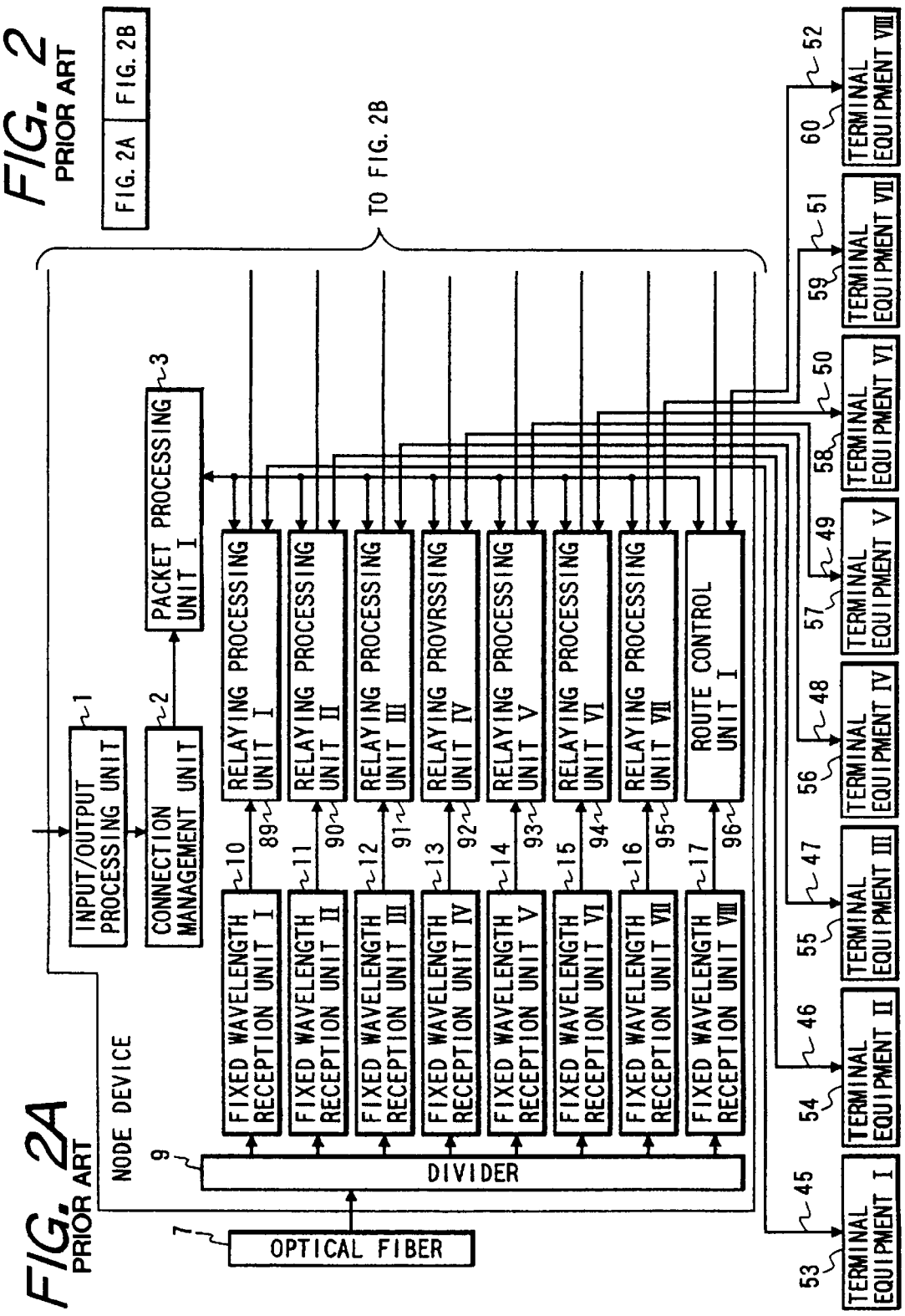

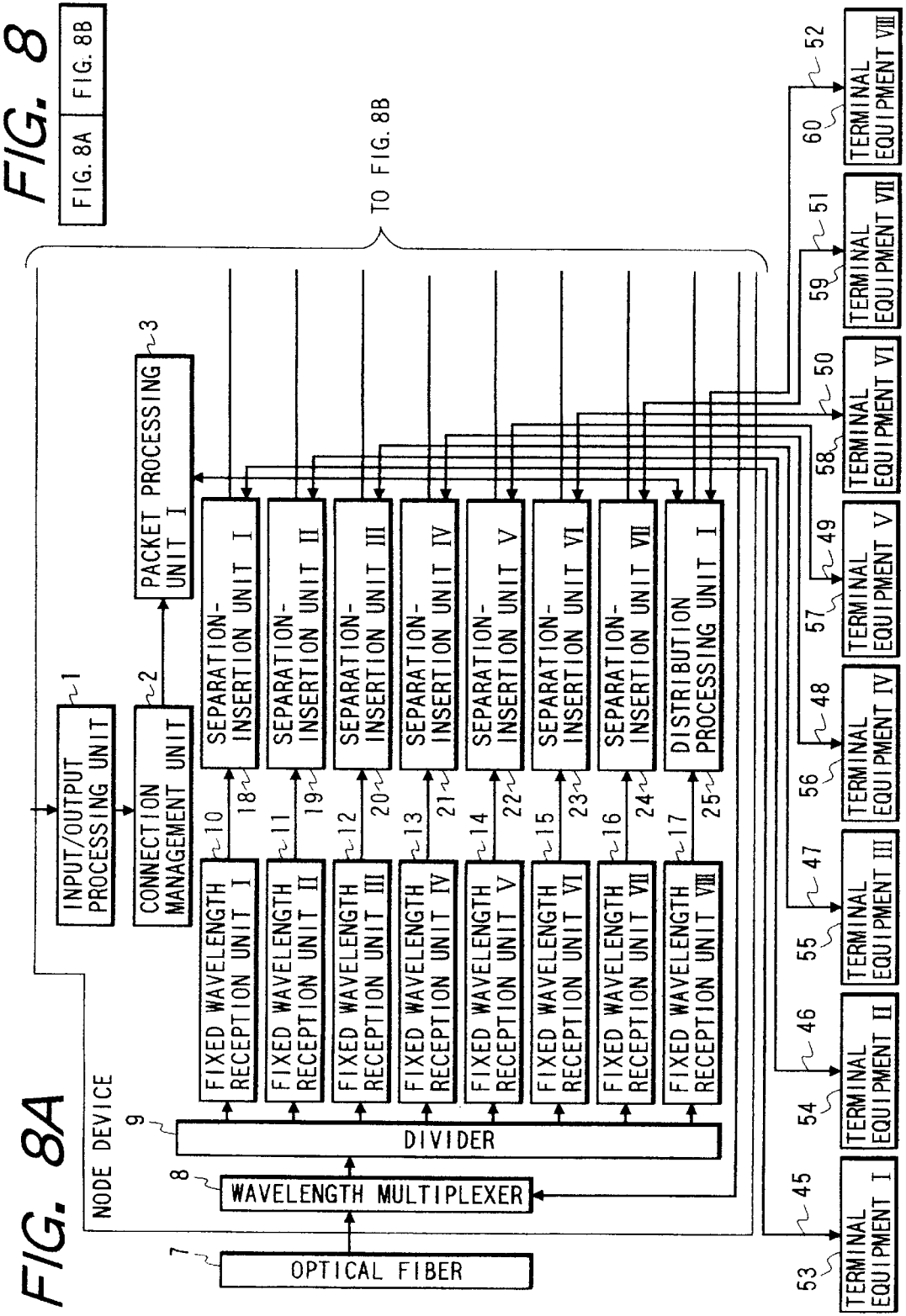

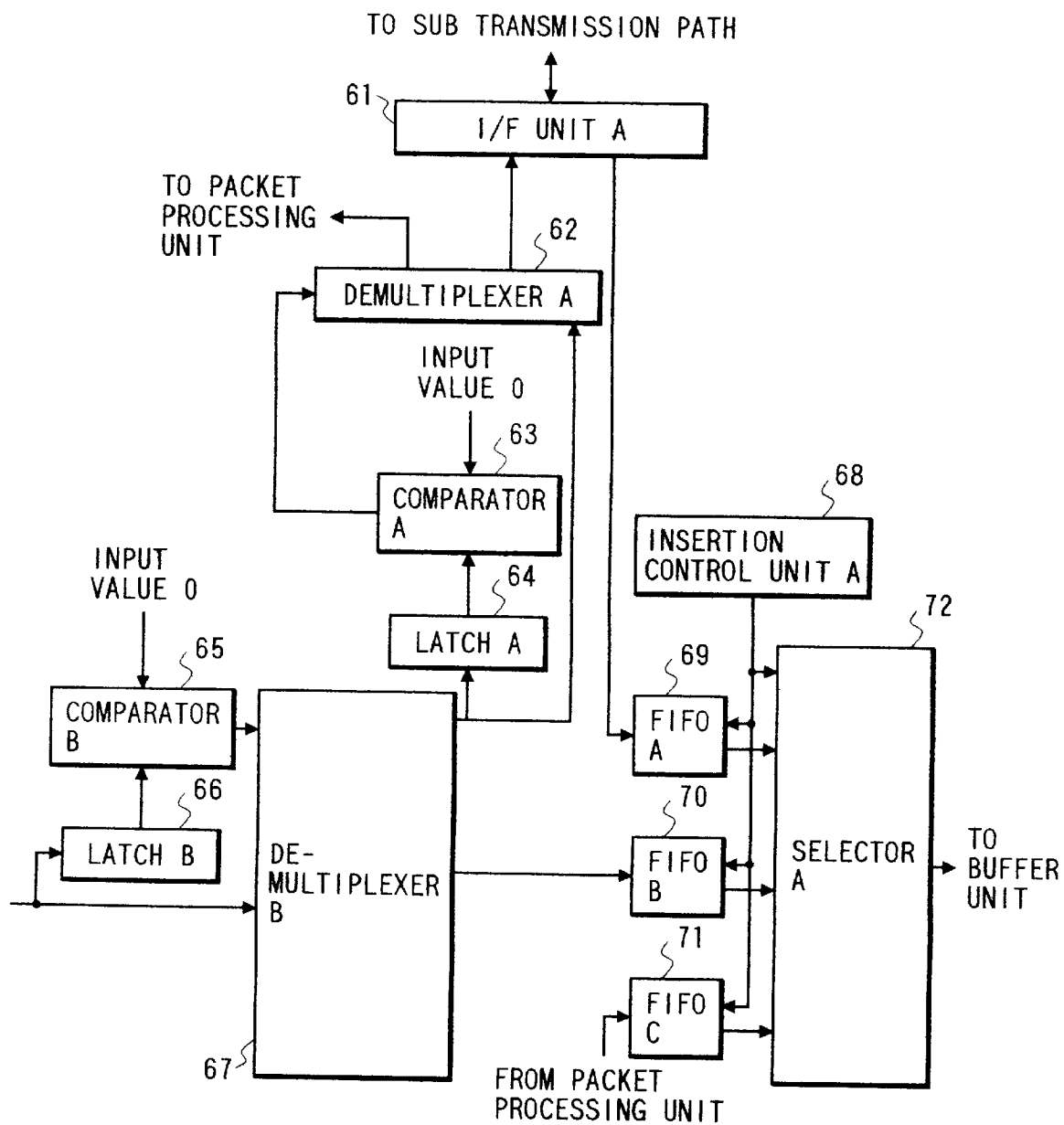

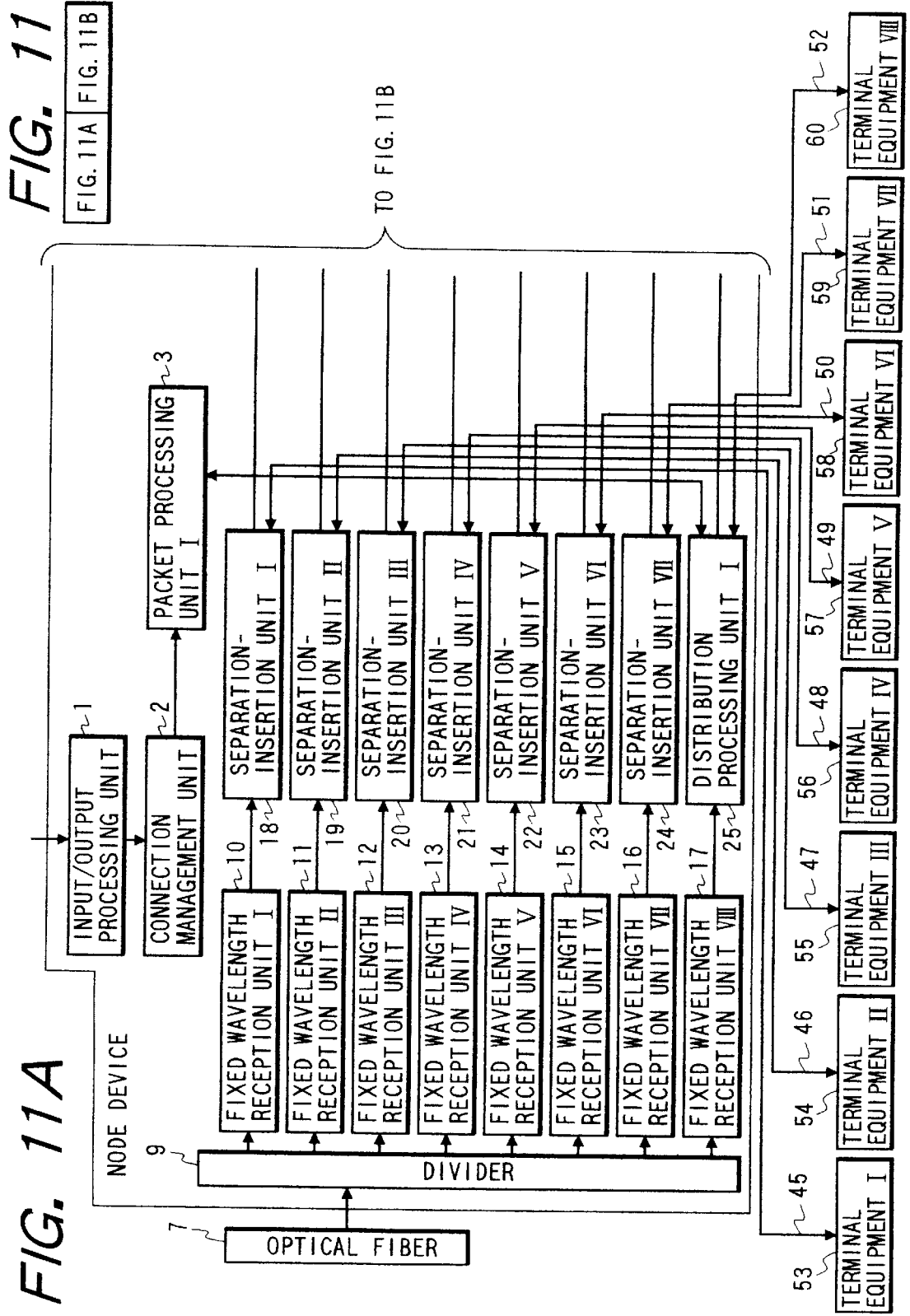

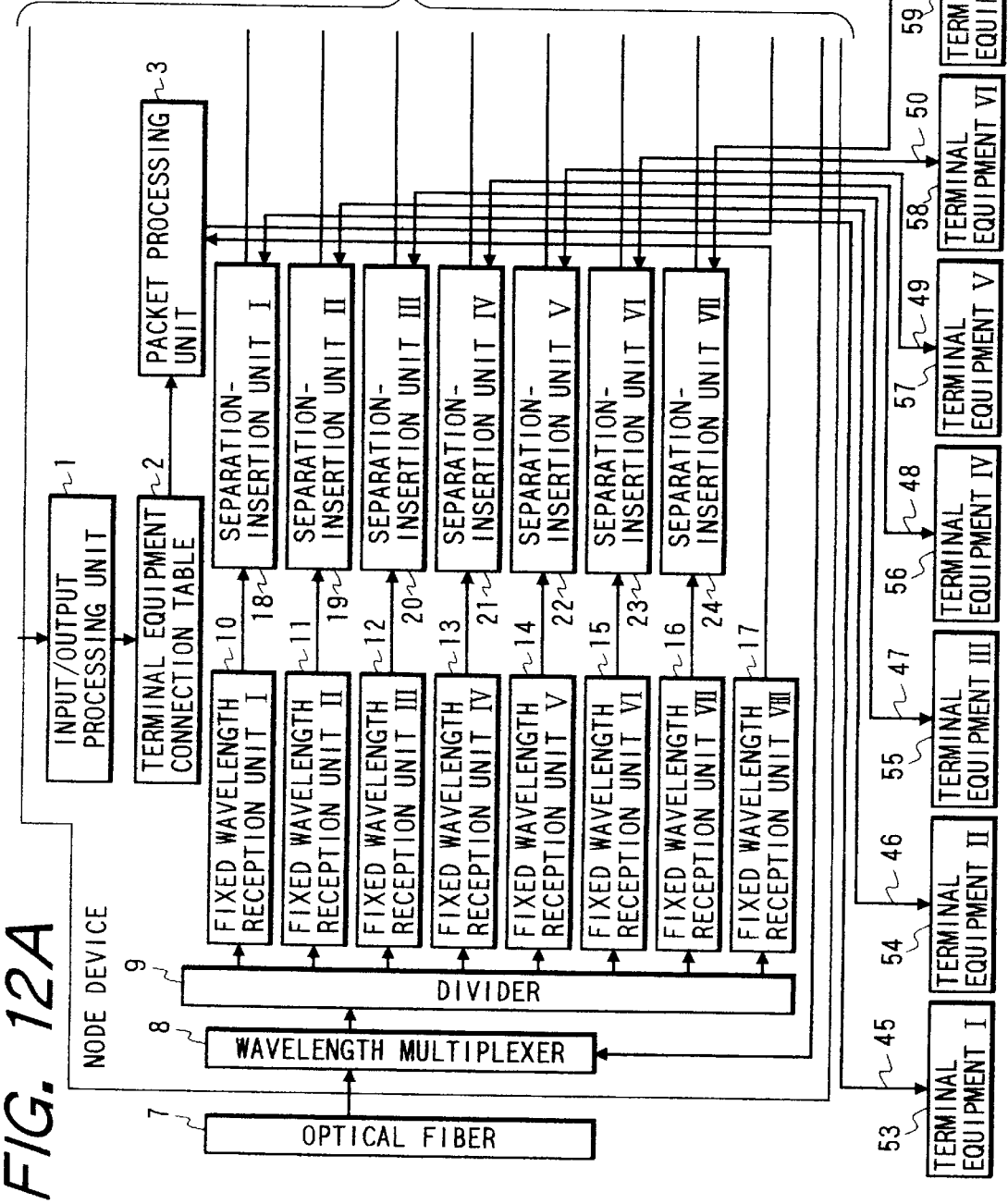

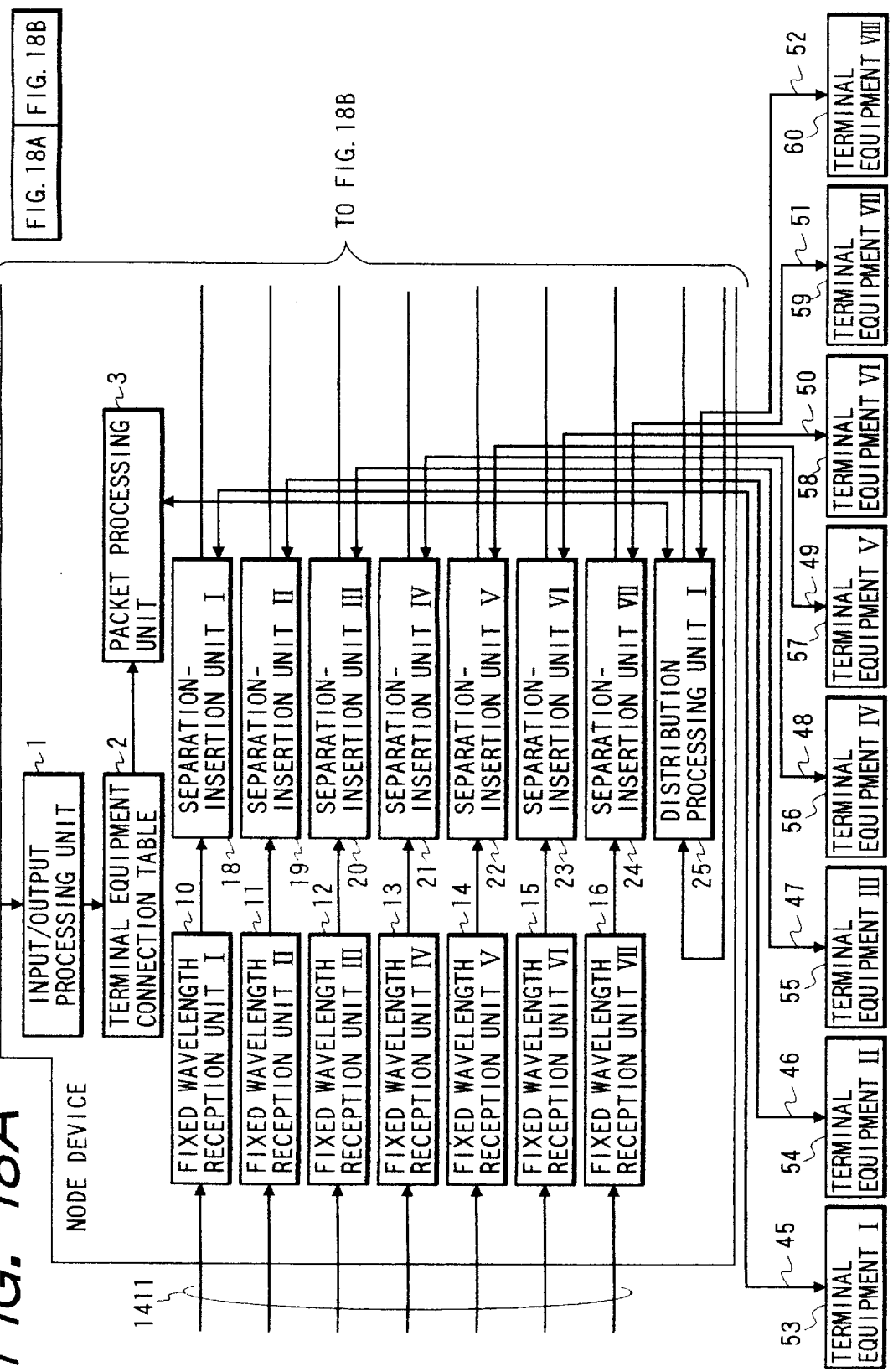

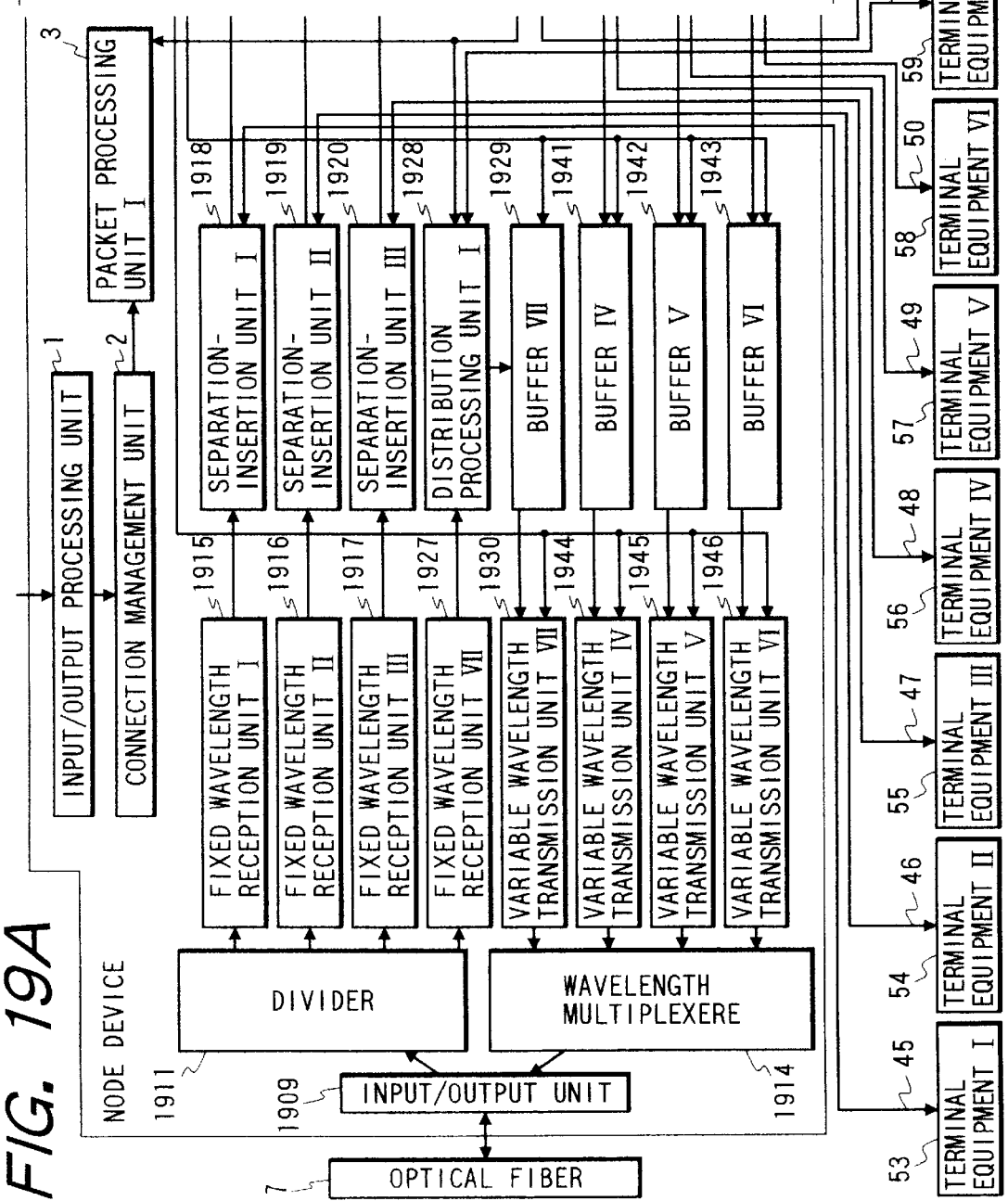

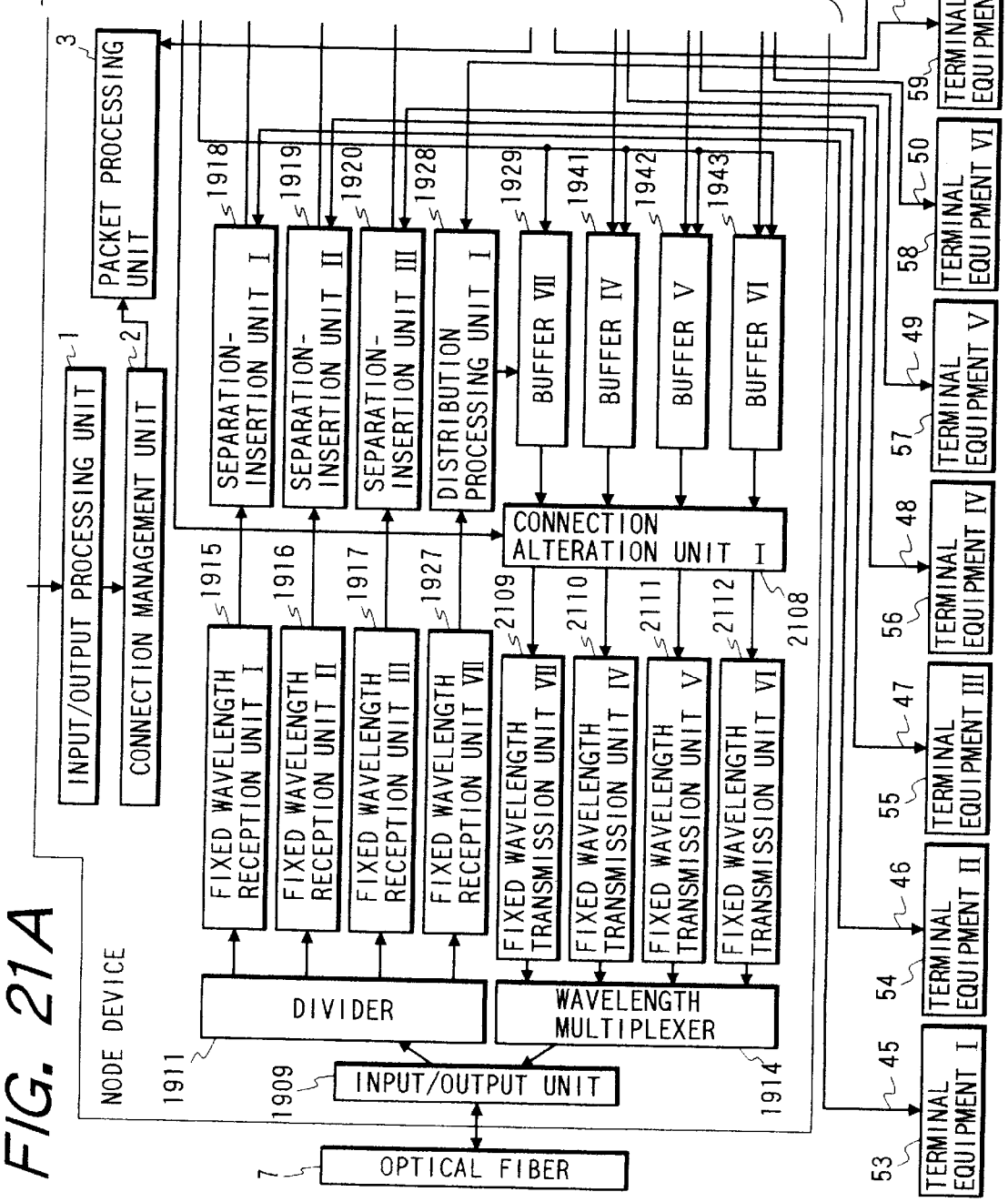

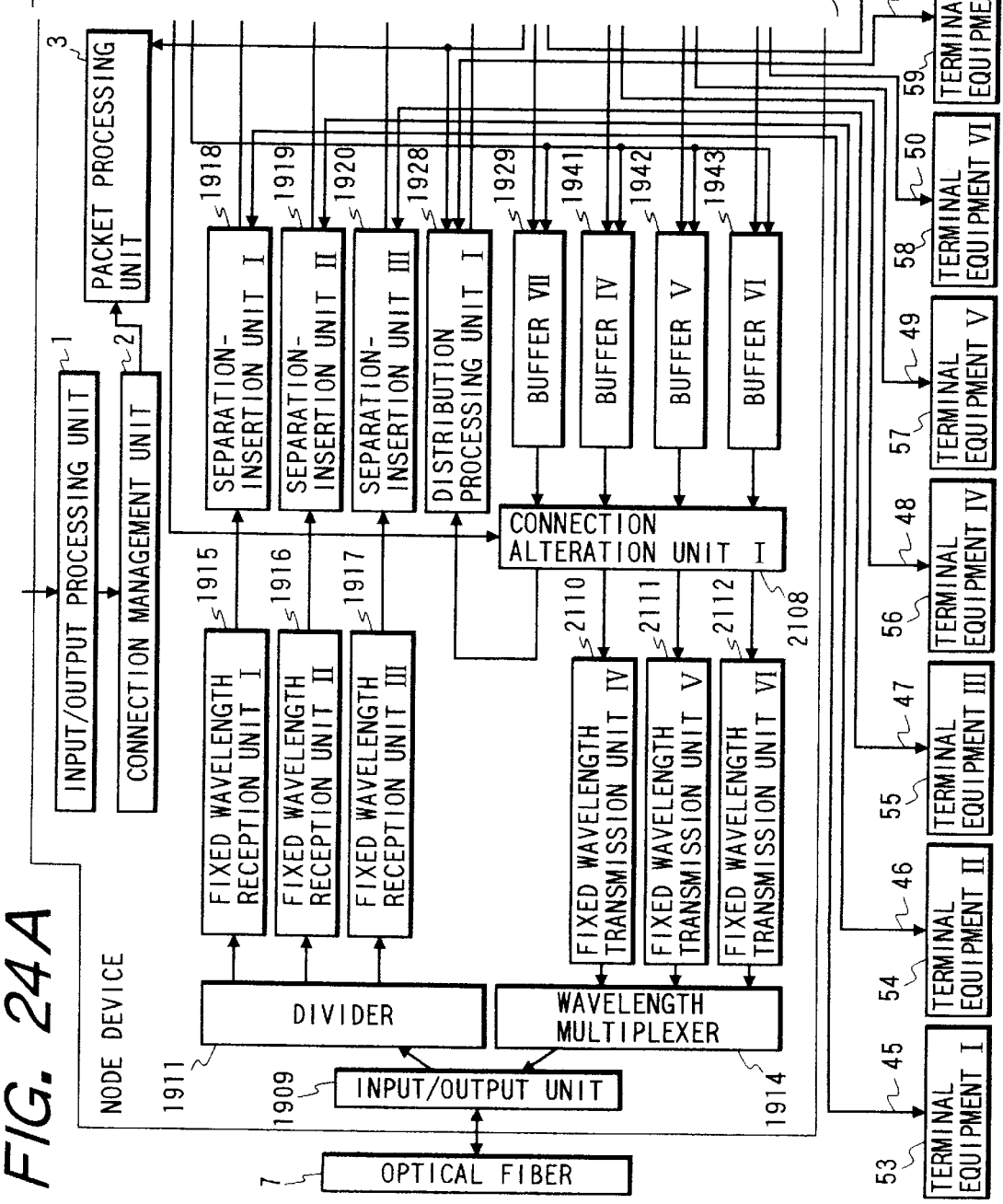

NODE DEVICE USED IN NETWORK SYSTEM FOR PERFORMING PACKET COMMUNICATIONS, NETWORK SYSTEM USING THE SAME, AND COMMUNICATION METHOD USED IN THE SYSTEM

BACKGROUND OF THE INVENTION

1. Field of the Invention

The present invention relates to a network system for performing packet communications and a communication method used in the system and, more particularly, to a network system constituted by a plurality of node devices to each of which at least one terminal equipment is connected, and a plurality of channels for interconnecting the node devices.

2. Related Background Art

In recent years, in order to realize a high-speed network that connects terminal equipments in correspondence with high-speed terminal equipments, various kinds of network systems that use an optical wavelength multiplex transmission path using a plurality of wavelengths have been examined. As one of these network systems, a multihop network system which relays and transmits data to be transmitted by a node device or devices located on the transmission route between the source terminal equipment and the destination terminal equipment is known. This system is explained in Biswanath Mukherjee, "WDM-Based Local Lightwave Networks Part II: Multihop Systems", IEEE Network, July (1992), pp. 20–32.

SUMMARY OF THE INVENTION

In a conventional multihop network system, a node device relays a packet output from, e.g., a terminal equipment to be transmitted to another terminal equipment, but no arrangement for performing a communication between a node device and a terminal equipment or between node devices is known.

The technique described in Japanese Patent Application Nos. 7-189786, 7-195999, 8-186807 and filed as an invention in Japan by the present inventor prior to the present application will be described below.

FIG. 1 shows an example of the arrangement of a multihop type network system constituted by a ring-type wavelength multiplex transmission path and hub type node devices, and exemplifies a case wherein four node devices are connected via optical fibers. Each of node devices 81 to 84 has an arrangement shown in FIGS. 2A and 2B, and eight terminal equipments are connected to each node device via eight sub transmission paths. Optical fibers 85 to 88 constitute the optical wavelength multiplex transmission path.

FIGS. 2A and 2B show an example of the arrangement of the node device used in the above-mentioned example of the multihop system. In this arrangement, a packet transmitted from a source terminal equipment is relayed and transmitted by one or more node devices present on the transmission route before the node device to which a destination terminal equipment is connected (multihop), in accordance with the header information appended to the packet. Referring to FIGS. 2A and 2B, an input/output processing unit 1 has interface function portions such as a keyboard, a display device, and the like, which are used for rewriting the contents of a connection management unit 2, when a new terminal equipment is additionally connected to the network system, when the connection relationship of the terminal equipments is to be altered, and so on. The connection management unit 2 has, in the form of a terminal equipment connection table, as shown in Table 1 below, connection information of terminal equipments connected to the system such as the numbers of relayings required for each terminal equipment to reach node devices to which target terminal equipments are connected, the wavelengths (to be referred to as reception wavelengths) to be received by fixed wavelength reception units which output packets to a route control unit or relaying processing units to which terminal equipments are connected via sub transmission paths, and the like. Table 1 below shows an example of the terminal equipment connection table of the node device I 81 in the example of the multihop system shown in FIG. 1. In each terminal identification number, the ten's place represents the node device to which the terminal equipment of interest is connected, and the unit's place represents the reception wavelength. A section for indication of the number of relayings indicates the number of relayings, including the relaying operation in the own node device, before a destination terminal equipment. Furthermore, the connection management unit 2 manages the communication frequency band between the own node device and a node device which neighbors the own node device at the downstream side in the transmission direction on the basis of a request communication frequency band value Tw declared by each terminal equipment. A packet processing unit I 3 has a function of receiving management packets, which are output from relaying processing units I 89 to VII 95 and a route control unit I 96 and are used for searching the connection management unit 2, searching the connection management unit 2 using the identification number of the destination terminal equipment stored in the data portion of each management packet, reading out values indicating the number of relayings required before the destination terminal equipment and the reception wavelength, i.e., the wavelength of an optical signal used in transmission, assembling a response packet using the readout values as data, and outputting the relaying processing unit or route control unit corresponding to the sub transmission path to which the terminal equipment as the source of the management packet is connected.

TABLE 1

| Terminal Equipment Identification Number | Number of Relayings | Reception Wavelength |
| --- | --- | --- |
| 11 | — | — |
| 12 | 4 | 2 |
| 13 | 4 | 3 |
| 14 | 4 | 4 |
| 15 | 4 | 5 |
| 16 | 4 | 6 |
| 17 | 4 | 7 |
| 18 | 4 | 8 |
| 21 | 1 | 1 |
| 22 | 1 | 2 |
| 23 | 1 | 3 |
| 24 | 1 | 4 |
| 25 | 1 | 5 |
| 26 | 1 | 6 |
| 27 | 1 | 7 |
| 28 | 1 | 8 |
| 31 | 2 | 1 |
| 32 | 2 | 2 |
| 33 | 2 | 3 |
| 34 | 2 | 4 |
| 35 | 2 | 5 |
| 36 | 2 | 6 |
| 37 | 2 | 7 |
| 38 | 2 | 8 |
| 41 | 3 | 1 |

TABLE 1-continued

| Terminal Equipment Identification Number | Number of Relayings | Reception Wavelength |
| --- | --- | --- |
| 42 | 3 | 2 |
| 43 | 3 | 3 |
| 44 | 3 | 4 |
| 45 | 3 | 5 |
| 46 | 3 | 6 |
| 47 | 3 | 7 |
| 48 | 3 | 8 |

A control section 4 controls the reading operations of buffers I 26 to VIII 33 and the transmission wavelengths of variable wavelength transmission units I 34 to VIII 41. A buffer control unit 5 controls to read out from a buffer a packet to be transmitted at the transmission wavelength of a variable wavelength transmission unit set by a wavelength control unit 6. The wavelength control unit 6 controls the transmission wavelengths of the variable wavelength transmission units in accordance with a predetermined transmission wavelength control pattern. An optical fiber 7 constitutes the optical wavelength multiplex transmission path. A divider 9 divides an optical signal transmitted from the optical fiber 7 and outputs the divided optical signal to eight fixed wavelength reception units I 10 to VIII 17. Each of the fixed wavelength reception units I to VIII receives only a packet which is transmitted using an optical signal of a corresponding one of wavelengths $\lambda 1$ to $\lambda 8$.

Each of the relaying processing units I 89 to VII 95 has a function of separating a packet to be transmitted to a corresponding one of terminal equipments I 53 to VII 59 via a corresponding one of sub transmission paths I 45 to VII 51 from a packet flow output from a corresponding one of the fixed wavelength reception units 10 to 16 and outputting the separated packet to the terminal equipment, and of inserting a packet transmitted from the corresponding terminal equipment via the sub transmission path into a packet flow output from the corresponding one of the fixed wavelength reception units 10 to 16, and a function of separating a packet transmitted from the packet processing unit of the corresponding terminal equipment and addressed to the packet processing unit of the node device to the packet processing unit I 3, and outputting a packet transmitted from the packet processing unit I 3 and addressed to the corresponding terminal equipment to the terminal equipment via the sub transmission path.

The route control unit I 96 has a function of separating a packet to be transmitted to a terminal equipment VIII 60 via a sub transmission path VIII 52 from a packet flow output from the fixed wavelength reception unit VIII 17 and outputting the separated packet to the terminal equipment, and of inserting a packet transmitted from the terminal equipment via the sub transmission path into a packet flow output from the fixed wavelength reception unit 17, a function of separating packets transmitted from the packet processing units of the terminal equipment VIII 60 and the neighboring node device to the packet processing unit I 3 of the own node device, and outputting a packet transmitted from the packet processing unit I 3 and addressed to the terminal equipment VIII 60 to the terminal equipment VIII 60 via the sub transmission path VIII 52, and a function of inserting a packet transmitted from the packet processing unit I 3 of the own node device and addressed to the packet processing unit I 3 of the neighboring node device into a packet flow output from the fixed wavelength reception unit 17.

The buffers I 26 to VIII 33 have a function of temporarily storing packets output from the relaying processing units I 89 to VII 95 and the route control unit I 96. The variable wavelength transmission units I 34 to VIII 41 respectively convert packets output from the buffers 26 to 33 into optical signals having predetermined ones of the wavelengths $\lambda 1$ to $\lambda 8$ under the control of the control section 4, and output the converted signals onto an optical fiber 44 via a wavelength multiplexer 42. The wavelength multiplexer 42 multiplexes optical signals of wavelengths $\lambda 1$ to $\lambda 8$ output from the eight variable wavelength transmission units 34 to 41, and outputs the multiplexed signal onto the optical fiber 44. The sub transmission paths I 45 to VIII 52 serve as packet transmission paths between the relaying processing units 89 to 95 and the route control unit 96, and the terminal equipments. The terminal equipments I 53 to VIII 60 are connected to the node device via the sub transmission paths I 45 to VIII 52, receive packets output from the relaying processing units 89 to 95 and the route control unit 96, assemble packets to be transmitted to other terminal equipments, and transmit the packets to the relaying processing units 89 to 95 and the route control unit 96 via the sub transmission paths 45 to 52.

FIG. 3 shows an example of the format of a packet used in the above-mentioned example of the multihop system and in the present invention. Referring to FIG. 3, a section 97 for indication of the number of relayings indicates the number of relayings required for transmitting a packet from the source node device to the destination node device. Each of the relaying node devices 81 to 84 decrements the value in the section 97 for indication of the number of relayings, and compares it with "1" to detect if the node device, which neighbors the own node device at the downstream side in the transmission direction, is the destination node device. Furthermore, depending on whether or not the value in the section 97 is "0", the node device can detect if the own node device is the destination. A section 98 for designation of the wavelength in use designates the wavelength to be used in the relaying transmission operation. The value to be used in the section 98 for designation of the wavelength in use in a header portion uses values shown in Table 2 below. A section 99 for identification of the kind of packet indicates the kind of packet, i.e., a management packet such as an inquiry packet, a notification packet, or the like addressed to the packet processing unit I 3 in the node device, or a data packet or a response packet addressed to a terminal equipment. A management packet is assigned "0", and a data or response packet is assigned "1". A data portion 100 is carried by this packet.

TABLE 2

| Wavelength Used by Relaying Node Device | Value in Section for Designation of Wavelength in Use |
| --- | --- |
| $\lambda 1$ | 1 |
| $\lambda 2$ | 2 |
| $\lambda 3$ | 3 |
| $\lambda 4$ | 4 |
| $\lambda 5$ | 5 |
| $\lambda 6$ | 6 |
| $\lambda 7$ | 7 |
| $\lambda 8$ | 8 |

FIG. 4 shows an example of the arrangement of the route control unit I 96 as a route control means suitably used in this system example. Referring to FIG. 4, an I/F unit I 101 outputs a packet output from a selector I 105 onto a sub transmission path, and outputs packets input from the sub transmission paths 45 to 52 to a latch I 102 and a demultiplexer I 104. The latch 102 I stores the value in the section 99 for identification of the kind of packet in a packet output from the I/F unit I 101, and outputs the stored value to a comparator I 103. The comparator I 103 detects by comparison if the value in the section 99 for identification of the kind of packet in the packet output from the latch I 102 is "0" indicating a management packet. If the value is "0", the comparator 103 outputs a separation instruction to the demultiplexer I 104; otherwise, it outputs an insertion instruction thereto. When the comparator I 103 outputs a separation instruction as a result of comparison of an input packet, the demultiplexer I 104 outputs the input packet to the packet processing unit I 3; when the comparator I 103 outputs an insertion instruction, it outputs the input packet to a FIFO (First In First Out) I 113. The selector I 105 inserts a packet output from the packet processing unit I 3 into a packet flow output from a demultiplexer II 106 by setting the input source of a packet to be output to the I/F unit I 101 in a packet output from the packet processing unit I 3 at an end of the packet flow output from the demultiplexer II 106, and outputs the packet to the I/F unit I 101.

When a comparator II 107 outputs a separation instruction as a result of comparison of an input packet, the demultiplexer II 106 outputs the input packet to the packet processing unit I 3; when the comparator II 107 outputs a transmission instruction, it outputs the input packet to the selector I 105. The comparator II 107 detects by comparison if the value in the section 99 for identification of the kind of packet in the packet output from a latch II 108 is "1". If the value is "1", the comparator 107 outputs a separation instruction to the demultiplexer II 106; otherwise, it outputs a transmission instruction thereto. The latch II 108 stores the value in the section 99 for identification of the kind of packet in the packet output from a demultiplexer III 111, and outputs the stored value to the comparator II 107. A comparator III 109 detects by comparison if the value in the section 97 for indication of the number of relayings in a packet output from a latch III 110 is "0". If the value is "0", the comparator 109 outputs a separation instruction to the demultiplexer III 111; otherwise, it outputs a relaying instruction thereto. The latch III 110 stores the value in the section 97 for indication of the number of relayings in a packet output from the fixed wavelength reception unit 17, and outputs the stored value to the comparator III 109. When the comparator III 109 outputs a separation instruction as a result of comparison of an input packet, the demultiplexer III 111 outputs the input packet to the demultiplexer II 106 and the latch II 108; when the comparator III 109 outputs a relaying instruction, it outputs the input packet to a FIFO II 114. An insertion control unit I 112 controls the reading operations of the FIFOs I 113 and II 114, and a FIFO III 115, and also performs control for inserting packets transmitted from the sub transmission paths I 45 to VII 51 and a packet transmitted from the packet processing unit I 3 into a packet flow output from the fixed wavelength reception unit 17 by instructing a selector II 116 of a FIFO to be selected. The FIFOs 113, 114, and 115 temporarily store input packets, and output them to the selector II 116 in the input order under the control of the insertion control unit I 112. The selector II 116 selects a FIFO that stores a packet signal to be output in accordance with an instruction from the insertion control unit I 112, and outputs the packet output from the selected FIFO to the buffer 33.

FIG. 5 shows the internal arrangement of each of the relaying processing units 89 to 95 used in the system example. Referring to FIG. 5, an I/F unit II 117 outputs a packet output from a selector III 121 onto a corresponding sub transmission path, and outputs a packet input from the sub transmission path to a latch IV 118 and a demultiplexer IV 120. The latch IV 118 stores the value in the section 99 for identification of the kind of packet in a packet output from the I/F unit II 117, and outputs the stored value to a comparator IV 119. The comparator IV 119 detects by comparison if the value in the section 99 for identification of the kind of packet in the packet output from the latch IV 118 is "0". If the value is "0", i.e., if the input packet is a one addressed to the packet processing unit of the own node device, the comparator 119 outputs a separation instruction to the demultiplexer IV 120; otherwise, it outputs an insertion instruction thereto. When the comparator IV 119 outputs a separation instruction as a result of comparison of an input packet, the demultiplexer IV 120 outputs the input packet to the packet processing unit I 3; when the comparator IV 119 outputs an insertion instruction, it outputs the input packet to a FIFO IV 126. The selector III 121 inserts a packet output from the packet processing unit I 3 into a packet flow output from a demultiplexer V 124 by setting the input source of a packet to be output to the I/F unit II 117 in the packet output from the packet processing unit I 3 at an end of the packet flow output from the demultiplexer V 124, and outputs the packet to the I/F unit II 117. A comparator V 122 detects by comparison if the value in the section 97 for indication of the number of relayings in a packet output from a latch V 123 is "0". If the value is "0", the comparator 122 outputs a separation instruction to the demultiplexer V 124; otherwise, it outputs a relaying instruction thereto. The latch V 123 stores the value in the section 97 for indication of the number of relayings in a packet output from the fixed wavelength reception unit, and outputs the stored value to the comparator V 122.

When the comparator V 122 outputs a separation instruction as a result of comparison of an input packet, the demultiplexer V 124 outputs the input packet to the selector III 121; when the comparator V 122 outputs a relaying instruction, it outputs the input packet to a FIFO V 127. An insertion control unit II 125 controls the reading operations of the FIFOs IV 126 and V 127, and also performs control for inserting a packet transmitted from the sub transmission patch into a packet flow output from the fixed wavelength reception unit by instructing a selector IV 128 of the FIFO to be selected. The FIFOs 126 and 127 temporarily store input packets, and output them to the selector IV 128 in the input order under the control of the insertion control unit II 125. The selector IV 128 selects the FIFO that stores a packet signal to be output in accordance with an instruction from the insertion control unit II 125, and outputs a packet output from the selected FIFO to the buffer.

FIG. 6 shows an example of the arrangement of each of the terminal equipments 53 to 60. Referring to FIG. 6, an I/F unit III 129 outputs a packet output from a packet processing unit II 130 onto a corresponding sub transmission path, and outputs a packet input from the corresponding one of the sub transmission paths 45 to 52 to the packet processing unit II 130. The packet processing unit II 130 inquires the connection management unit 2 in the node device as to the values in the section 97 for indication of the number of relayings and the section 98 for designation of the wavelength in use corresponding to the destination prior to data transmission, and assembles a packet by writing these values in predetermined sections in the header portion of a packet and adding the header portion to data to be transmitted output from a data processing unit (not shown). In addition, the packet processing unit 130 performs predetermined reception processing by removing the header portion of a received packet input via the I/F unit III 129, and outputs the packet to the data processing unit (not shown).

FIG. 7 shows the internal arrangement of each of the buffers I 26 to VIII 33 used in the above-mentioned example of the multihop system. All the buffers I 26 to VIII 33 have the same internal arrangement. Referring to FIG. 7, a demultiplexer VI 131 outputs the value in the section 98 for designation of the wavelength in use in the header portion of a packet output from a corresponding one of the relaying processing units 89 to 95 or the route control unit 96 to a decoder 132, the value in the section 97 for indication of the number of relayings to a latch VI 133, and the data portion 100 to a shift register 135, respectively. The decoder 132 decodes the header portion of a packet to obtain the writing start address corresponding to a memory area used for transmitting a packet at a predetermined wavelength, and outputs the value of the obtained address to a writing address counter 137. The latch VI 133 stores the value in the section 97 for indication of the number of relayings in the header portion of a packet, and outputs the stored value to a subtraction processing unit 134. The subtraction processing unit 134 decrements the value in the section 97 for indication of the number of relayings in the header portion of the packet output from the latch VI 133, and outputs the decremented value to a selector V 136. The shift register 135 gives a desired delay to the data portion 100 of the packet output from the demultiplexer VI 131, and outputs the delayed data portion to the selector V 136. The selector V 136 re-assembles a packet with the decremented value in the section 97 for indication of the number of relayings by sequentially selecting the value in the section 98 for designation of the wavelength in use of the header portion of the packet output from the decoder 132, the value, decremented by the subtraction processing unit 134, in the section 97 for indication of the number of relayings, and the delayed data portion 100 of the packet output from the shift register 135, and outputs the packet to a dual port memory 139. The writing address counter 137 generates the writing address of the dual port memory 139 at which a packet is to be written in accordance with the value in the section 98 for designation of the wavelength in use in the header portion of the packet output from the decoder 132, and sequentially outputs writing address signals of the packet to the dual port memory 139. A reading address counter 138 sequentially outputs reading address signals of a packet to the dual port memory 139 using an offset value output from the buffer control unit 5 in the control section 4 as the reading start address. The dual port memory 139 independently performs the writing and reading operations of packet data. The memory area of the dual port memory 139 is divided into eight areas I to VIII in correspondence with the transmission wavelengths of a packet. The memory areas I to VIII respectively correspond to the transmission wavelengths λ1 to λ8. The start addresses of these areas are respectively A1, A2, A3, A4, A5, A6, A7, and A8.

In the above-mentioned example of the multihop system, when each of the terminal equipments 53 to 60 transmits a packet such as an inquiry packet to the packet processing unit I 3 in the own node device, the packet processing unit II 130 of the terminal equipment assembles a packet by writing "0" in the section 99 for identification of the kind of packet in a header portion and adding the header portion to data to be transmitted, and transmits the packet to the route control unit 96 or a corresponding one of the relaying processing units 89 to 95 via a corresponding one of the sub transmission paths 45 to 52. In the route control unit 96, the packet is output to the demultiplexer I 104 and the latch I 102 via the I/F unit I 101, and the value in the section 99 for identification of the kind of packet in the header portion is compared with "0" indicating an inquiry packet by the comparator I 103. In this case, since the two values match each other, the comparator 103 outputs a separation instruction to the demultiplexer I 104, and the packet is output from the demultiplexer I 104 to the packet processing unit I 3. In one of the relaying processing units 89 to 95, the packet is output to the demultiplexer IV 120 and the latch IV 118 via the I/F unit II 117, and the value in the section 99 for identification of the kind of packet in the header portion is compared with "0" indicating an inquiry packet by the comparator IV 119. In this case, since the two values match each other, the comparator 119 outputs a separation instruction to the demultiplexer IV 120, and the packet is output from the demultiplexer IV 120 to the packet processing unit I 3. The packet processing unit I 3 receives this inquiry packet, and executes desired processing.

When a packet is to be sent from the packet processing unit I 3 in the node device to a terminal equipment connected to it, the packet processing unit I 3 switches the input source of the selector I 105 in the route control unit 96 to the output from the packet processing unit I 3, and outputs a packet to the I/F unit I 101 via the selector I 105. The packet output to the I/F unit I 101 is transmitted to the terminal equipment 60 via the sub transmission path 52. On the other hand, in one of the relaying processing units 89 to 95, the packet processing unit I 3 switches the input source of the selector III 121 to the output from the packet processing unit I 3, and outputs a packet to the I/F unit II 117 via the selector III 121. The packet output to the I/F unit II 117 is transmitted to a corresponding one of the terminals 53 to 59 via a corresponding one of the sub transmission paths 45 to 51.

When one of the terminals 53 to 60 transmits data to another terminal equipment of another node device, the terminal equipment inquires using an inquiry packet as to the values of the section 97 for indication of the number of relayings and the section 98 for designation of the wavelength in use corresponding to the destination terminal equipment, and assembles a packet by writing the inquiry result in predetermined sections in a header, and adding the header to data to be transmitted. The terminal equipment then transmits the packet to the route control unit 96 or a corresponding one of the relaying processing units 89 to 95, via a corresponding one of the sub transmission paths 45 to 52. The packet output from the source terminal equipment is inserted into a packet flow output from a corresponding one of the fixed wavelength reception units 10 to 17 in the route control unit or the corresponding relaying processing unit in the node device. In a corresponding one of the buffers 26 to 33, the value in the section 97 for indication of the number of relayings in the packet is decremented, and the packet is temporarily stored in the memory area corresponding to the wavelength designated in the section 98 for designation of the wavelength in use. Thereafter, the packet is transmitted as an optical signal of a predetermined wavelength from one of the variable wavelength transmission units 34 to 41, and is received by the fixed wavelength reception unit, corresponding to the transmission wavelength, in the neighboring node device at the downstream side. In the route control unit 96 or one of the relaying processing units 89 to 95, it is detected if the value in the section 97 for indication of the number of relayings is "0". If the value is not "0", the packet is output to one of the buffers 26 to 33, and the value in the section 97 for indication of the number of relayings is decremented again. Thereafter, the packet is transmitted to the neighboring node device at the downstream side. When this relaying operation is repeated, and the value in the section 97 for indication of the number of relayings becomes "0", the packet is separated and transmitted onto a corresponding one of the sub transmission paths 45 to 52 in the route control unit 96 or one of the relaying processing units 89 to 95 in the node device, and is received by the packet processing unit II 130 in the destination terminal equipment.

In this relaying operation, the packet is converted into an optical signal of a wavelength, which is received by the fixed wavelength reception unit that outputs a packet to the route control unit 96 or one of the relaying processing units 89 to 95, to which the destination terminal equipment is connected via the sub transmission path, on the basis of the value in the section 98 for designation of the wavelength in use, and the converted optical signal is transmitted.

Furthermore, when a communication packet for transmitting management information such as connection management information is to be transmitted from a packet processing unit I 3 in a node device to that in another node device, the packet processing unit I 3 in the source node device writes a communication packet in the FIFO III 115 in the route control unit 96. The communication packet is inserted into a packet flow output from the fixed wavelength reception unit 17. Thereafter, the packet is relayed to the destination node device, as described above, and is separated by the route control unit 96. The separated packet is then output to the packet processing unit I 3.

The present invention realizes communications between a terminal equipment and a node device or between node devices using an arrangement different from that described above.

The first network system of the present invention has the following arrangement.

A network system which is constituted by a plurality of node devices and a transmission path for connecting the node devices, and performs a communication using a packet, comprising:

a transmission path for connecting the node devices; and
a node device including:
packet processing means for processing a packet;
a buffer for temporarily storing the packet;
selection means for selecting a channel, to which the buffer is connected, from a plurality of different channels; and
buffer control means for controlling the buffer to read out a packet to be output using the selected channel from the buffer in synchronism with the channel to which the buffer is connected,
is characterized in that the plurality of channels include a first channel connected to another node device via the transmission path, and a second channel connected to the packet processing means in the own node device, and a packet to be output to the packet processing means in the own node device of packets stored in the buffer is read out from said buffer when the buffer is connected to the second channel.

With this arrangement, a communication can be made between a terminal equipment and a packet processing unit in a node device.

In this system, the second channel may be connected to the packet processing means in the own node device, or the second channel may be input to another node device via the transmission path, may be looped back by the other node device, may be input to the own node device, and may be connected to the packet processing means.

If the selection means sequentially changes the channel to be selected, the reading operation from the buffer is controlled in synchronism with alteration in channel, so that the selection means need not be controlled in accordance with a discrimination result of the destination of a packet.

When the node device comprises a plurality of buffers equivalent to the buffer, the selection means selects the channels to which the plurality of buffers are connected so that the plurality of buffers are simultaneously connected to different channels.

The selection means may comprise a plurality of variable channel transmission means arranged in correspondence with the plurality of buffers. In this arrangement, the node device may comprise means for multiplexing outputs from the plurality of variable channel transmission means and extracting the second channel from the multiplexed output. Alternatively, the selection may comprise connection alteration means which has input terminals respectively corresponding to the plurality of buffers and output terminals respectively corresponding to the plurality of channels, and can change a connection relationship between the input and output terminals. When the variable channel transmission means are used, the need for a switching device can be obviated. When the connection alteration means is used, the channel to be output has already been separated when it is output from the connection alteration means.

The packet to be stored in the buffer includes a packet transmitted from a sub transmission path connected to the own node device, a packet transmitted from another node device, or a packet transmitted from the packet processing means.

The node device may comprise insertion means for selecting one of a packet transmitted from a sub transmission path connected to the own node device and a packet transmitted from another node device, and inputting the selected packet to the buffer. This separation means corresponds to a separation-insertion unit in the embodiment to be described later. Also, the node device may comprise insertion means for selecting one of a packet transmitted from a sub transmission path connected to the own node device, a packet transmitted from another node device, and a packet transmitted from the packet processing means, and inputting the selected packet to the buffer. This separation means corresponds to a distribution processing unit in the embodiment to be described later.

The node device may comprise separation means for separating to the sub transmission path side a packet to be output onto a sub transmission path connected to the own node device from packets input from another node device. In the embodiment to be described later, the above-mentioned separation-insertion unit also serves as this separation means. The node device may comprise separation means for separating to the sub transmission path side a packet to be output onto a sub transmission path connected to the own node device from packets transmitted using the second channel. In the embodiment to be described later, the above-mentioned distribution processing unit also serves as this separation means.

The network system of the present invention may transmit packets bidirectionally, and adopts the following arrangement at that time.

The transmission path transmits a packet in a first direction, and a second direction opposite to the first direction, and the node device comprises at least two buffers equivalent to the buffer, one of the buffers is a first buffer with which the first channel connected is connected to another node device at a downstream side in the first direction, and the other buffer is a second buffer with which the first channel connected is connected to another node device at a downstream side in the second direction, and further comprises, as the selection means, first selection means corresponding to the first buffer and second selection means corresponding to the second buffer.

In this arrangement, the second channel can also be used for outputting a packet which is not output to the packet processing unit, and the transmission direction of which is to be changed. At this time, the following arrangement is used.

The node device further comprises third and fourth buffers, the third buffer temporarily stores a packet to be output to another node device of packets output from the first buffer using the second channel, a channel to which the third buffer is connected is selected by the second selection means, the second selection means selects channels to which the second and third buffers are connected, so that the second and third buffers are simultaneously connected to different channels, the fourth buffer temporarily stores a packet to be output to another node device of packets output from the second buffer using the second channel, a channel to which the fourth buffer is connected is selected by the first selection means, and the first selection means selects channels to which the first and fourth buffers are connected, so that the first and fourth buffers are simultaneously connected to different channels.

In the above-mentioned arrangement, the node device may comprise a plurality of first buffers equivalent to the first buffer, and a plurality of second buffers equivalent to the second buffer. At this time, the first selection means selects channels to which the plurality of first buffers are connected so that the plurality of first buffers are simultaneously connected to different channels, and the second selection means selects channels to which the plurality of second buffers are connected so that the plurality of second buffers are simultaneously connected to different channels.

The packet to be processed by the packet processing means includes a management packet for communication management.

The network system of the present invention is preferably connected in a ring pattern.

Furthermore, the network system of the present invention may adopt not only the arrangement for guiding the second channel to the packet processing unit of the own node device but also an arrangement for connecting the second channel to the packet processing unit of another node device. At this time, the system is arranged as follows.

network system which is constituted by a plurality of node devices and a transmission path for connecting the node devices, and performs a communication using a packet, comprising:

a transmission path for connecting the node devices;
a first node device including:
  a buffer for temporarily storing the packet;
  selection means for selecting a channel to which the buffer is connected from a plurality of different channels; and
  buffer control means for controlling the buffer to read out a packet to be output using the selected channel from the buffer in synchronism with the channel to which the buffer is connected; and
a second node device including
packet processing unit for processing a packet;
is characterized in that the plurality of channels include a first channel connected to the second node device via the transmission path and connected to a sub transmission path connected to the second node device or another node device via the second node device, and a second channel connected to the second node device via the transmission path and connected to the packet processing means in the second node device, and a packet to be output to the packet processing means in the second node device of packets stored in the buffer is read out from said buffer when the buffer is connected to the second channel.

This arrangement can also be applied to the bidirectional network system.

A communication method of the present invention has the following arrangement.

A communication method in a network system which is constituted by a plurality of node devices and a transmission path for connecting the node devices, and performs a communication using a packet, comprising:

a transmission path for connecting the node devices; and
a node device including:
  packet processing means for processing a packet;
  a buffer for temporarily storing the packet;
  selection means for selecting a channel to which the buffer is connected from a plurality of different channels; and
  buffer control means for controlling the buffer to read out a packet to be output using the selected channel from the buffer in synchronism with the channel to which the buffer is connected, is characterized by comprising the steps of:
selecting a second channel by the selection means, the plurality of channels including a first channel connected to another node device via the transmission path, and the second channel connected to the packet processing means in the own node device; and
controlling the buffer by the buffer control means to read out a packet to be output to the packet processing means in the own node device and stored in the buffer while the selection means selects the second channel.

A packet normally has address information. In the present invention, in particular, the packet has, as the address information, relaying number information indicating the number of relayings in the selection means in one or a plurality of node devices until it reaches a destination, and a channel to which the buffer is connected while the packet is read out is determined with reference to the relaying number information.

The packet may have channel designation information indicating a channel to which a destination of the packet is connected, and a channel to which the buffer is connected while the packet is read out may be determined with reference to the channel designation information.

The packet may have packet kind information indicating whether or not a destination is the packet processing unit.

When the packet has the relaying number information, the node device may process the relaying number information of a packet to be output so that the number of times the packet is relayed via the selection means can be discriminated later based on the relaying number information, thus allowing easy discrimination of the relaying number information.

When the packet has the relaying number information, the packet may have channel designation information indicating a channel to which a destination of the packet is connected, and a packet in which the relaying number information indicates that the packet is to be relayed via the selection means once more may be read out from the buffer while the buffer is connected to a channel indicated by the channel designation information of the packet, thus allowing easy discrimination of an output channel of the buffer.

When the packet has the relaying number information, a packet in which the relaying number information indicates that the packet is to be relayed via the selection means at least twice more may be read out from the buffer while the buffer is connected to a channel other than the second channel, thus allowing easy discrimination of an output channel of the buffer.

When the packet has the relaying number information, the packet may have packet kind information indicating whether or not a destination of the packet is the packet processing unit, and a packet in which the relaying number information indicates that the packet is to be relayed via the selection means once more, and the packet kind information indicates that the destination of the packet is the packet processing unit, may be read out from the buffer while the buffer is connected to the second channel, thus allowing easy discrimination of an output channel of the buffer.

The communication method of the present invention may also adopt the following arrangement.

A communication method in a network system which is constituted by a plurality of node devices and a transmission path for connecting the node devices, and performs a communication using a packet, comprising:

a transmission path for connecting the node devices;

a first node device including:
 a buffer for temporarily storing the packet;
 selection means for selecting a channel to which the buffer is connected from a plurality of different channels; and
 buffer control means for controlling the buffer to read out a packet to be output using the selected channel from the buffer in synchronism with the channel to which the buffer is connected; and a second node device including
 packet processing means for processing a packet;

is characterized by comprising the steps of:

selecting a second channel by the selection means, the plurality of channels including a first channel connected to the second node device via the transmission path and connected to a sub transmission path connected to the second node device or another node device via the second node device, and the second channel connected to the second node device via the transmission path and connected to the packet processing means in the second node device; and reading out a packet to be output to the packet processing means in the second node device and stored in the buffer while the selection means selects the second channel.

At this time, the packet processing unit in the second node device manages terminal equipments and the like connected to the first node device.

BRIEF DESCRIPTION OF THE DRAWINGS

FIG. 9 is a block diagram showing the arrangement of a distribution processing unit according to the first embodiment of the present invention;

DETAILED DESCRIPTION OF THE PREFERRED EMBODIMENTS (First Embodiment)

Figure 2B:
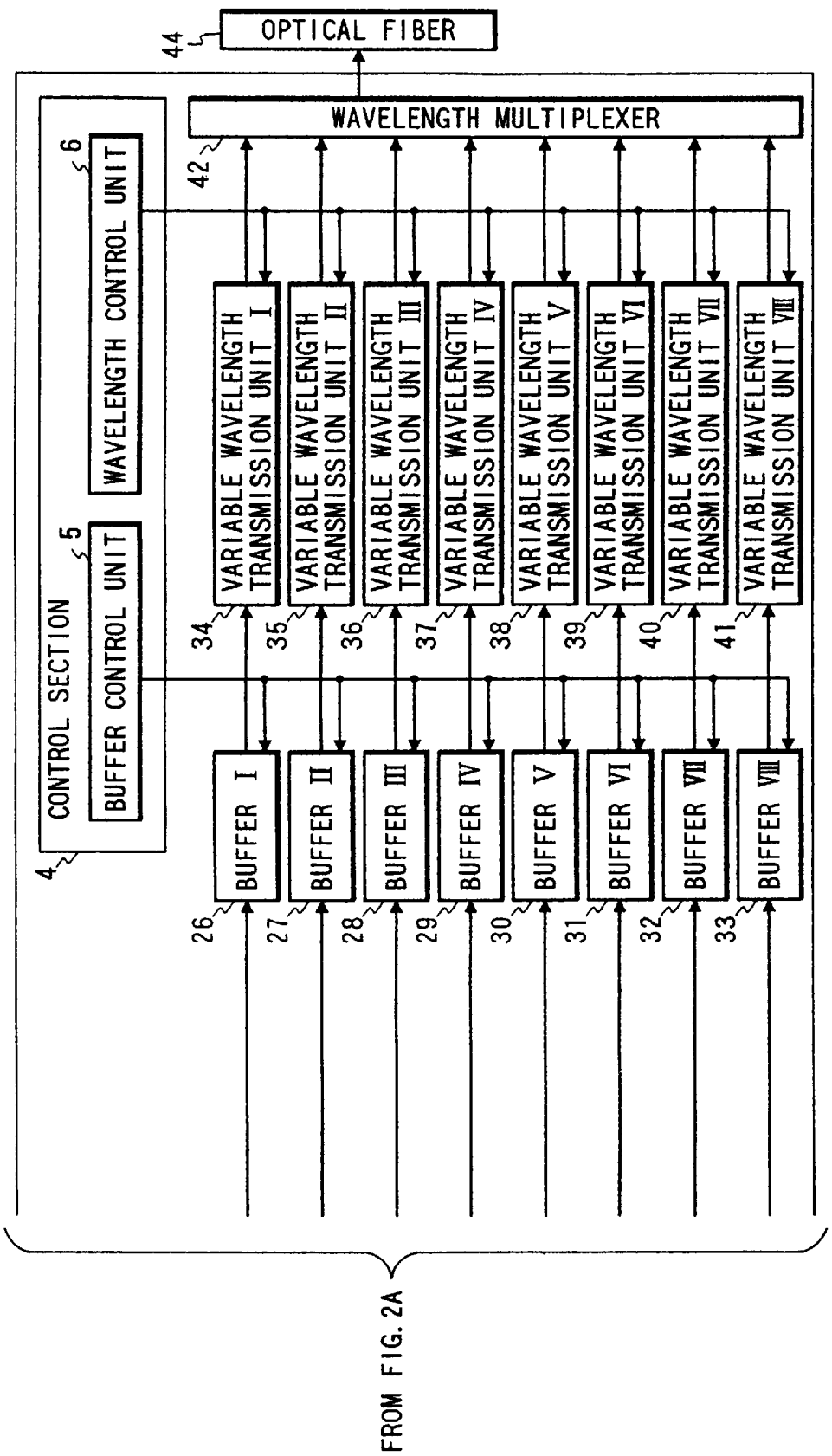
FIG. 2 which comprised of FIGS. 2A and 2B is a block diagram showing the arrangement of a node device in the example of the system shown in FIG. 1.
Figure 3:
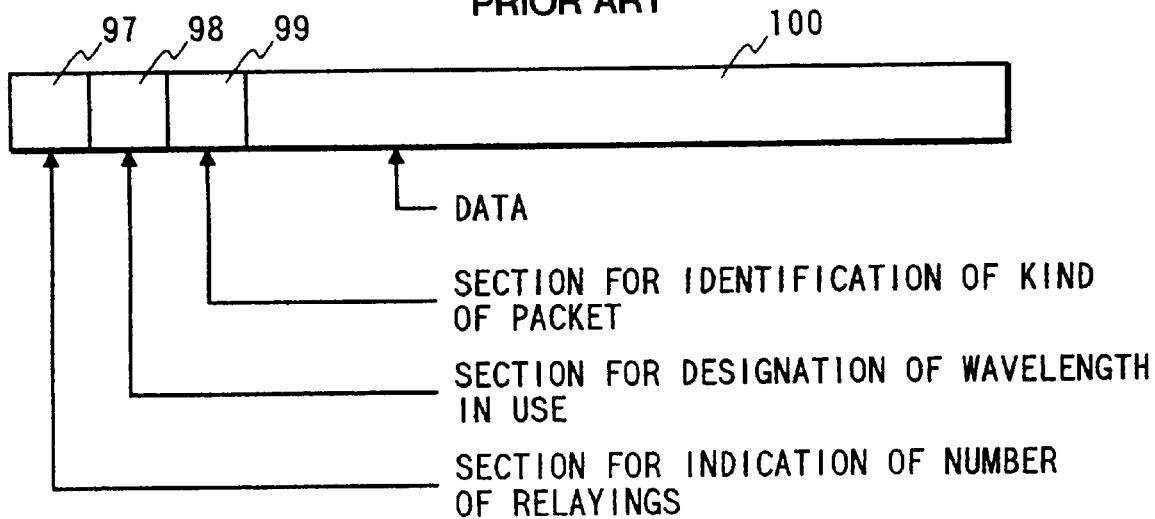
FIG. 3 is a view showing the format of a packet.
Figure 6:
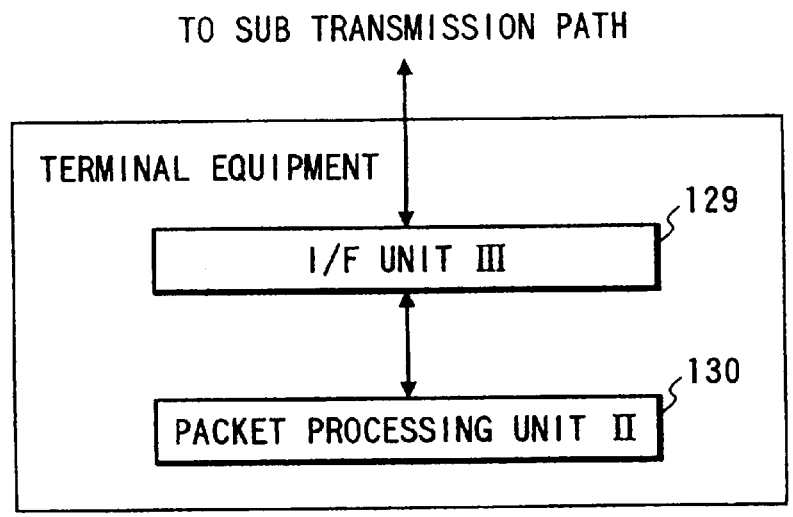
FIG. 6 is a block diagram showing the arrangement of a terminal equipment.
Figure 4:
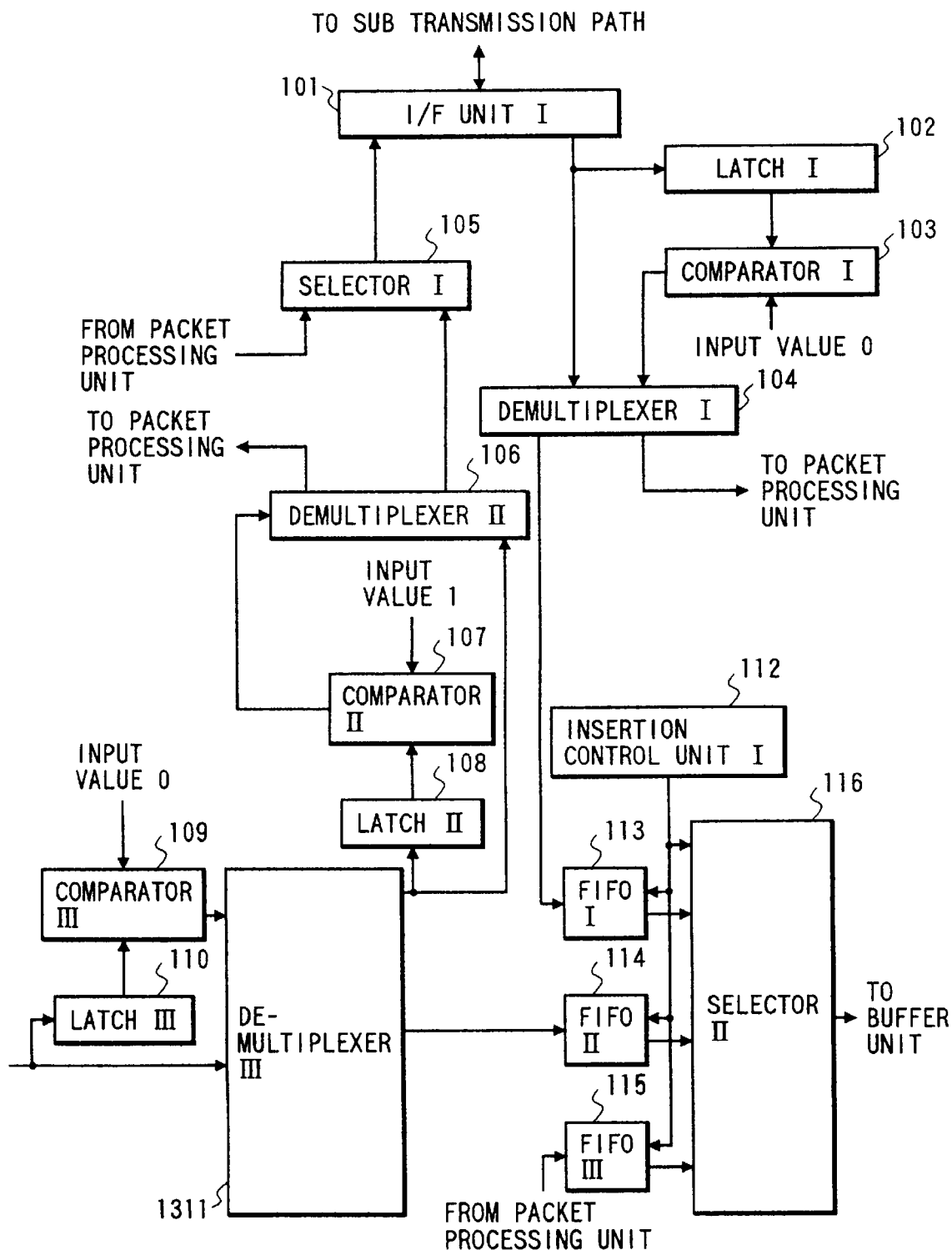
FIG. 4 is a block diagram showing the arrangement of a route control unit in the node device used in the example of the system shown in FIG. 1.
Figure 5:
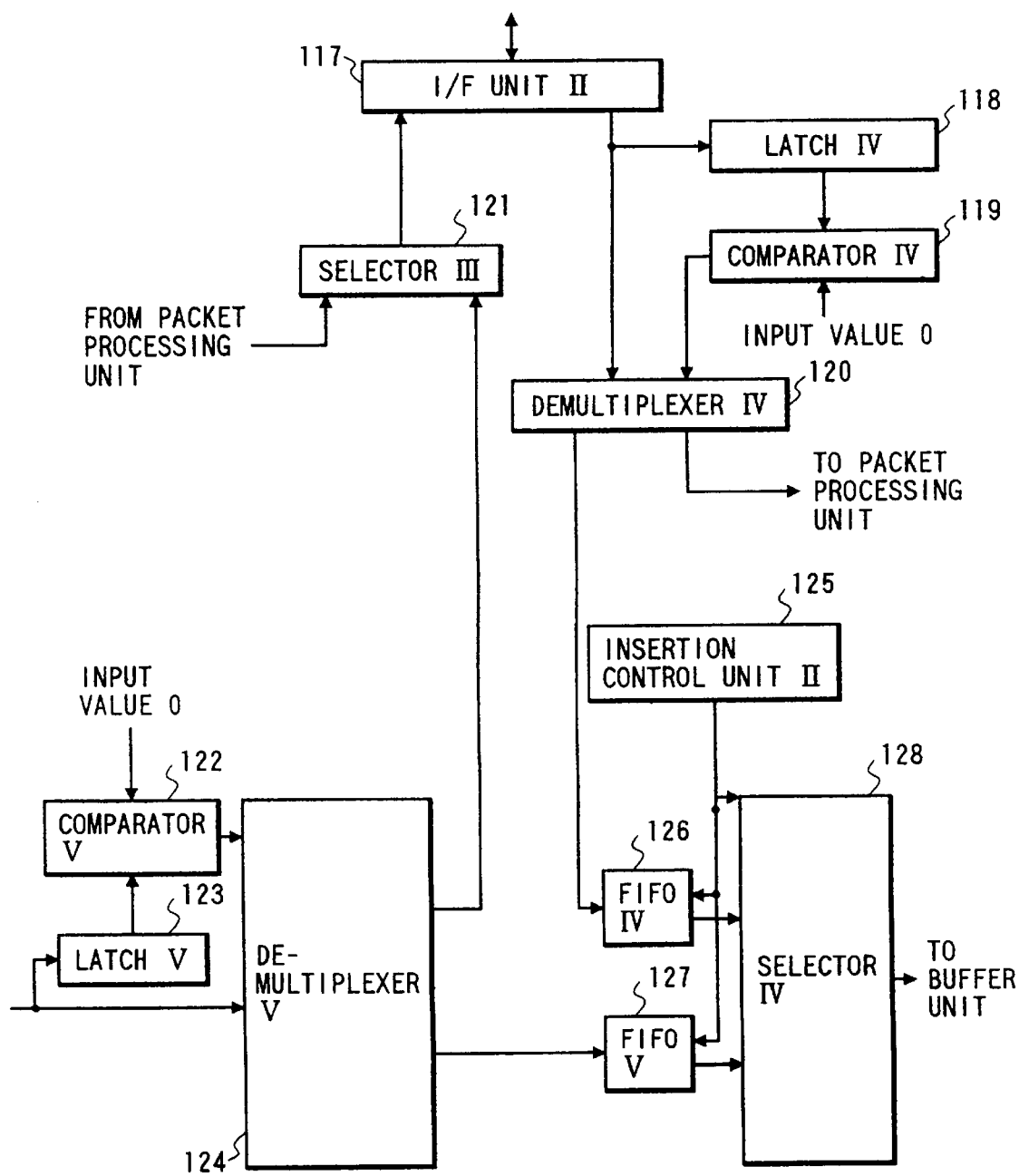
FIG. 5 is a block diagram showing the arrangement of a relaying processing unit in the node device used in the example of the system shown in FIG. 1.
Figure 8B:
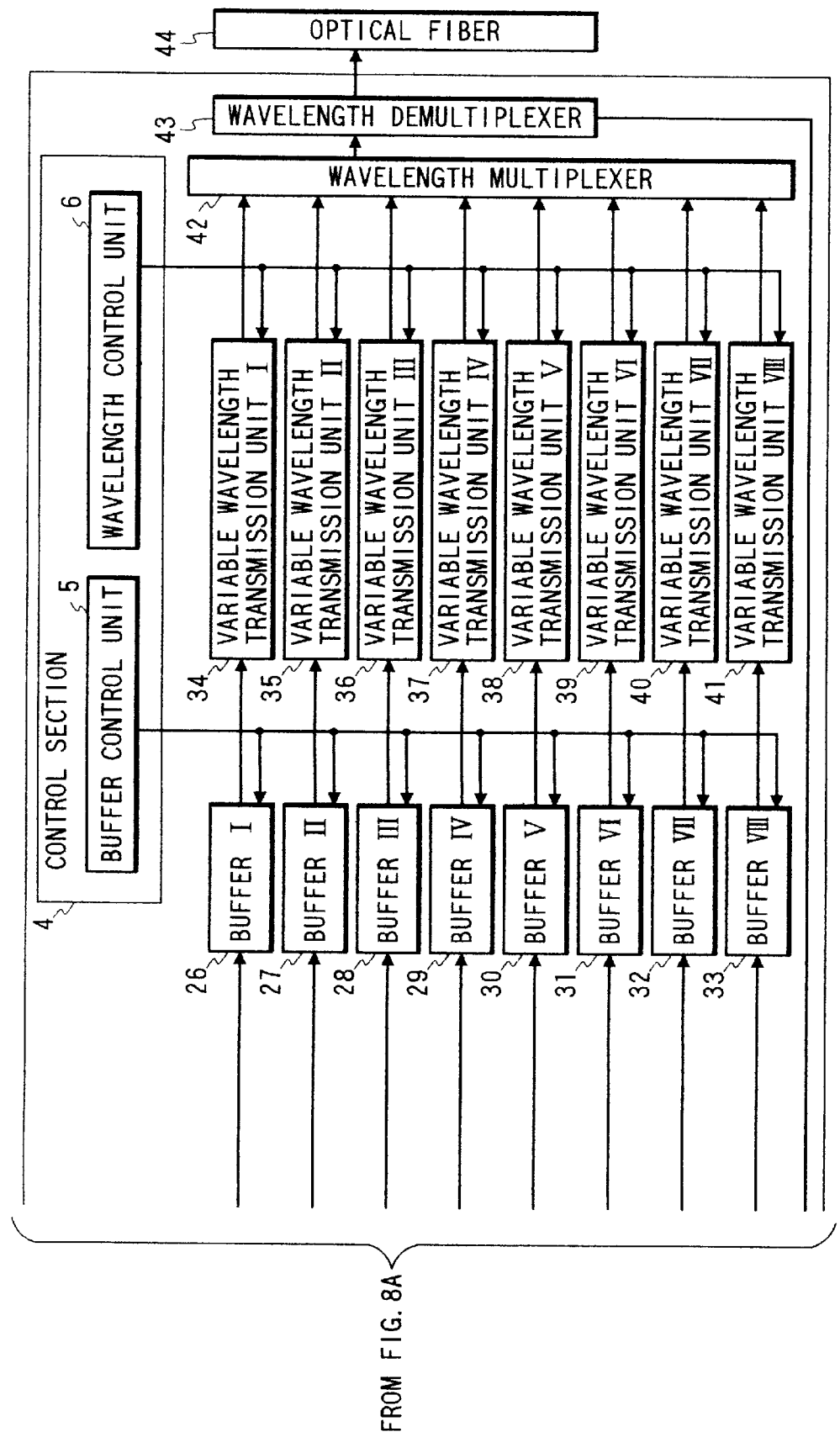
FIG. 8 which comprised of FIGS. 8A and 8B is a block diagram showing the arrangement of a node device according to the first embodiment of the present invention.

FIGS. 8A and 8B show the first embodiments of a node device according to the present invention, which is used in a wavelength multiplex network system using eight wavelengths, i.e., $\lambda 1$ to $\lambda 8$. The arrangement of the node device of this embodiment is substantially the same as that of the node device in the above example of the system shown in FIG. 2, except that separation-insertion units I 18 to VII 24 and a distribution processing unit I 25 are arranged in place of the relaying processing units I 89 to VII 95 and the route control unit I 96 shown in FIG. 2, a wavelength multiplexer 8 and a wavelength demultiplexer 43 are added, and the decoding operation of a decoder in each buffer is set, as will be described later.

Referring to FIGS. 8A and 8B, a wavelength multiplexer 8 multiplexes an optical signal of a wavelength $\lambda 8$ demultiplexed by a wavelength demultiplexer 43 of the own node device to seven optical signals of wavelengths $\lambda 1$ to $\lambda 7$, which are transmitted, via an optical fiber 7, from a node device that neighbors the own node device at the upstream side in the transmission direction. The wavelength demultiplexer 43 outputs seven optical signals of the wavelengths $\lambda 1$ to $\lambda 7$ from eight optical signals of the wavelengths $\lambda 1$ to $\lambda 8$ output from a wavelength multiplexer 42, and outputs an optical signal of the wavelength $\lambda 8$ to the wavelength multiplexer 8 of the own node device.

FIG. 9 shows an example of the arrangement of a distribution processing unit I 25 preferably used in the first embodiment of the node device according to the first embodiment. The distribution processing unit 25 (which, strictly speaking, should be referred to as a "distribution processing unit I 25", but will also be referred to as a "distribution processing unit 25" unless it is confusing; the same applies to other parts) has a function of separating a packet to be transmitted onto a sub transmission path 52 from a packet flow output from a fixed wavelength reception unit 17 and outputting the separated packet onto the sub transmission path 52, and inserting a packet transmitted from the sub transmission path 52 into a packet flow output from the fixed wavelength reception unit 17, and a function of separating a packet to be output to a packet processing unit I 3 from a packet flow output from the fixed wavelength reception unit 17 and outputting the separated packet to the packet processing unit I 3, and inserting a packet output from the packet processing unit I 3 into a packet flow output from the fixed wavelength reception unit 17.

Referring to FIG. 9, an I/F unit A 61 outputs a packet output from a demultiplexer A 62 onto the sub transmission path 52, and outputs a packet input from the sub transmission path 52 to a FIFO A 69. When a comparator A 63 outputs a separation instruction as a result of comparison of an input packet, the demultiplexer A 62 outputs the input packet to the packet processing unit I 3; when the comparator A 63 outputs an output instruction, it outputs the input packet to the I/F unit A 61. The comparator A 63 detects by comparison if the value in a section 99 for identification of the kind of packet in a packet output from a latch A 64 is "0". If the value is "0", the comparator A 63 outputs a separation instruction to the demultiplexer A 62; otherwise, it outputs an output instruction thereto. The latch A 64 stores the value in the section 99 for identification of the kind of packet in a packet output from a demultiplexer B 67, and outputs the stored value to the comparator A 63. A comparator B 65 detects by comparison if the value in a section 97 for indication of the number of relayings in a packet output from a latch B 66 is "0". If the value is "0", the comparator 65 outputs a separation instruction to the demultiplexer B 67; otherwise, it outputs a relaying instruction thereto. The latch B 66 stores the value in the section 97 for indication of the number of relayings in a packet output from the fixed wavelength reception unit 17, and outputs the stored value to the comparator B 65. When the comparator B 65 outputs a separation instruction as a result of comparison of an input packet, the demultiplexer B outputs the input packet to the latch A 64 and the demultiplexer A 62; when the comparator B 65 outputs a relaying instruction, it outputs the input packet to a FIFO B 70. An insertion control unit A 68 controls the reading operations of the FIFOs A 69 and B 70, and a FIFO C 71, and also performs control for inserting a packet transmitted from the sub transmission path 52 and a packet transmitted from the packet processing unit I 3 into a packet flow output from the fixed wavelength reception unit 17 via the demultiplexer B 67 by instructing a selector A 72 of a FIFO to be selected. The FIFOs 69, 70, and 71 temporarily store input packets, and output them in the input order under the control of the insertion control unit A 68. The selector A 72 selects the FIFO that stores a packet signal to be output in accordance with an instruction from the insertion control unit A 68, and outputs the packet output from the selected FIFO to a buffer 33.

The memory area to be designated by a decoder 132 (see FIG. 7) in each of buffers 26 to 33 is determined as follows in this embodiment.

Setting Condition 1) When the value in a section 99 for identification of the kind of packet in a packet indicates a management packet, and the value in a section 97 for indication of the number of relayings in this packet is "1", the decoder 132 designates a memory area VIII corresponding to the reception wavelength $\lambda 8$ of the fixed wavelength reception unit 17 that outputs a packet to the distribution processing unit 25.

Setting Condition 2) When the value in a section 99 for identification of the kind of packet in a packet indicates a management packet, and the value in a section 97 for indication of the number of relayings in the packet is not "1", the decoder 132 designates a memory area corresponding to the wavelength described in a section 98 for designation of the wavelength in use in the packet.

Setting Condition 3) When the value in a section 99 for identification of the kind of packet in a packet indicates a data packet, and the value in a section 97 for indication of the number of relayings in the packet is "1", the decoder 132 designates a memory area corresponding to the wavelength described in a section 98 for designation of the wavelength in use in the packet.

Setting Condition 4) When the value in a section 99 for identification of the kind of packet in a packet indicates a data packet, the value in a section 97 for indication of the number of relayings in the packet is not "1", and the wavelength described in a section 98 for designation of the wavelength in use in the packet is the reception wavelength $\lambda 8$ of the fixed wavelength reception unit 17 that outputs a packet to the distribution processing unit 25, the decoder 132 designates a memory area corresponding to an arbitrary wavelength (in this case, $\lambda 1$) other than $\lambda 8$.

Setting Condition 5) When the value in a section 99 for identification of the kind of packet in a packet indicates a data packet, the value in a section 97 for indication of the number of relayings in the packet is not "1", and the wavelength described in a section 98 for designation of the wavelength in use in the packet is not the reception wavelength $\lambda 8$ of the fixed wavelength reception unit 17 that outputs a packet to the distribution processing unit 25, the decoder 132 designates a memory area corresponding to the wavelength described in the section 98 for designation of the wavelength in use.

The above-mentioned conditions are set to basically satisfy the following requirements, and to efficiently discriminate which of the setting conditions is satisfied.

The requirements are that the number of relayings via a selection means for selecting a channel (a variable wavelength transmission unit in this embodiment; a connection alteration unit in the arrangement shown in FIGS. 14A and 14B to be described later) to be connected to a buffer storing the packet of interest is recognized on the basis of the value in the section 97 for indication of the number of relayings, if the number of relayings is 1, the packet is stored in a memory area corresponding to an output channel to be designated, so that the packet can be output by designating a destination (channel; wavelength) (using the wavelength described in the section 98 for designation of the wavelength in use) upon outputting the packet from the buffer via an output means, and that if the number of relayings is other than 1, the packet is stored in an arbitrary memory area so as to be output using an arbitrary channel. However, in order to simplify control in this embodiment, a packet, the number of relayings of which is other than 1, is also output using the wavelength described in the section 98 for designation of the wavelength in use under a certain setting condition (setting condition 2). Also, a predetermined wavelength (e.g., $\lambda 1$) can also be used. Especially, in each node device of this embodiment, 1) the distribution processing unit to which the terminal equipment is connected is also connected to a channel ($\lambda 8$) which is connected to the packet processing unit (i.e., a packet which is a data packet but designates the wavelength $\lambda 8$ is present), and 2) a packet is also transmitted from the packet processing unit of a certain node device to that of another node device (a packet which is a management packet but requires 2 or more relayings is present). In order to cope with this arrangement, a packet which requires 2 or more relayings and designates a channel connected to the packet processing unit (i.e., the designated wavelength=$\lambda 8$) may be set not to be output using the designated channel ($\lambda 8$). Alternatively, as will be described later in this embodiment, each buffer may also discriminate the kind of packet (a management packet such as a notification packet, an inquiry packet, or the like, or a data packet), and a packet to be transmitted from the packet processing unit in a certain node device to that in another node device is output by describing a channel other than the channel connected to the packet processing unit (the wavelength other than $\lambda 8$) in the section for designation, so that no packet which is a management packet but requires 2 or more relayings is present. That is, as long as the kind of packet is discriminated to be a management packet, whether or not the designated wavelength is $\lambda 8$ need not be discriminated (if the packet is a management packet and requires one relaying, it is output using $\lambda 8$).

Table 3 below is a terminal equipment connection table of a node device I 81 used in this embodiment. In this embodiment, a terminal equipment VIII 60 is the one connected to the distribution processing unit, and receives a packet relayed via one more variable wavelength transmission unit than in other terminal equipments connected to the same node device. For this reason, the number of relayings corresponding to the terminal equipment connected to the distribution connection unit 25 is set to be larger by one than those of other terminal equipments.

TABLE 3

| Terminal Equipment Identification Number | Number of Relayings | Reception Wavelength |
| --- | --- | --- |
| 11 | — | — |
| 12 | 4 | 2 |
| 13 | 4 | 3 |
| 14 | 4 | 4 |
| 15 | 4 | 5 |
| 16 | 4 | 6 |
| 17 | 4 | 7 |
| 18 | 5 | 8 |
| 21 | 1 | 1 |
| 22 | 1 | 2 |
| 23 | 1 | 3 |
| 24 | 1 | 4 |
| 25 | 1 | 5 |
| 26 | 1 | 6 |
| 27 | 1 | 7 |
| 28 | 2 | 8 |
| 31 | 2 | 1 |
| 32 | 2 | 2 |
| 33 | 2 | 3 |
| 34 | 2 | 4 |
| 35 | 2 | 5 |
| 36 | 2 | 6 |
| 37 | 2 | 7 |
| 38 | 3 | 8 |
| 41 | 3 | 1 |
| 42 | 3 | 2 |
| 43 | 3 | 3 |
| 44 | 3 | 4 |
| 45 | 3 | 5 |
| 46 | 3 | 6 |
| 47 | 3 | 7 |
| 48 | 4 | 8 |

Figure 10:
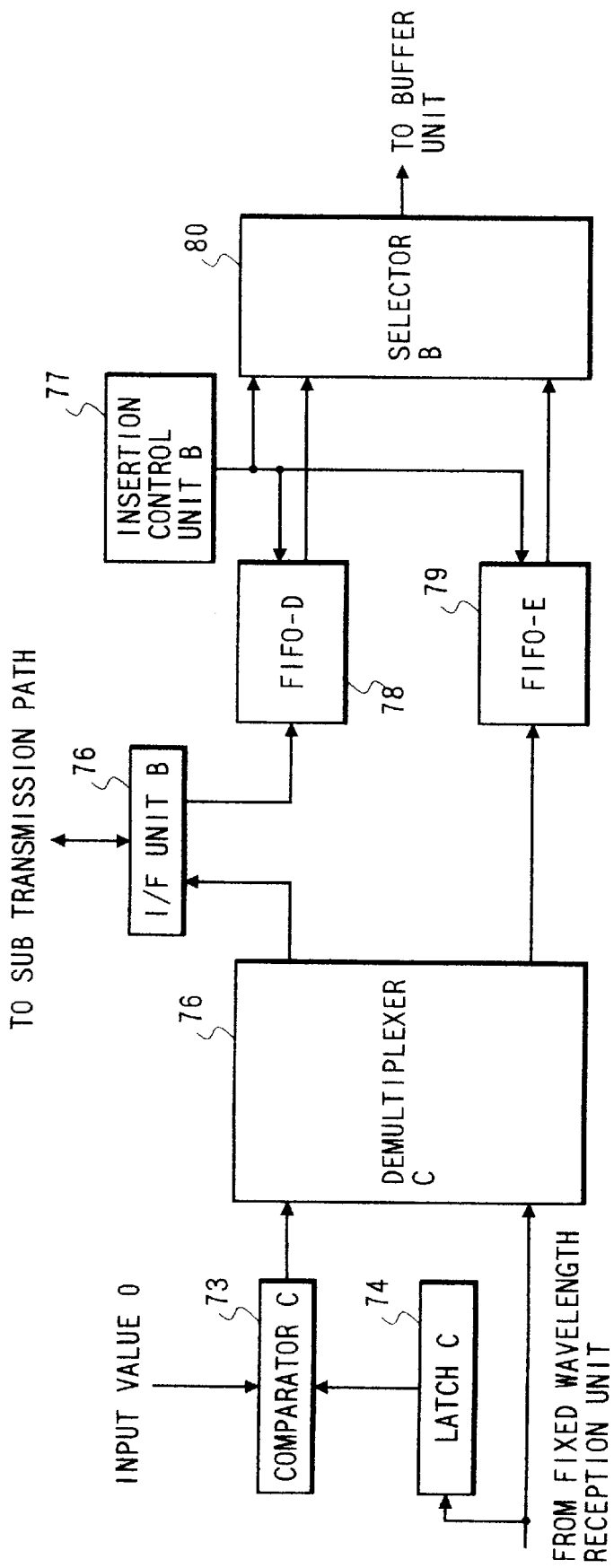
FIG. 10 is a block diagram showing the arrangement of a separation-insertion unit according to the first embodiment of the present invention.

FIG. 10 shows the internal arrangement of each of separation-insertion units I 18 to VII 24 preferably used in the first embodiment of the node device according to the present invention. All the separation-insertion units I 18 to VII 24 have the same arrangement. The separation-insertion units 18 to 24 have a function of respectively separating packets to be transmitted onto sub transmission paths 45 to 51 from packet flows output from fixed wavelength reception units 10 to 16 and outputting the separated packets onto the sub transmission paths 45 to 51, and respectively inserting packets transmitted from the sub transmission paths 45 to 51 into packet flows output from the fixed wavelength reception units 10 to 16.

Referring to FIG. 10, a comparator C 73 detects by comparison if the value in the section for indication of the number of relayings in a packet output from a latch C 74 is "0". If the value is "0", the comparator 73 outputs a separation instruction to a demultiplexer C 75; otherwise, it outputs a relaying instruction thereto. The latch C 74 stores the value in a section 97 for indication of the number of relayings in a packet output from a corresponding one of the fixed wavelength reception units 10 to 16, and outputs the stored value to the comparator C 73. When the comparator C 73 outputs a separation instruction as a result of comparison of an input packet, the demultiplexer C 75 outputs the input packet to an I/F unit B 76; when the comparator C 73 outputs a relaying instruction, it outputs the input packet to a FIFO E 79. The I/F unit B 76 outputs a packet output from the demultiplexer C 75 onto a corresponding one of the sub transmission paths 45 to 51, and outputs a packet input from a corresponding one of the sub transmission paths 45 to 51 to a FIFO D 78. An insertion control unit B 77 controls the reading operations of the FIFOs D and E 78 and 79, and also performs control for inserting a packet transmitted from a corresponding one of the sub transmission paths 45 to 51 into a packet flow output from a corresponding one of the fixed wavelength reception units 10 to 16 via the demultiplexer C 75 by instructing a selector B 80 of a FIFO to be selected. The FIFOs D 78 and E 79 temporarily store input packets, and output them to the selector B 80 in the input order under the control of the insertion control unit B 77. The selector B 80 selects the FIFO that stores a packet signal to be output in accordance with an instruction from the insertion control unit B 77, and outputs the packet output from the selected FIFO to a corresponding one of buffers 26 to 32.

The operation of the first embodiment of the present invention will be described below with reference to FIGS. 8A, 8B, 9, 10, 6, and 7. In the following description, a case will be exemplified wherein data is transmitted from a terminal equipment I 53 connected to a sub transmission path I 45 of the node device I 81 to a terminal equipment V 57 connected to a sub transmission path V 49 of a node device IV 84 as a destination in the example of the multihop system shown in FIG. 1. Also, in the following description, the same constituting elements in different node devices and terminal equipments will be denoted by the same reference numerals in FIGS. 9, 10, 6, and 7 for the sake of convenience.

Prior to data transmission, the source terminal equipment I 53 that transmits data to the terminal equipment V 57 sends an inquiry packet to the node device I 81 to seek a grant for connection establishment and to inquire as to the values of the number of relayings and the wavelength in use required for transmitting data to the destination terminal equipment V 57. For this purpose, a packet processing unit II 130 in the terminal equipment I 53 assembles an inquiry packet by writing a value "8" in a section 98 for designation of the wavelength in use, setting "1" in a section 97 for indication of the number of relayings, setting a value designating an "inquiry packet" in a section 99 for identification of the kind of packet, and setting, as a data portion 100, identification number "11" of the own terminal equipment, identification number "45" of the terminal equipment V 57 as a destination terminal equipment connected to the sub transmission path V 49 of the node device IV 84, and a required communication frequency band value Tw. Then, the terminal equipment I 53 outputs the inquiry packet onto the sub transmission path 45 via an I/F unit III 129. The inquiry packet output onto the sub transmission path 45 is input to an I/F unit B 76 of a separation-insertion unit I 18 connected to the sub transmission path I 45 of the node device I 81.

The I/F unit B 76 of the separation-insertion unit 18 of the node device I 81 sequentially writes the inquiry packet transmitted via the sub transmission path I 45 in a FIFO D 78. Upon completion of the writing operation of the inquiry packet in the FIFO D 78, an insertion control unit B 77 detects an end of a packet flow which is being read out from a FIFO E 79, and switches the input from the FIFO to be output from a selector B 80 to the input from the FIFO D 78, stops the reading operation of the FIFO E 79, and starts a reading operation of the FIFO D 78. Upon completion of the reading operation of the inquiry packet written in the FIFO D 78, the insertion control unit B 77 switches the input from the FIFO to be output from the selector B 80 to the input from the FIFO E 79 again, stops the reading operation of the FIFO D 78, and restarts a reading operation of the FIFO E 79. The inquiry packet output from the selector B 80 is input to the buffer I 26.

A demultiplexer VI 131 in the buffer I 26 outputs the header portion of the inquiry packet output from the separation-insertion unit I 18 to a decoder 132 and a latch VI 133, and the data portion 100 to a shift register 135. The decoder 132 decodes the header portion of the inquiry packet. In this packet, since the value in the section 97 for indication of the number of relayings is "1", and the value in the section 99 for identification of the kind of packet indicates an inquiry packet, the decoder 132 determines that a memory area in which the packet is to be written is an area VIII, and outputs the writing start address value of the area VIII to a writing address counter 137.

The latch VI 133 stores the header portion of the inquiry packet, and outputs it to a subtraction processing unit 134. In the header portion of the inquiry packet output from the latch VI 133, the value "1" in the section 97 for indication of the number of relayings is decremented to "0" by the subtraction processing unit 134, and the header portion with the decremented value in the section 97 for indication of the number of relayings is output to a selector V 136. The shift register 135 delays the data portion 100 of the inquiry packet output from the demultiplexer VI 131 by a predetermined period of time, and outputs the delayed data portion 100 to the selector V 136. The selector V 136 re-assembles the inquiry packet with the decremented value "0" in the section 97 for indication of the number of relayings by sequentially selecting the header portion including the value, decremented by the subtraction processing unit 134, in the section 97 for indication of the number of relayings, and the delayed data portion 100 of the inquiry packet output from the shift register 135, and outputs the inquiry packet to a dual port memory 139.

On the other hand, the writing address counter 137 sets the writing start address of the dual port memory 139 in which the inquiry packet is to be written to be A8 in correspondence with the decode result of the inquiry packet output from the decoder 132, and sequentially outputs writing address signals of the packet to the dual port memory 139. Since the input port of the dual port memory 139 receives the re-assembled inquiry packet via the selector V 136, the inquiry packet is sequentially written in the memory area VIII in accordance with the addresses output from the writing address counter 137.

After the inquiry packet is written in the memory area VIII in this manner, when the transmission wavelength of a variable wavelength transmission unit I 34 is set to be λ8 under the control of a wavelength control unit 6 in a control section 4, a buffer control unit 5 in the control section 4 outputs an offset value A8 corresponding to the memory area VIII to a reading address counter 138 in the buffer I 26. Based on the offset value A8, the reading address counter 138 sequentially generates addresses for reading out the inquiry packet stored in the memory area VIII by incrementing a counter, and outputs the addresses to the dual port memory 139. The inquiry packet is sequentially read out from the output port of the dual port memory 139 in accordance with the reading addresses, and is output to the variable wavelength transmission unit I 34. Since the transmission wavelength of the variable wavelength transmission unit I 34 is set to be λ8, the inquiry packet is output from the variable wavelength transmission unit I 34 to a wavelength multiplexer 42 as an optical signal of the wavelength λ8, and is multiplexed with optical signals of different wavelengths output from other variable wavelength transmission units II 35 to VIII 41 by the wavelength multiplexer 42. The multiplexed signal is output to a wavelength demultiplexer 43. Since the inquiry packet input to the wavelength demultiplexer 43 is optical signal of the wavelength λ8, it is demultiplexed, and is output to a wavelength multiplexer 8 of the own node device I 81.

After being demultiplexed by the wavelength demultiplexer 43 of the node device I 81 as an optical signal of the wavelength λ8 and being input to the wavelength multiplexer 8 of the own node device I 81, the inquiry packet is multiplexed with optical signals of the wavelengths λ1 to λ7 output from the node device IV 84, which neighbors the own node device at the upstream side, by the wavelength multiplexer 8, and the multiplexed signal is input to a divider 9. The multiplexed optical signals including the wavelengths λ1 to λ8 and input to the divider 9 is divided, and the divided signals are respectively input to fixed wavelength reception units I 10 to VIII 17. Since the inquiry packet is optical signal of the wavelength λ8, it is received by the fixed wavelength reception unit VIII 17 that receives only an optical signal of λ8. The inquiry packet received by the fixed wavelength reception unit VIII 17 is output to a distribution processing unit I 25.

A latch B 66 in the distribution processing unit I 25 stores the value in the section 97 for indication of the number of relayings in the inquiry packet output from the fixed wavelength reception unit VIII 17, and outputs the stored value to a comparator B 65. Since the value in the section 97 for indication of the number of relayings in the inquiry packet output from the latch B 66 is "0", the comparator B 65 outputs a separation instruction to a demultiplexer B 67. Upon reception of the separation instruction from the comparator B 65, the demultiplexer B 67 outputs the input inquiry packet to a latch A 64 and a demultiplexer A 62. The latch A 64 stores the value in the section 99 for identification of the kind of packet in the inquiry packet, and outputs the stored value to a comparator A 63. Since the value in the section 99 for identification of the kind of packet in the inquiry packet output from the latch A 64 is "0", the comparator A 63 outputs a separation instruction to the demultiplexer A 62. Upon reception of the separation instruction from the comparator A 63, the demultiplexer A 62 outputs the input inquiry packet to a packet processing unit I 3.

The packet processing unit I 3 searches the connection management table for a currently available communication band width, and compares the obtained value with the required communication band width value Tw described in the data portion in the inquiry packet. Then, the packet processing unit I 3 assembles a notification packet to be transmitted to a packet processing unit I 3 in a neighboring node device II 82 at the downstream side in the transmission direction by writing grant or deny information as communication grant/deny indication information in its data portion depending on whether or not the currently available communication band width has a margin for a new communication. At this time, the unit 3 writes an arbitrary value ("1" in this case) other than "8" in a section 98 for designation of the wavelength in use, sets "2" in a section 97 for indication of the number of relayings, and sets a value indicating a "notification packet" in a section 99 for identification of the kind of packet. The communication grant/deny indication information is appended with the identification number of the node device I 81 as the source that transmitted these kinds of information. Simultaneously with the formation of the notification packet, the terminal equipment I 53 connected to the sub transmission path I 45 of the source node device I 81, the terminal equipment V 57 connected to the sub transmission path V 49 of the destination node device IV 84, and the use communication band width value Tw, which are designated in the notification packet, are registered in a connection management table.

The notification packet assembled by the packet processing unit I 3 is written in a FIFO C 71 in a distribution processing unit 25. In the following description, a case will be explained first wherein the required communication band width value Tw is assured, and communication grant indication information is written in a data portion 100, and a case wherein communication deny indication information is written in the data portion will be described later. The notification packet written in the FIFO C 71 is inserted into a packet flow output from the demultiplexer B 67 under the control of the insertion control unit A 68, and is output from the selector A 72 to a buffer VIII 33.

A demultiplexer VI 131 in the buffer VIII 33 outputs the header portion in the notification packet output from the distribution processing unit I 25 to a decoder 132 and a latch VI 133, and the data portion 100 to a shift register 135, respectively. The decoder 132 decodes the header portion of the notification packet. Since the value in the section 97 for indication of the number of relayings is "2" and the value in the section 98 for designation of the wavelength in use is "1", the decoder 132 determines that the memory area in which the packet is to be written is an area I, and outputs the writing start address value of the area I to a writing address counter 137.

The latch VI 133 stores the header portion of the notification packet, and outputs the stored value to a subtraction processing unit 134. In the header portion of the notification packet output from the latch VI 133, the value "2" in the section 97 for indication of the number of relayings is decremented to "1" by the subtraction processing unit 134, and the decremented value is output to a selector V 136. The shift register 135 delays the data portion 100 of the notification packet output from the demultiplexer VI 131 by a predetermined period of time in the same manner as in the above-mentioned processing of the inquiry packet, and outputs the delayed data portion to the selector V 136. The selector V 136 re-assembles the notification packet with the decremented value "1" in the section 97 for indication of the number of relayings by sequentially selecting the header portion including the value, decremented by the subtraction processing unit 134, in the section 97 for indication of the number of relayings, and the delayed data portion 100 of the notification packet output from the shift register 135, and outputs the notification packet to a dual port memory 139.

On the other hand, the writing address counter 137 sets the writing start address of the dual port memory 139, in which the notification packet is to be written, to be A1 in correspondence with the writing start address value of the memory area I, in which the notification packet is to be written and which is output from the decoder 132, and sequentially outputs writing address signals of the packet to the dual port memory 139. Since the input port of the dual port memory 139 receives the re-assembled notification packet via the selector V 136, the notification packet is sequentially written in the memory area I in accordance with the addresses output from the writing address counter 137.

In this manner, the notification packet written in the memory area I is transmitted as an optical signal of the wavelength λ1 from a variable wavelength transmission unit VIII 41 under the control of the wavelength control unit 6 in the control section 4, as described above, and is multiplexed with optical signals of the wavelengths λ2 to λ8 transmitted from other variable wavelength transmission units. The multiplexed signal is then output to the wavelength demultiplexer 43. The notification packet input to the wavelength demultiplexer 43 is not demultiplexed since it is optical signal of the wavelength λ1, and is output onto an optical fiber 44. Then, the notification packet is input to a wavelength multiplexer 8 in a neighboring node device II 82 at the downstream side in the transmission direction. The multiplexed optical signal of the wavelengths λ1 to λ7 including the notification packet and input to the wavelength multiplexer 8 is multiplexed with an optical signal of the wavelength λ8 output from a fixed wavelength reception unit VIII 17 of the node device II 82, and the multiplexed signal is output to a divider 9.

The multiplexed optical signal of the wavelengths λ1 to λ8 input to the divider 9 is divided, and the divided signals are respectively input to fixed wavelength reception units I 10 to VIII 17. In this case, since the notification packet is optical signal of the wavelength λ1, it is received by the fixed wavelength reception unit I 10 which receives only an optical signal of λ1.

The notification packet received by the fixed wavelength reception unit I 10 is output to a separation-insertion unit I 18. A latch C 74 of the insertion-separation unit I 18 stores the value in the section 97 for indication of the number of relayings in the notification packet output from the fixed wavelength reception unit I 10, and outputs the stored value to a comparator C 73. Since the value in the section 97 for indication of the number of relayings in the notification packet output from the latch C 74 is "1", the comparator C 73 outputs a relaying instruction to a demultiplexer C 75. Upon reception of the relaying instruction from the comparator C 73, the demultiplexer C 75 outputs the input notification packet to a FIFO E 79. The notification packet input to the FIFO E 79 is read out under the control of an insertion control unit B 77, and is output to a buffer I 26 via a selector B 80.

A demultiplexer V 131 in the buffer I 26 outputs the header portion in the notification packet output from the separation-insertion unit I 18 to a decoder 132 and a latch V 133, and the data portion 100 to a shift register 135, respectively. The decoder 132 decodes the header portion of the notification packet. Since the value in the section 97 for indication of the number of relayings is "1" and the value in the section 99 for identification of the kind of packet indicates a notification packet, the decoder 132 determines that the memory area in which the packet is to be rewritten is an area VIII. In the header portion of the notification packet output from the latch VI 133, the value "1" in the section 97 for indication of the number of relayings is decremented to "0" by a subtraction processing unit 134.

With the above processing, the notification packet is written in the memory area VIII, and thereafter, is output from a variable wavelength transmission unit I 34 to a wavelength multiplexer 42 as an optical signal of the wavelength λ8. The notification packet is then multiplexed with optical signals of different wavelengths output from other variable wavelength transmission units II 35 to VIII 41, and the multiplexed signal is output to a wavelength demultiplexer 43. The notification packet input to the wavelength demultiplexer 43 is demultiplexed since it is optical signal light of the wavelength λ8, and is input to the wavelength multiplexer 8 of the own node device II 82. The notification packet input to the wavelength multiplexer 8 is multiplexed with the multiplexed optical signals of the wavelengths λ1 to λ7 output from the neighboring node device I 81 at the upstream side, and is divided by the divider 9. The divided notification packet is received by the fixed wavelength reception unit VIII 17, and is then output to a distribution processing unit I 25.

In the distribution processing unit I 25, since the value in the section 97 for indication of the number of relayings in the notification packet is "0", a separation instruction is output to a demultiplexer B 67, and the notification packet is output to a latch A 64 and a demultiplexer A 62. The latch A 64 stores the value in the section 99 for identification of the kind of packet of the notification packet. Since the value in the section 99 for identification of the kind of packet of the notification packet is "0", a comparator A 63 outputs a separation instruction to the demultiplexer A 62. With this processing, the demultiplexer A 62 outputs the notification packet to a packet processing unit I 3.

As in the node device I 81, the packet processing unit I 3 in the node device II 82 searches the connection management table for a currently available communication band width for the relaying transmission operation of the node device II 82, and compares the obtained value with the required communication band width value Tw described in the data portion of the notification packet. After the unit I 3 assembles a notification packet to be transmitted to a packet processing unit I 3 in a node device III 83 by appending communication grant/deny indication information and the identification number of the node device II 82 to the data portion of the received notification packet, it transmits the notification packet. At the same time, the terminal equipment I 53 connected to the sub transmission path I 45 of the source node device I 81, the terminal equipment V 57 connected to the sub transmission path V 49 of the destination node device IV 84, and the use communication band width value Tw, which are designated in the notification packet, are registered in a connection management table.

The notification packet assembled as described above is transmitted in the same manner as in transmission from the packet processing unit I 3 in the node device I 81 to that in the node device II 82, and is received by the packet processing unit I 3 in the node device III 83.

The packet processing unit I 3 in the node device III 83 searches the connection management table for a currently available communication band width for the relaying transmission operation of the node device III 83, and compares the obtained value with the required communication band width value Tw. Thereafter, the unit I 3 appends communication grant indication information or communication deny indication information, and the identification number of the node device III 83 to the data portion of the notification packet, and sends the notification packet to a node device IV 84.

Upon reception of the notification packet, the node device IV 84 searches the data portion for a plurality of pieces of communication grant/deny indication information appended by the respective node devices, i.e., the source node device I 81 to the destination node device IV 84. If all the pieces of information are grant information, a response packet addressed to the terminal equipment I 53 connected to the sub transmission path I 45 of the source node device I 81 is assembled by appending communication start instruction information, data for instructing, as the wavelength in use, λ5 as the reception wavelength of a fixed wavelength reception unit V 14 which outputs a packet to a separation-insertion unit V 22 connected to the destination terminal equipment V 57 of the node device IV 84 via the sub transmission path V 49, and a value "3" in a section 97 for indication of the number of relayings corresponding to the terminal equipment V 57 as the destination terminal equipment connected to the node device IV 84. The response packet is output to a distribution processing unit I 25. At this time, a value "1" indicating the reception wavelength of the fixed wavelength reception unit I 10, which outputs a packet to the separation-insertion unit I 18 to which the terminal equipment I 53 of the node device I 81 is connected via the sub transmission path I 45, is written in a section 98 for designation of the wavelength in use, a value "1" is written in the section 97 for indication of the number of relayings, and a value designating a "response" packet is set in a section 99 for identification of the kind of packet.

The response packet transmitted from the packet processing unit I 3 in the node device IV 84 is input to a buffer VIII 33 via the distribution processing unit I 25, and the value in the section 97 for indication of the number of relayings is rewritten to "0". Thereafter, the response packet is transmitted from a variable wavelength transmission unit VIII as an optical signal of the wavelength λ1, and is relayed, as described above. The response packet is received by the fixed wavelength reception unit I 10 in the node device I 81, and is output to the separation-insertion unit I 18. In the separation-insertion unit I 18, since the value in the section 97 for indication of the number of relayings is "0", the response packet is separated by the demultiplexer C 75, and is sent to a packet processing unit II 130 in the terminal equipment I 53 connected to the sub transmission path I 45 via the I/F unit B 76.

Since the communication start instruction information is appended to the data portion of the received response packet, the packet processing unit II 130 in the terminal equipment I 53 starts transmission of a data packet to the terminal equipment V 57 connected to the sub transmission path V 49 of the node device IV 8 as a destination, as will be described later.

On the other hand, when a plurality of pieces of communication grant/deny indication information appended by the respective node devices, i.e., from the source node device I 81 to the destination node device IV 84 to the data portion of the notification packet received by a packet processing unit I 3 in the node device IV 84, include information indicating denial of a communication, the packet processing unit I 3 appends communication stop instruction information to a response packet, and transmits the packet to the source terminal equipment I 53 connected to the sub transmission path I 45 of the node device I 81. When the packet processing unit II in the terminal equipment I 53 receives the response packet appended with the communication stop instruction information, it does not start transmission of a data packet.

At the same time, the packet processing unit I 3 in the node device IV 84 assembles a notification packet by writing a cancel instruction, and the source terminal equipment, the destination terminal equipment, and the required communication band width value Tw registered in the connection management table upon relaying the notification packet, and transmits the notification packet to the node device I 81. This notification packet is relayed as described above, and is received by the packet processing unit I 3 in the node device I 81. The packet processing unit I 3 reads the data portion, and corrects the contents of the connection management table. The packet processing unit I 3 in the node device I 81 further transmits the received notification packet to the node device II 82. Similarly, the contents of the connection management tables in the node devices II 82 and III 83 are corrected, and the notification packet is relayed.

Upon transmitting a data packet from the terminal equipment I 53 connected to the sub transmission path I 45 of the node device I 81 to the terminal equipment V 57 connected to the sub transmission path V 49 of the node device IV 84, the packet processing unit II 130 in the terminal equipment I 53 assembles a data packet by creating a header portion using a value "3" in a section 97 for indication of the number of relayings corresponding to the terminal equipment V 57 connected to the node device IV 84 as a destination terminal equipment appended to the data portion of the received response packet, and a value "5" in a section 98 for designation of the wavelength in use, setting a value indicating a data packet in a section 99 for identification of the kind of packet, and appending the header portion to the data to be transmitted. The packet processing unit II 130 then outputs the data packet to the I/F unit III 129. The I/F unit III 129 transmits the data packet to the separation-insertion unit I 18 of the node device I 81 via the sub transmission path I 45. The I/F unit B 76 in the separation-insertion unit I 18 of the node device I 81 sequentially writes the data packet in the FIFO D 78. Subsequently, as in the above-mentioned transmission of the notification packet, the data packet is read out under the control of the insertion control unit B 77, and is output to the buffer I 26 via the selector B 80.

In the data packet input to the buffer I 26, the value in the section 97 for indication of the number of relayings is decremented to "2", and thereafter, the data packet is written in a memory area V in correspondence with the value "5" in the section 98 for designation of the wavelength in use. Then, the data packet is transmitted to the neighboring node device II 82 at the downstream side as an optical signal of the wavelength λ5 under the control of the control section 4. In the node device II 82, the data packet is subjected to relaying transmission processing, as will be described below. The data packet output from the node device I 81 as an optical signal of the wavelength λ5 is divided by the divider 9 in the node device II 82, and is received by a fixed wavelength reception unit V 14 that receives only an optical signal of the wavelength λ5. The data packet received by the fixed wavelength reception unit V 14 is output to a separation-insertion unit V 22. In the separation-insertion unit V 22, since the value in the section 97 for indication of the number of relayings is "2", the comparator C 74 outputs a relaying instruction to the demultiplexer C 75, and the data packet is temporarily written in the FIFO E 79. Thereafter, the data packet is output from the selector B 80 to a buffer V 30 under the control of the insertion control unit B 77. The data packet input to the buffer V 30 is input to a subtraction processing unit 134, and the value in the section 97 for indication of the number of relayings is decremented to "1" as in the buffer I 26 in the node device I 81. Thereafter, the packet is re-assembled, and is written in a memory area V in a dual port memory 139. As in the node device I 81, the data packet is transmitted as an optical signal of the wavelength λ5 to the neighboring node device III 83 at the downstream side. The data packet which is received by the node device III 83 as an optical signal of the wavelength λ5 is subjected to the same relaying transmission processing as in the node device II 82, and is transmitted to the node device IV 84 as an optical signal of the wavelength λ5. At this time, the value in the section 97 for indication of the number of relayings has been decremented to "0".

The data packet which is received by the node device IV 84 as an optical signal of the wavelength λ5 is received by the fixed wavelength reception unit V 14 in the node device IV 84, and is output to the separation-insertion unit V 22. A latch C 74 in the separation-insertion unit V 22 stores the value in the section 97 for indication of the number of relayings of the data packet output from the fixed wavelength reception unit V 14, and outputs the stored value to a comparator C 73. Since the value in the section 97 for indication of the number of relayings of the data packet output from the latch C 74 is "0", the comparator C 73 outputs a separation instruction to a demultiplexer C 75. Upon reception of the separation instruction from the comparator C 73, the demultiplexer C 75 outputs the input data packet to an I/F unit B 76. The data packet output to the I/F unit B 76 is transmitted along the sub transmission path V 49, and is received by the terminal equipment V 57 as a destination. After the header portion is removed from the data packet, only the data portion is extracted, and is subjected to required processing.

In this manner, the data packet transmitted from the source terminal equipment I 53 connected to the sub transmission path I 45 of the node device I 81 toward the terminal equipment V 57 connected to the sub transmission path V 49 of the node device IV 84 is output from the variable wavelength transmission unit I 34 in the node device I 81 as an optical signal of the wavelength $\lambda 5$, and thereafter, is relayed by the node devices II 82 and III 83 as an optical signal of the wavelength $\lambda 5$ while the value in the section 97 for indication of the number of relayings is decremented. Thereafter, the separation-insertion unit V 22 in the node device IV 84 detects that the value in the section 97 for indication of the number of relayings is "0", and the data packet is separated and transmitted onto the sub transmission path V 49. Then, the data packet is received by the terminal equipment V 57.

Subsequently, the operation of the first embodiment of the present invention executed when data is transmitted from the terminal equipment I 53 connected to the sub transmission path I 45 of the node device I 81 to a terminal equipment VIII 60 as a destination connected to the distribution processing unit I 25 of the node device IV 84 via a sub transmission path VIII 52 in the example of this system will be explained below. In this embodiment, since the operations associated with transmission of an inquiry packet and a response packet are the same as those described above, a detailed description thereof will be omitted.

Upon transmitting a data packet from the terminal equipment I 53 connected to the sub transmission path I 45 of the node device I 81 to the terminal equipment VIII 60 connected to the distribution processing unit I 25 of the node device IV 84 via the sub transmission path VIII 52, the packet processing unit II 130 in the terminal equipment I 53 assembles a data packet by creating a header portion using a value "4" in a section 97 for indication of the number of relayings corresponding to the terminal equipment VIII 60 connected to the distribution processing unit I 25 of the node device IV 84 via the sub transmission path VIII 52 as a destination terminal equipment appended to the data portion of the received response packet, and a value "8" in a section 98 for designation of the wavelength in use, setting a value indicating a data packet in a section 99 for identification of the kind of packet, and appending the header portion to data to be transmitted. The packet processing unit II 130 then outputs the data packet to the I/F unit III 129. At this time, the value of the number of relayings responded by the response packet is "4", as shown in Table 3 above.

The I/F unit III 129 transmits the data packet to the separation-insertion unit I 18 of the node device I 81 via the sub transmission path I 45. The I/F unit B 76 in the separation-insertion unit I 18 of the node device I 81 sequentially writes the data packet in the FIFO D 78. Subsequently, as in the above-mentioned processing, the data packet is read out under the control of the insertion control unit B 77, and is output to the buffer I 26 via the selector B 80.

Since the data packet input to the buffer I 26 has a value "4" in the section 97 for indication of the number of relayings and a value "8" in the section 98 for designation of the wavelength in use, the decoder 132 sets the writing address counter to generate an address value corresponding to a memory area I on the basis of above-mentioned setting condition 4). Thereafter, the value in the section 97 for indication of the number of relayings is decremented to "3", and the packet is written in the memory area I. Then, the data packet is transmitted to the neighboring node device II 82 at the downstream side as an optical signal of the wavelength $\lambda 1$ under the control of the control section 4.

In the node device II 82, the data packet is subjected to relaying transmission processing. The data packet output from the node device I 81 as an optical signal of the wavelength $\lambda 1$ is divided by the divider 9 in the node device II 82, and is received by the fixed wavelength reception unit I 10 that receives only an optical signal of the wavelength $\lambda 1$. The data packet received by the fixed wavelength reception unit I 10 is output to the separation-insertion unit I 18. In the separation-insertion unit I 18, since the value in the section 97 for indication of the number of relayings is "3", the comparator C 74 outputs a relaying instruction to the demultiplexer C 75, and the data packet is temporarily written in the FIFO E 79. Thereafter, the data packet is output from the selector B 80 to the buffer I 26 under the control of the insertion control unit B 77.

The data packet input to the buffer I 26 is input to the subtraction processing unit 134, and the value in the section 97 for indication of the number of relayings is decremented to "2" as in the buffer I 26 in the node device I 81. Thereafter, the packet is re-assembled, and is written in the memory area I in the dual port memory 139. As in the node device I 81, the data packet is transmitted as an optical signal of the wavelength $\lambda 1$ to the neighboring node device III 83 at the downstream side. The data packet which is received by the node device III 83 as an optical signal of the wavelength $\lambda 1$ is subjected to the same relaying transmission processing as in the node device II 82, and is transmitted to the node device IV 84 as an optical signal of the wavelength $\lambda 1$. At this time, the value in the section 97 for indication of the number of relayings has been decremented to "1".

The data packet which is received by the node device IV 84 as an optical signal of the wavelength $\lambda 1$ is received by a fixed wavelength reception unit I 10 in the node device IV 84, and is output to a separation-insertion unit I 18. In the separation-insertion unit I 18, since the value in the section 97 for indication of the number of relayings is "1", the data packet is output to a buffer I 26.

In the buffer I 26, a decoder 132 decodes the header portion of the data packet. Since the value in the section 97 for indication of the number of relayings is "1" and the value in the section 99 for identification of the kind of packet indicates a data packet, the decoder 132 determines on the basis of setting condition 3) above that the memory area in which the packet is to be written is a memory area VIII corresponding to the wavelength $\lambda 8$ described in the section 98 for designation of the wavelength in use. In the header portion of the data packet output from a latch VI 133, the value "1" in the section 97 for indication of the number of relayings is decremented to "0" by a subtraction processing unit 134.

With this processing, the data packet is written in the memory area VIII, and thereafter, is transmitted from a variable wavelength transmission unit I 34 to a wavelength multiplexer 42 as an optical signal of the wavelength $\lambda 8$. In the wavelength multiplexer 42, the data packet is multiplexed with optical signals of different wavelengths output from other variable wavelength transmission units II 35 to VIII 41, and the multiplexed signal is output to a wavelength demultiplexer 43. The data packet input to the wavelength demultiplexer 43 is demultiplexed since it is optical signal of the wavelength λ8, and is input to a wavelength multiplexer 8 of the own node device VI 84. The data packet input to the wavelength multiplexer 8 is multiplexed with the multiplexed optical signal output from the neighboring node device III 84 at the upstream side and including the wavelengths λ1 to λ7, and is divided by a divider 9. Then, the data packet is received by a fixed wavelength reception unit VIII 17, and is output to a distribution processing unit I 25.

In the distribution processing unit I 25, since the value in the section 97 for indication of the number of relayings in the data packet is "0", a separation instruction is output to a demultiplexer B 67, and the data packet is output to a latch A 64 and a demultiplexer A 62. The latch A 64 stores the value in the section 99 for identification of the kind of packet in the data packet. Since the value in the section 99 for identification of the kind of packet of the data packet is "1", a comparator A 63 outputs an output instruction to the demultiplexer A 62. With this processing, upon reception of the output instruction from the comparator A 63, the demultiplexer A 62 outputs the input data packet to an I/F unit A 61. The data packet output to the I/F unit A 61 is transmitted along the sub transmission path VIII 52, and is then received by the terminal equipment VIII 60 as a destination. After the header portion of the packet is removed, only the data portion is extracted and is subjected to required processing.

In this manner, the data packet transmitted from the source terminal equipment I 53 connected to the sub transmission path I 45 of the node device I 81 toward the terminal equipment VIII 60 connected to the distribution processing unit I 25 of the node device IV 84 via the sub transmission path VIII 52 is output from the variable wavelength transmission unit I 34 in the node device I 81 as an optical signal of the wavelength λ1, and thereafter, is relayed by the node devices II 82 and III 83 as an optical signal of the wavelength λ1 while the value in the section 97 for indication of the number of relayings is decremented. Thereafter, in the buffer I 26 in the node device IV 84, since the value in the section 97 for indication of the number of relayings is "1" and the value in the section 99 for identification of the kind of packet indicates a data packet, the value "1" in the section 97 for indication of the number of relayings is decremented to "0", and the data packet is then written in the memory area VIII. The data packet is transmitted from the variable wavelength transmission unit I 34 as an optical signal of the wavelength λ8, and is demultiplexed by the wavelength demultiplexer 43. Thereafter, the data packet is received by the fixed wavelength reception unit VIII 17 via the wavelength multiplexer 8 and the divider 9. Subsequently, the data packet is output from the distribution processing unit 25, and is received by the terminal equipment VIII 60 as a destination via the sub transmission path VIII 52.

In the above and subsequent embodiments, the packet output function from the distribution processing unit 25 to the packet processing unit I 3 and the output function from the packet processing unit I 3 to the distribution processing unit 25 are attained by the single distribution processing unit 25. However, two different distribution processing units may be arranged, and these output functions may be assigned to these units.

In this embodiment, the inquiry packet output from the terminal equipment VIII 60 may be directly transmitted to the packet processing unit I 3 via the distribution processing unit 25.

Also, in FIGS. 8A and 8B, the optical signal of λ8 output from the wavelength demultiplexer 43 may be directly input to the fixed wavelength reception unit VIII 17 without going through the wavelength multiplexer 8 and the divider 9.

(Second Embodiment)

Figure 11B:
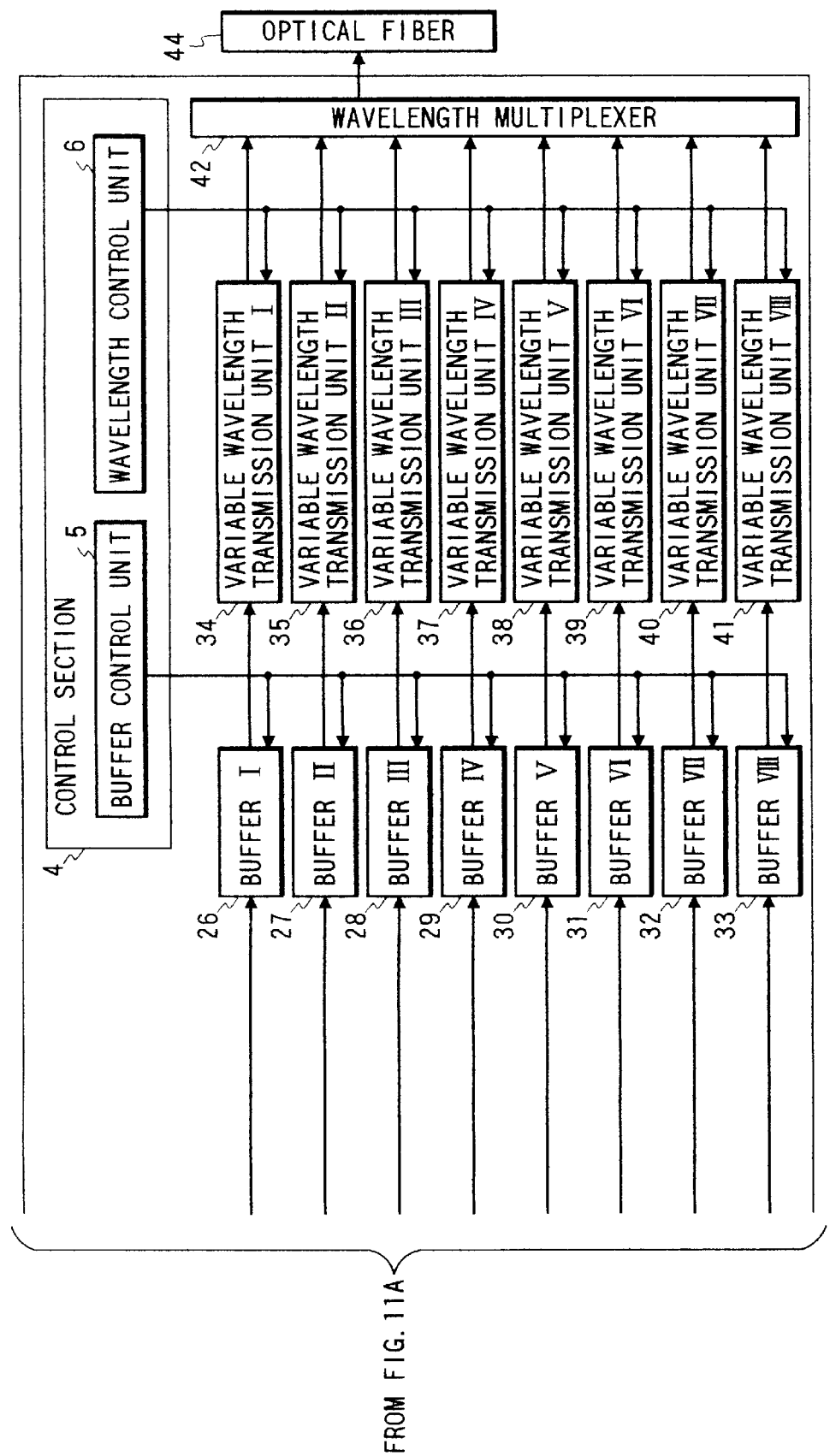
FIG. 11 which comprised of FIGS. 11A and 11B is a block diagram showing the arrangement of a node device according to the second embodiment of the present invention.

FIGS. 11A and 11B show the second embodiments of a node device according to the present invention. In FIGS. 11A and 11B, the portions denoted by the same reference numerals as in FIGS. 8A and 8B perform the same operations as those in the first embodiment. A network system using the node device of this embodiment can use the arrangement shown in FIG. 1 as in the first embodiment.

In the second embodiment of the present invention, a management packet transmitted from each terminal equipment is processed by a packet processing unit I 3 in a neighboring node device at the downstream side in the transmission direction. When a terminal equipment transmits an inquiry packet to the packet processing unit I 3 in the neighboring node device at the downstream side in the transmission direction, a packet processing unit II 130 in the terminal equipment assembles a packet by writing a value "8" for designating a reception wavelength λ8 of a fixed wavelength reception unit 17 that outputs a packet to a distribution processing unit I 25 of the node device in a section 98 for designation of the wavelength in use, setting "1" in a section 97 for indication of the number of relayings, setting a value designating an "inquiry packet" in a section 99 for identification of the kind of packet, and appending these sections to the data (a data portion 100) to be transmitted. Then, the packet processing unit II 130 transmits the packet to one of separation-insertion units or a distribution processing unit of the node device. In the separation-insertion unit or the distribution processing unit, the packet is written in a FIFO via an I/F unit, and is then read out under the control of an insertion control unit. The readout packet is output to a corresponding one of buffers 26 to 33 via a selector. In the buffer, the value in the section 97 for indication of the number of relayings in the header is decremented to "0", and the packet is written in a memory area VIII of a dual port memory. Thereafter, the packet is transmitted from a corresponding one of variable wavelength transmission units 34 to 41 as an optical signal of the wavelength λ8, and is received by a fixed wavelength reception unit VIII 17 in the neighboring node device at the downstream side in the transmission direction. The received packet is output to a distribution processing unit 25 of the neighboring node device. In the distribution processing unit 25, since the value in the section 97 for indication of the number of relayings is "0", the packet is separated in accordance with an instruction from a comparator B 65. Furthermore, since the value in the section 99 for identification of the kind of packet indicates an inquiry packet, a comparator A 63 also outputs a separation instruction, and the packet is output from a demultiplexer A 62 to a packet processing unit I 3.

On the other hand, when a packet is to be transmitted from a packet processing unit I 3 in a node device to a terminal equipment, the packet processing unit I 3 in the node device assembles a packet by setting a value designating a response packet in a section 99 for identification of the kind of packet, and setting values corresponding to the destination terminal equipment in a section 98 for designation of the wavelength in use and a section 97 for indication of the number of relayings, and writes the assembled packet in a FIFO C 71 in a distribution processing unit 25. The response packet written in the FIFO C 71 is read out under the control of an insertion control unit A 68, and is output to a buffer 33 via a selector A 72. In the buffer 33, the value in the section 97 for indication of the number of relayings in the header is decremented, and the packet is written in a memory area corresponding to the wavelength designated by the section 98 for designation of the wavelength in use. Thereafter, the packet is transmitted from a variable wavelength transmission unit 41 as an optical signal of the designated wavelength, and is received by the designated fixed wavelength reception unit in the neighboring node device at the downstream side in the transmission direction. The received packet is output to a separation-insertion unit or a distribution processing unit of the neighboring node device. In the separation-insertion unit or the distribution processing unit, the value in the section 97 for indication of the number of relayings is compared with "0", and if the value is not "0", the packet is output to a buffer again. In the buffer, the section 97 for indication of the number of relayings is decremented, and the packet is then relayed and transmitted from a variable wavelength transmission unit to the neighboring node device at the downstream side in the transmission direction using the designated wavelength. The relaying transmission operation is repeated until the value in the section 97 for indication of the number of relayings becomes "0", and thereafter, the packet is separated by a separation-insertion unit or a distribution processing unit of a node device in which the section 97 is "0". Furthermore, since the value in the section 99 for identification of the kind of packet indicates a response packet, the packet is output to a packet processing unit II 130 of this node device.

When a data packet is to be transmitted from one terminal equipment to another terminal equipment, the terminal equipment inquires as to the values in a section 97 for indication of the number of relayings and a section 98 for designation of the wavelength in use corresponding to the destination terminal equipment, and assembles a data packet by writing the inquiry results in the predetermined sections in the header and appending the header to data to be transmitted. Then, the terminal equipment transmits the data packet to a separation-insertion unit or a distribution processing unit of the node device via a sub transmission path. Thereafter, the data packet is relayed by the respective node devices in the same manner as the relaying transmission operation of a packet transmitted from the packet processing unit I 3 of the node device to a terminal equipment, and when the value in the section 97 for indication of the number of relayings becomes "0", the data packet is separated by a separation-insertion unit or a distribution processing unit of the node device in which the section 97 is "0". Since the value in the section 99 for identification of the kind of packet indicates a data packet, the data packet is output to an I/F unit, and is then output from the I/F unit to a packet processing unit II 130 of a predetermined terminal equipment as the destination via a sub transmission path.

Moreover, when a notification packet is to be transmitted from a packet processing unit I 3 in one node device to that in another node device, the packet processing unit I 3 in the node device assembles a packet by setting a value designating a "notification packet" in a section 99 for identification of the kind of packet, setting an arbitrary value other than "8" in a section 98 for designation of the wavelength in use, and setting a value in a section 97 for indication of the number of relayings in correspondence with the destination node device, and transmits the assembled packet, as described above. In a distribution processing unit 25 in each node device, the relaying transmission operation is repeated until the value in the section 97 for indication of the number of relayings becomes "0". Thereafter, the packet is separated in a distribution processing unit 25 in a node device in which the section 97 is "0", and since the value in the section 99 for identification of the kind of packet indicates a notification packet, the packet is output to a packet processing unit I 3 of this node device.

In the second embodiment, since the wavelength multiplexer 8 and the wavelength demultiplexer 43 required in the first embodiment can be omitted, the number of optical parts can be reduced.

(Third Embodiment)

Figure 12B:
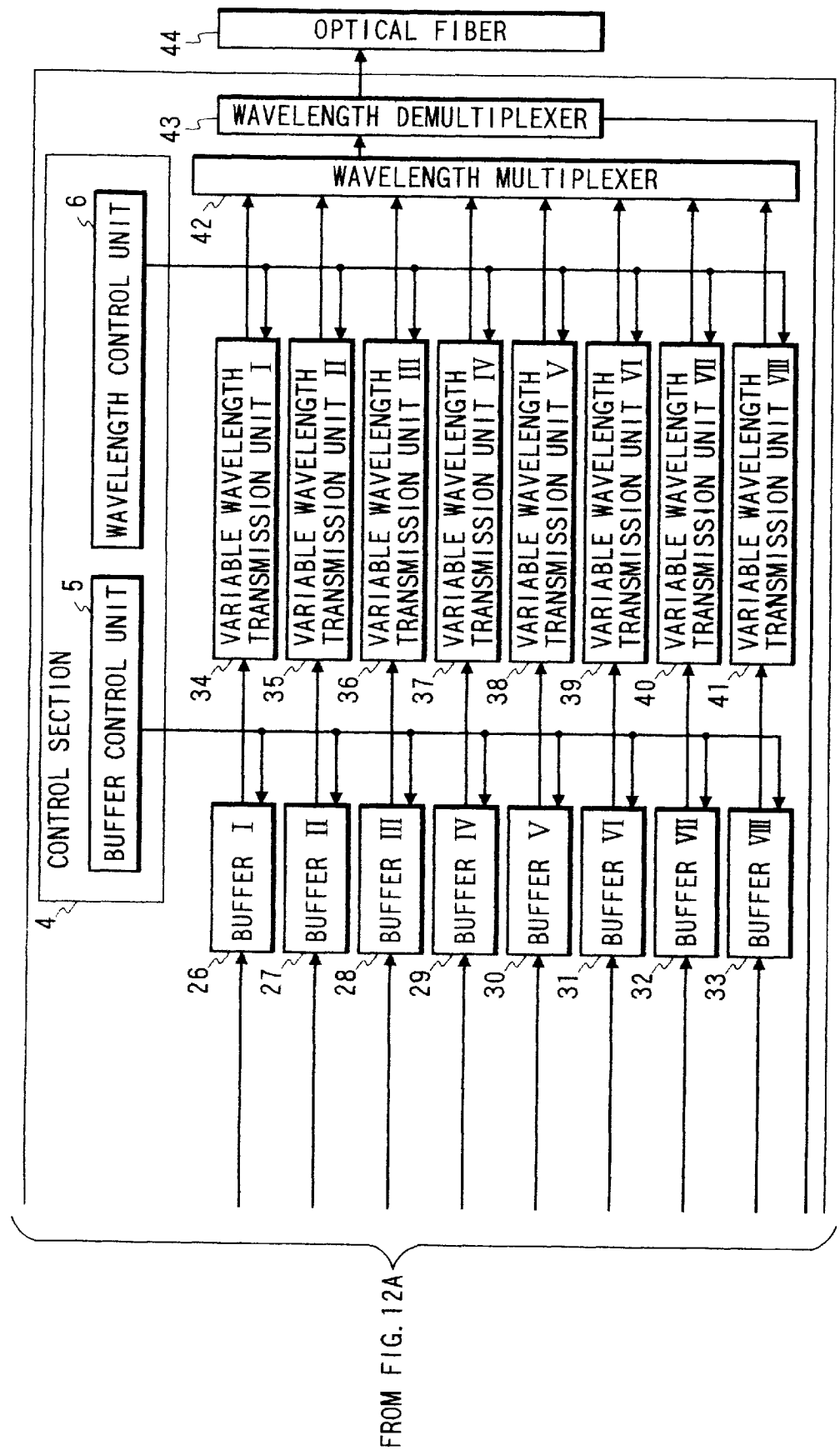
FIG. 12 which comprised of FIGS. 12A and 12B is a block diagram showing the arrangement of a node device according to the third embodiment of the present invention.

FIGS. 12A and 12B show the third embodiments of a node device according to the present invention. The arrangement of this embodiment is substantially the same as that shown in FIGS. 8A and 8B, except that the distribution processing unit I 25, the sub transmission path VIII 52, and the terminal equipment VIII 60 are removed. In FIGS. 12A and 12B, the portions denoted by the same reference numerals as in FIGS. 8A and 8B perform the same operations as those in the first embodiment.

Figure 13:
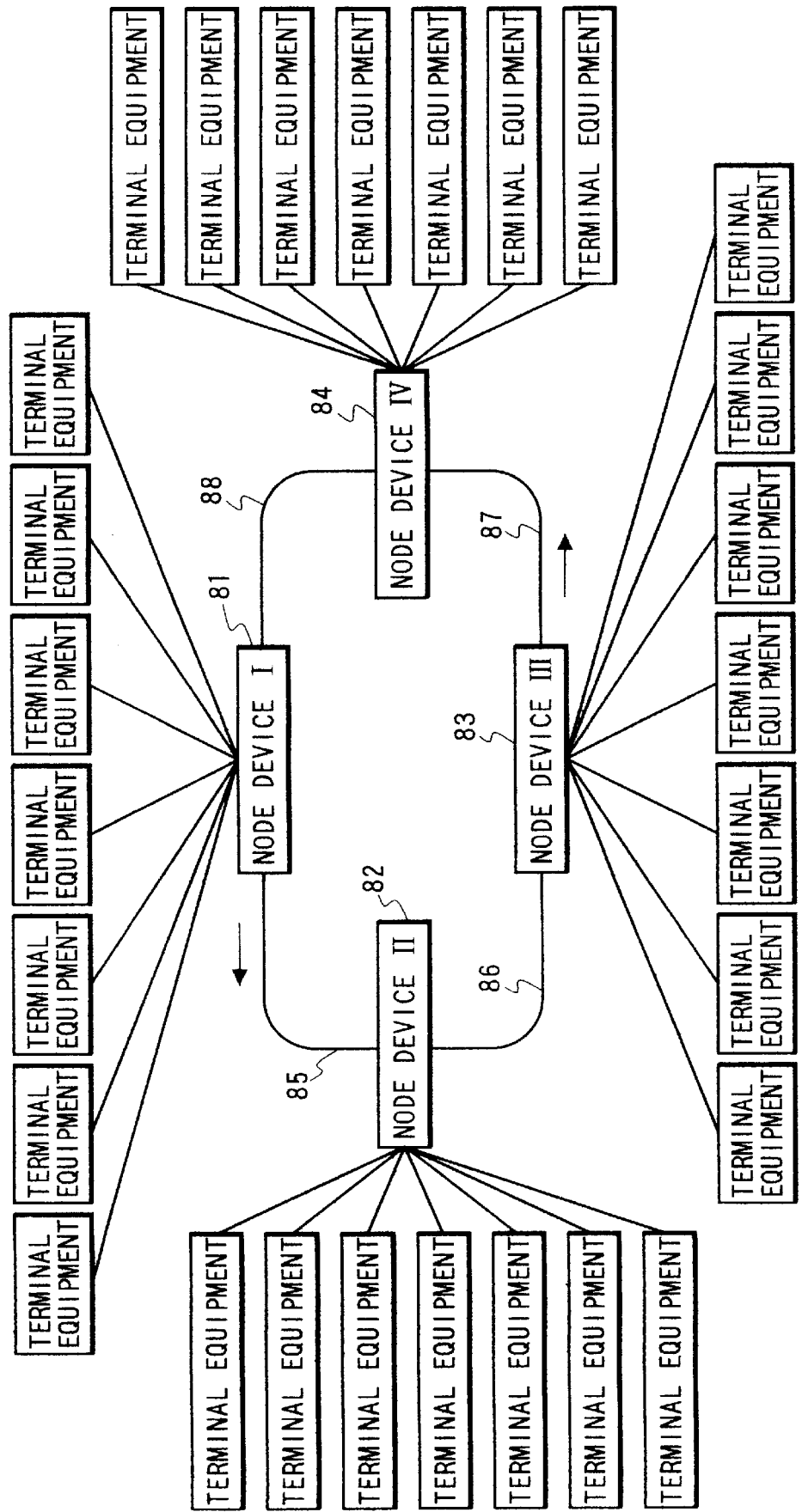
FIG. 13 is a diagram showing the arrangement of a network system using the node devices according to the third embodiment of the present invention.

FIG. 13 shows an example of the arrangement of a network system using the node device according to the present invention shown in FIGS. 12A and 12B, and exemplifies a case wherein four node devices are connected via optical fibers. Node devices 81 to 84 are equivalent to that shown in FIGS. 12A and 12B, and seven terminal equipments are connected to each node device via seven sub transmission paths. Optical fibers 85 to 88 constitute an optical wavelength multiplex transmission path.

In the third embodiment of the present invention, when an inquiry packet is to be transmitted from a terminal equipment to a packet processing unit I 3 in a node device, a packet processing unit II 130 in the terminal equipment assembles a packet by writing, in a section 98 for designation of the wavelength in use, a value "8" for designating the reception wavelength $\lambda 8$ of a fixed wavelength reception unit 17 that outputs a packet to the packet processing unit I 3 of the node device, setting "1" in a section 97 for indication of the number of relayings, and setting a value designating an "inquiry packet" in a section 99 for identification of the kind of packet, and appending these sections to the data to be transmitted. The packet processing unit II 130 then transmits the packet to a separation-insertion unit of the node device via a sub transmission path. In the separation-insertion unit, the packet is written in a FIFO via an I/F unit, and thereafter, is read out under the control of an insertion control unit. The readout packet is output to a corresponding one of buffers 26 to 32 via a selector. In the buffer, the value in the section 97 for indication of the number of relayings is decremented to "0", and the packet is written in a memory area VIII of a dual port memory. Thereafter, the packet is transmitted from a corresponding one of variable wavelength transmission units 34 to 40 as an optical signal of $\lambda 8$, and is demultiplexed by a wavelength demultiplexer 43. The packet is multiplexed by a wavelength multiplexer 8, and is received by a fixed wavelength reception unit VIII 17 of the own node device via a divider 9. Thereafter, the packet is output to the packet processing unit I 3.

When a packet is to be transmitted from a packet processing unit I 3 of a node device to a terminal equipment, the packet processing unit I 3 of the node device assembles a packet by setting a value designating a "response packet" in a section 99 for identification of the kind of packet, and setting values corresponding to the destination terminal equipment in a section 98 for designation of the wavelength in use and a section 97 for indication of the number of relayings, and writes the assembled packet in a buffer VIII 33. In the buffer VIII 33, the value in the section 97 for indication of the number of relayings is decremented, and the packet is written in a memory area corresponding to the wavelength designated by the section 98 for designation of the wavelength in use. Thereafter, the packet is transmitted from a variable wavelength transmission unit 41 as an optical signal of the designated wavelength, and is received by the designated fixed wavelength reception unit in a neighboring node device at the downstream side in the transmission direction. The received packet is output to a separation-insertion unit. In the separation-insertion unit, the value in the section 97 for indication of the number of relayings is compared with "0", and if the value is not "0", the packet is output to a buffer again. In the buffer, the value in the section 97 for indication of the number of relayings is decremented, and the packet is relayed and transmitted to a neighboring node device at the downstream side in the transmission direction using the designated wavelength. The relaying transmission operation is repeated until the value in the section 97 for indication of the number of relayings becomes "0", and thereafter, the packet is separated by a separation-insertion unit. Furthermore, since the value in the section 99 for identification of the kind of packet indicates a response packet, the packet is output to a packet processing unit II 130.

When a data packet is to be transmitted from one terminal equipment to another terminal equipment, the former terminal equipment inquires as to the values in a section 97 for indication of the number of relayings and a section 98 for designation of the wavelength in use corresponding to the destination terminal equipment, and assembles a data packet by writing the inquiry results in the predetermined sections in the header and appending the header to the data to be transmitted. Then, the terminal equipment transmits the data packet to a separation-insertion unit or a distribution processing unit of the own node device via a sub transmission path. Thereafter, the data packet is relayed by the respective node devices in the same manner as the relaying transmission operation of a packet transmitted from the packet processing unit I 3 of the node device to a terminal equipment, and when the value in the section 97 for indication of the number of relayings becomes "0", the data packet is separated by a separation-insertion unit or a distribution processing unit. Since the value in the section 99 for identification of the kind of packet indicates a data packet, the data packet is output to an I/F unit, and is then output from the I/F unit to a packet processing unit II 130 of a predetermined terminal equipment as the destination via a sub transmission path.

Moreover, when a notification packet is to be transmitted from a packet processing unit I 3 in one node device to that in another node device, the packet processing unit I 3 in the former node device assembles a packet by setting a value designating a "notification packet" in a section 99 for identification of the kind of packet, setting an arbitrary value ("1" in this case) other than "8" in a section 98 for designation of the wavelength in use, and setting a value in a section 97 for indication of the number of relayings in correspondence with the destination node device, and transmits the assembled packet, as described above. As described above, the relaying transmission operation is repeated until the value in the section 97 for indication of the number of relayings becomes "0". In a buffer I 26 in the destination node device, the value in the section 97 for indication of the number of relayings is decremented to "0", and the packet is written in a memory area VIII of a dual port memory. Thereafter, the packet is transmitted from a variable wavelength transmission unit 34 as an optical signal of λ8, and is demultiplexed by a wavelength demultiplexer 43. The packet is multiplexed by a wavelength multiplexer 8, and is received by a fixed wavelength reception unit VIII 17 of the own node device via a divider 9. Thereafter, the packet is output to the packet processing unit I 3.

In this embodiment, since no sub transmission path is connected to a channel connected to the packet processing unit, the buffer can determine the memory area (output wavelength) based on only the relaying number information and designated wavelength information independently of the kind of packet.

In this third embodiment, since the distribution processing unit required in the first embodiment can be omitted, the number of electrical parts can be reduced, and the processing in the buffer can be simplified.

In the above and subsequent embodiments, the node device to which a terminal equipment that transmits a packet is connected is considered as the first relaying node device, and the node device which is a destination node device of the packet, and finally receives the packet and outputs the received packet to the terminal equipment side, is not considered as a relaying node. However, the number of relayings of a packet and a value for determining in a node device whether a packet is to be output to the next node device or to the terminal equipment side (in the above embodiments, a packet is output to a terminal equipment or the packet processing unit of the own node device when the value in the section for indication of the number of relayings is "0") may be set assuming that the last node device is a relaying node.

In the above embodiments, one terminal equipment is connected to each sub transmission path. However, the present invention is not limited to this. For example, a plurality of terminal equipments may be connected via a single sub transmission path, or another network may be connected to a sub transmission path, and terminal equipments may be connected to the other network. In order to designate one of a plurality of terminal equipments connected to a single sub transmission path as a destination of a packet, a sub address for designating the terminal equipment can be added to the address of the sub transmission path as the destination address of the packet.

(Fourth Embodiment)

Figure 14:
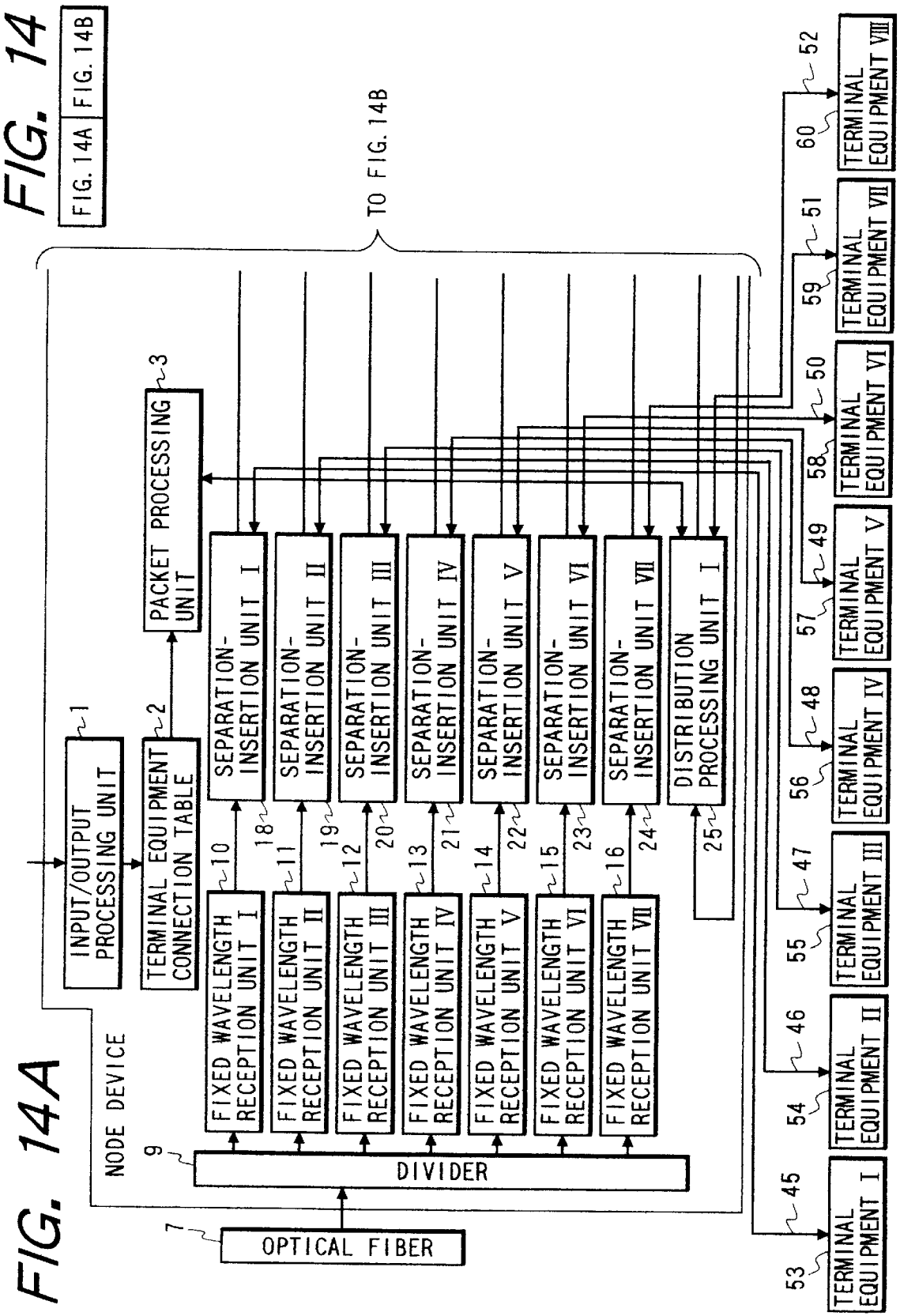
FIG. 14 which comprised of FIGS. 14A and 14B is a block diagram showing the arrangement of a node device according to the fourth embodiment of the present invention.
Figure 14B:
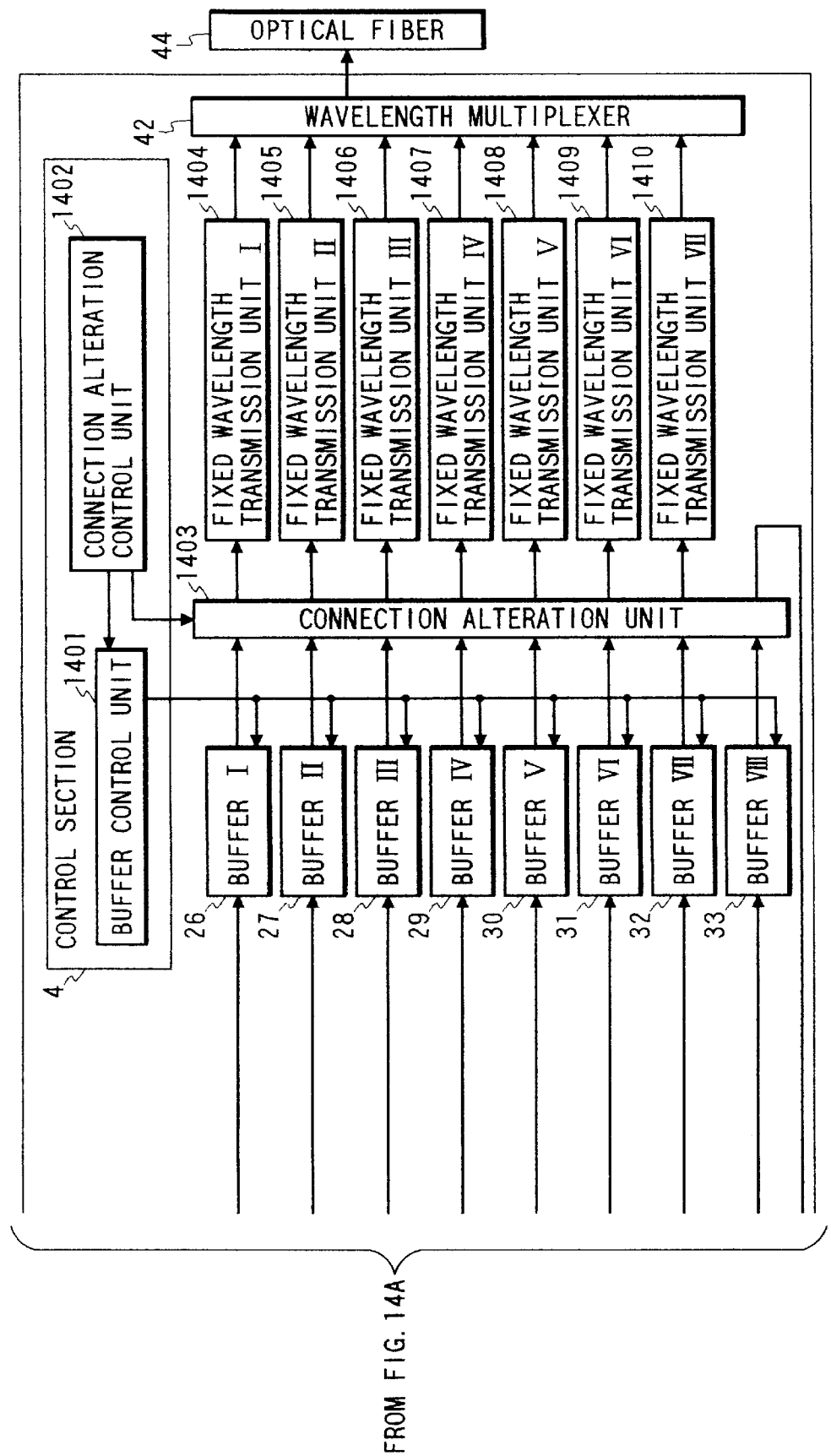

FIGS. 14A and 14B show the fourth embodiments of a node device according to the present invention, which is used in a wavelength multiplex network system using seven wavelengths, i.e., wavelengths λ1 to λ7.

Referring to FIGS. 14A and 14B, a buffer control unit 1401 serves as a buffer control means, and controls the reading operations of packets stored in buffers I 26 to VIII 33 in correspondence with the connection relationship between the input and output terminals of a connection alteration unit 1403 set by a connection alteration control unit 1402. The control contents of the buffer control unit will be described later.

The connection alteration control unit 1402 controls the connection relationship between the input and output terminals of the connection alteration unit 1403 in accordance with a predetermined connection alteration pattern to be described later.

The connection alteration unit 1403 serves as a connection alteration means. Input terminals I to VIII of the connection alteration unit 1403 are respectively connected to the buffers I to VIII, and their output terminals I to VII are respectively connected to fixed wavelength transmission units I 1404 to VII 1410. Also, an output terminal VIII of the connection alteration unit 1403 is connected to a distribution processing unit I 25.

The fixed wavelength transmission units I 1404 to VII 1410 serve as transmission means using semiconductor lasers. Each fixed wavelength transmission unit converts a packet output from the connection alteration unit into an optical signal of a predetermined wavelength, and outputs the converted signal onto an optical fiber as a physical medium of the optical wavelength multiplex transmission path via a wavelength multiplexer 42. As the semiconductor laser, a DFB (Distributed Feed Back) type laser having a multi-electrode structure is used. By controlling the injection current amounts of the respective electrodes of the DFB lasers, the fixed wavelength transmission units I to VII are respectively assigned transmission wavelengths λ1 to λ7.

Figure 15:
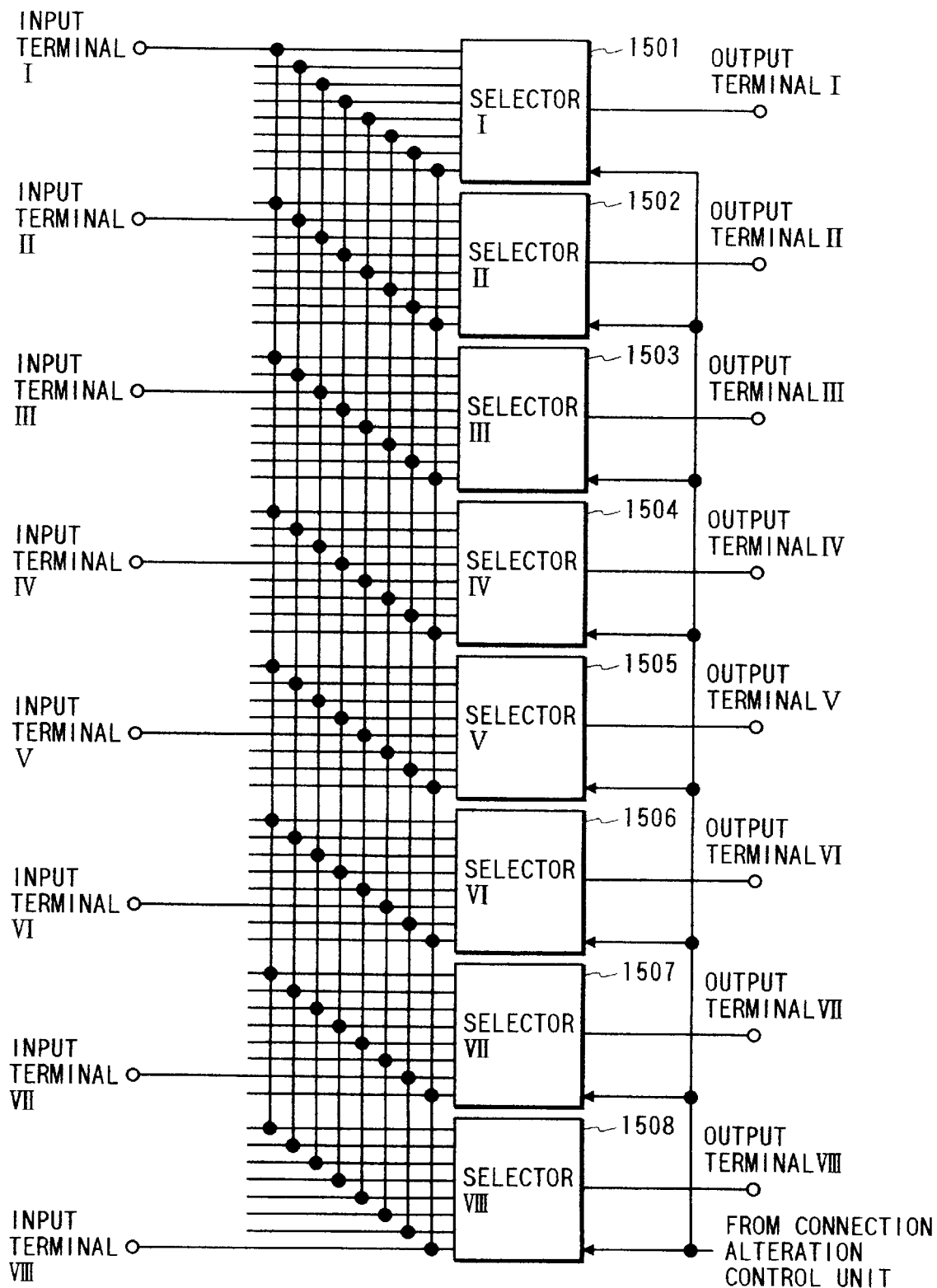
FIG. 15 is a block diagram showing the arrangement of a connection alteration unit according to the fourth embodiment of the present invention.

FIG. 15 shows the internal arrangement of the connection alteration unit used in the fourth embodiment of the present invention. The connection alteration unit has eight input terminals and eight output terminals. Referring to FIG. 15, each of selectors I 1501 to VIII 1508 receives eight signals at the input terminals I to VIII, and outputs a packet input from a predetermined input terminal to a corresponding output terminal in accordance with a selection signal (to be described later) output from the connection alteration control unit. With this processing, the connection relationship between the input and output terminals is set.

Figure 16:
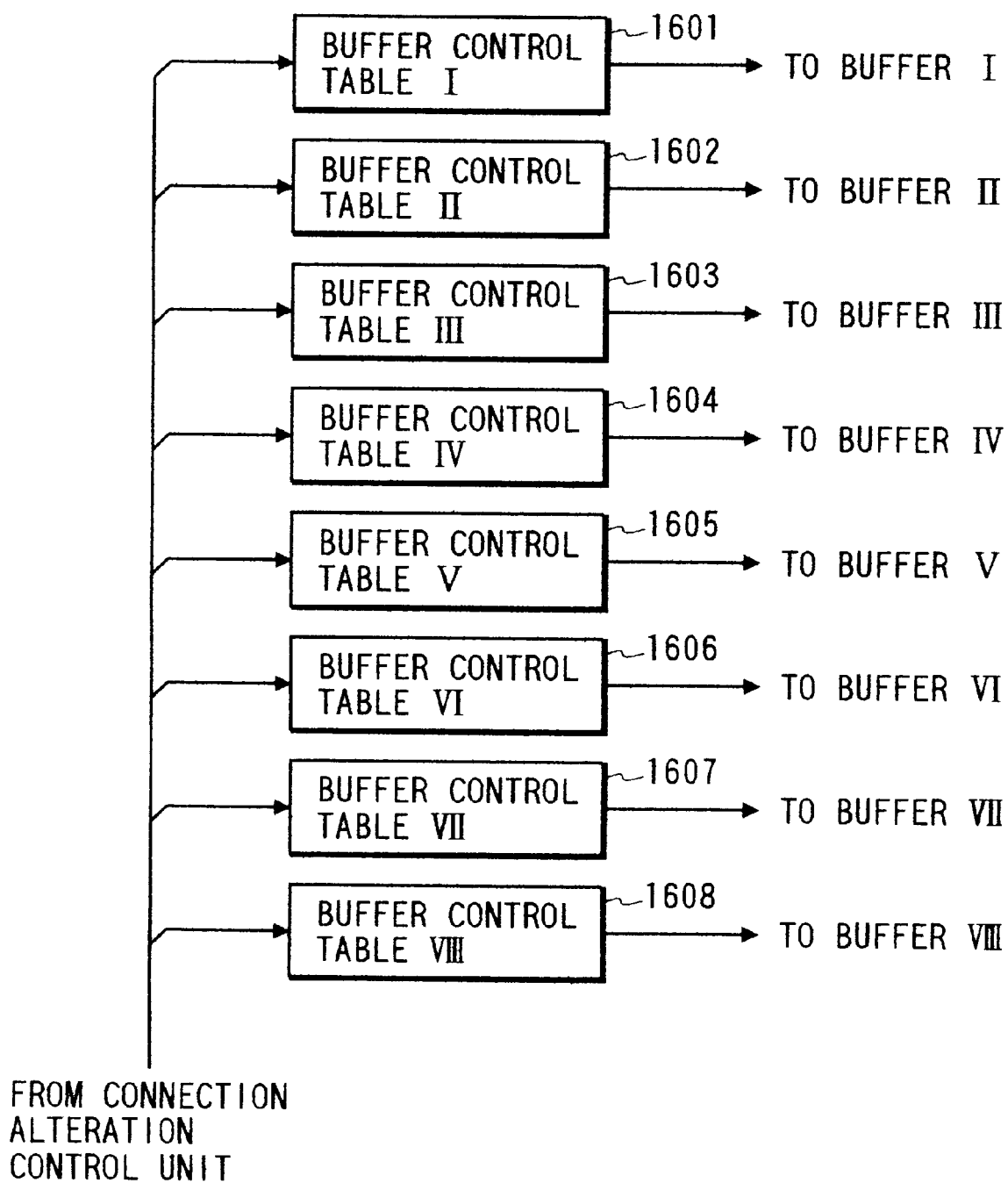
FIG. 16 is a block diagram showing the arrangement of a buffer control unit according to the fourth embodiment of the present invention.

FIG. 16 shows the internal arrangement of the buffer control unit used in the fourth embodiment of the present invention. Referring to FIG. 16, buffer control tables I 1601 to VIII 1608 are sequentially read out in accordance with an address value output from the connection alteration control unit, and output predetermined offset values to the reading address counters of the buffers I to VIII. These tables comprise read-only memories (ROMs). The contents of the buffer control tables I to VIII will be described later.

Figure 17:
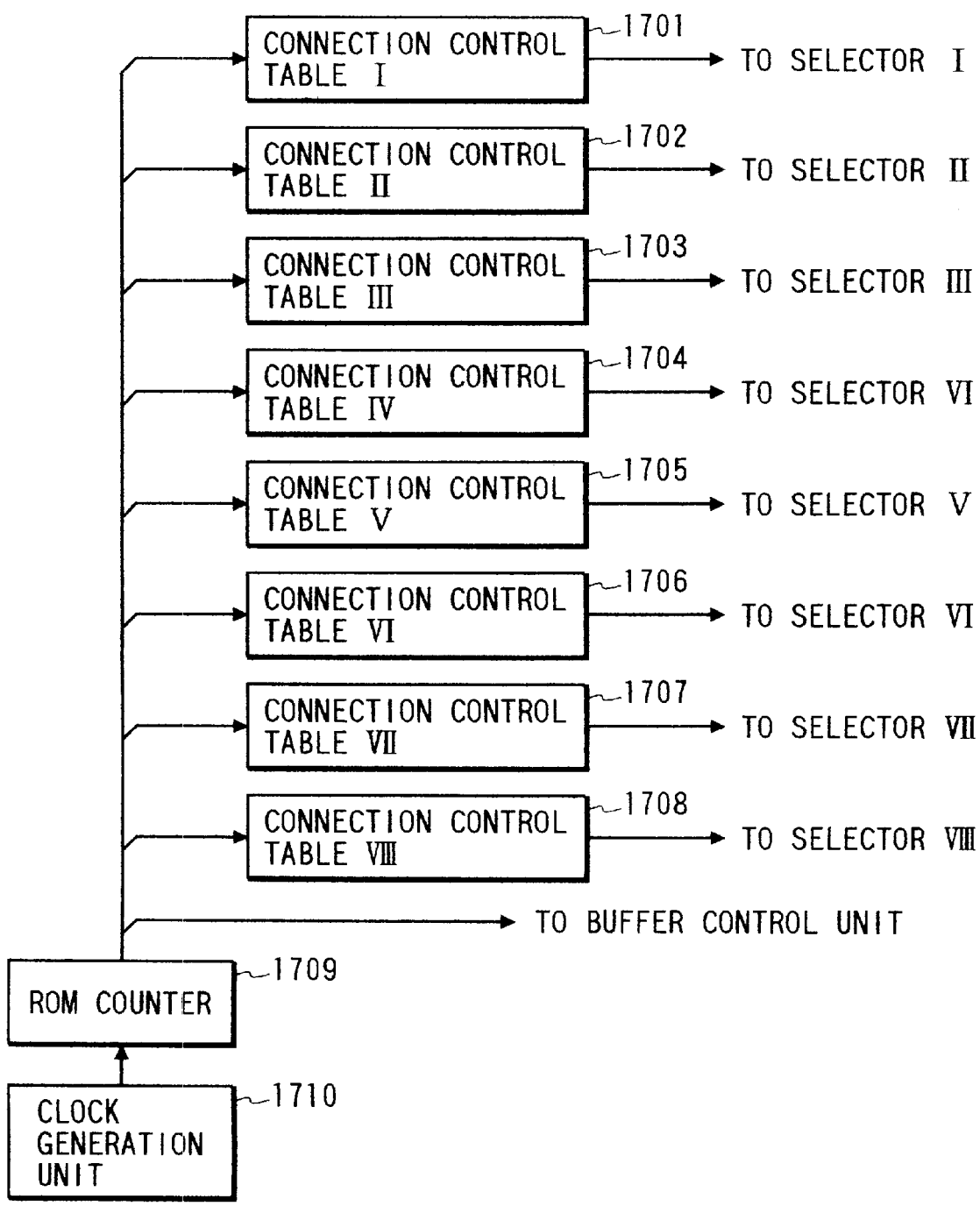
FIG. 17 is a block diagram showing the arrangement of a connection alteration control unit according to the fourth embodiment of the present invention.

FIG. 17 shows the internal arrangement of the connection alteration control unit used in the fourth embodiment of the present invention. Referring to FIG. 17, connection control tables I 1701 to VIII 1708 are sequentially read out in accordance with an address value output from a 3-bit ROM counter 1709, and output predetermined selection signals to the selectors in the connection alteration unit. These tables comprise read-only memories (ROMs). The contents of the connection control tables I to VIII will be described later. The 3-bit ROM counter 1709 counts clock signals output from a clock generator 1710, and outputs a 3-bit address signal to the connection control tables I to VIII and the buffer control tables I to VIII in the buffer control unit. The clock generator 1710 generates a predetermined clock signal and supplies it to the buffer controller. Also, the clock generator 1710 frequency-divides the clock signal and outputs them to the ROM counter.

In the fourth embodiment, the contents of the connection control tables I to VIII are set as shown in Table 4 below.

Table 4 shows the input terminals to be selected by the selectors I to VIII in the connection alteration unit under the control of the connection alteration control unit. Since the selectors I to VIII are respectively connected to the output terminals I to VIII, the connection relationship between the input and output terminals is determined by Table 4. Also, Table 4 is set so that more than one input terminals are not simultaneously connected to a single output terminal. Table 5 below shows the relationship between the input and output terminals set by the connection control tables I to VIII in units of output address values of the ROM counter.

On the other hand, the offset values of the buffer control tables I to VIII are set, as shown in Table 6 below. These 16 tables are synchronously and cyclically read out by the ROM counter. Therefore, the connection relationship between the input and output terminals has a cyclic pattern in which the output terminals to be connected to each input terminal are cyclically set.

TABLE 4

Input Terminals Selected by Selectors

| Table Name | Address | | | | | | | |
|---|---|---|---|---|---|---|---|---|
| | 0 | 1 | 2 | 3 | 4 | 5 | 6 | 7 |
| Connection Control Table I | I | VIII | VII | VI | V | IV | III | II |
| Connection Control Table II | II | I | VIII | VII | VI | V | IV | III |
| Connection Control Table III | III | II | I | VIII | VII | VI | V | IV |
| Connection Control Table IV | IV | III | II | I | VIII | VII | VI | V |
| Connection Control Table V | V | IV | III | II | I | VIII | VII | VI |
| Connection Control Table VI | VI | V | IV | III | II | I | VIII | VII |
| Connection Control Table VII | VII | VI | V | IV | III | II | I | VIII |
| Connection Control Table VIII | VIII | VII | VI | V | IV | III | II | I |

TABLE 5

Relationship Between Input and Output Terminals Connected by Connection Control Tables

| Input Terminal | Address | | | | | | | |
|---|---|---|---|---|---|---|---|---|
| | 0 | 1 | 2 | 3 | 4 | 5 | 6 | 7 |
| Input Terminal I | I | II | III | IV | V | VI | VII | VIII |
| Input Terminal II | II | III | IV | V | VI | VII | VIII | I |
| Input Terminal III | III | IV | V | VI | VII | VIII | I | II |
| Input Terminal IV | IV | V | VI | VII | VIII | I | II | III |
| Input Terminal V | V | VI | VII | VIII | I | II | III | IV |
| Input Terminal VI | VI | VII | VIII | I | II | III | IV | V |
| Input Terminal VII | VII | VIII | I | II | III | IV | V | VI |
| Input Terminal VIII | VIII | I | II | III | IV | V | VI | VII |

TABLE 6

| Table Name | Address | | | | | | | |
|---|---|---|---|---|---|---|---|---|
| | 0 | 1 | 2 | 3 | 4 | 5 | 6 | 7 |
| Buffer Control Table I | A1 | A2 | A3 | A4 | A5 | A6 | A7 | A8 |
| Buffer Control Table II | A2 | A3 | A4 | A5 | A6 | A7 | A8 | A1 |
| Buffer Control Table III | A3 | A4 | A5 | A6 | A7 | A8 | A1 | A2 |
| Buffer Control Table IV | A4 | A5 | A6 | A7 | A8 | A1 | A2 | A3 |
| Buffer Control Table V | A5 | A6 | A7 | A8 | A1 | A2 | A3 | A4 |

TABLE 6-continued

| Table Name | Address | | | | | | | |
|---|---|---|---|---|---|---|---|---|
| | 0 | 1 | 2 | 3 | 4 | 5 | 6 | 7 |
| Buffer Control Table VI | A6 | A7 | A8 | A1 | A2 | A3 | A4 | A5 |
| Buffer Control Table VII | A7 | A8 | A1 | A2 | A3 | A4 | A5 | A6 |
| Buffer Control Table VIII | A8 | A1 | A2 | A3 | A4 | A5 | A6 | A7 |

In Tables 4, 5, and 6 above, when the connection destination of each input terminal is the output terminal I, a value A1 corresponding to a memory area I is assigned as an offset value for reading out data in the dual port memory in the buffer. Likewise, when the connection destinations of the input terminal are respectively the output terminals II, III, IV, V, VI, VII, and VIII, values corresponding to memory areas II, III, IV, V, VI, VII, and VIII are assigned.

Therefore, packets written in the memory areas I to VIII in the buffers are controlled to be read out from the buffers when the input terminals are connected to output terminals corresponding to the respective memory areas.

Figure 1:
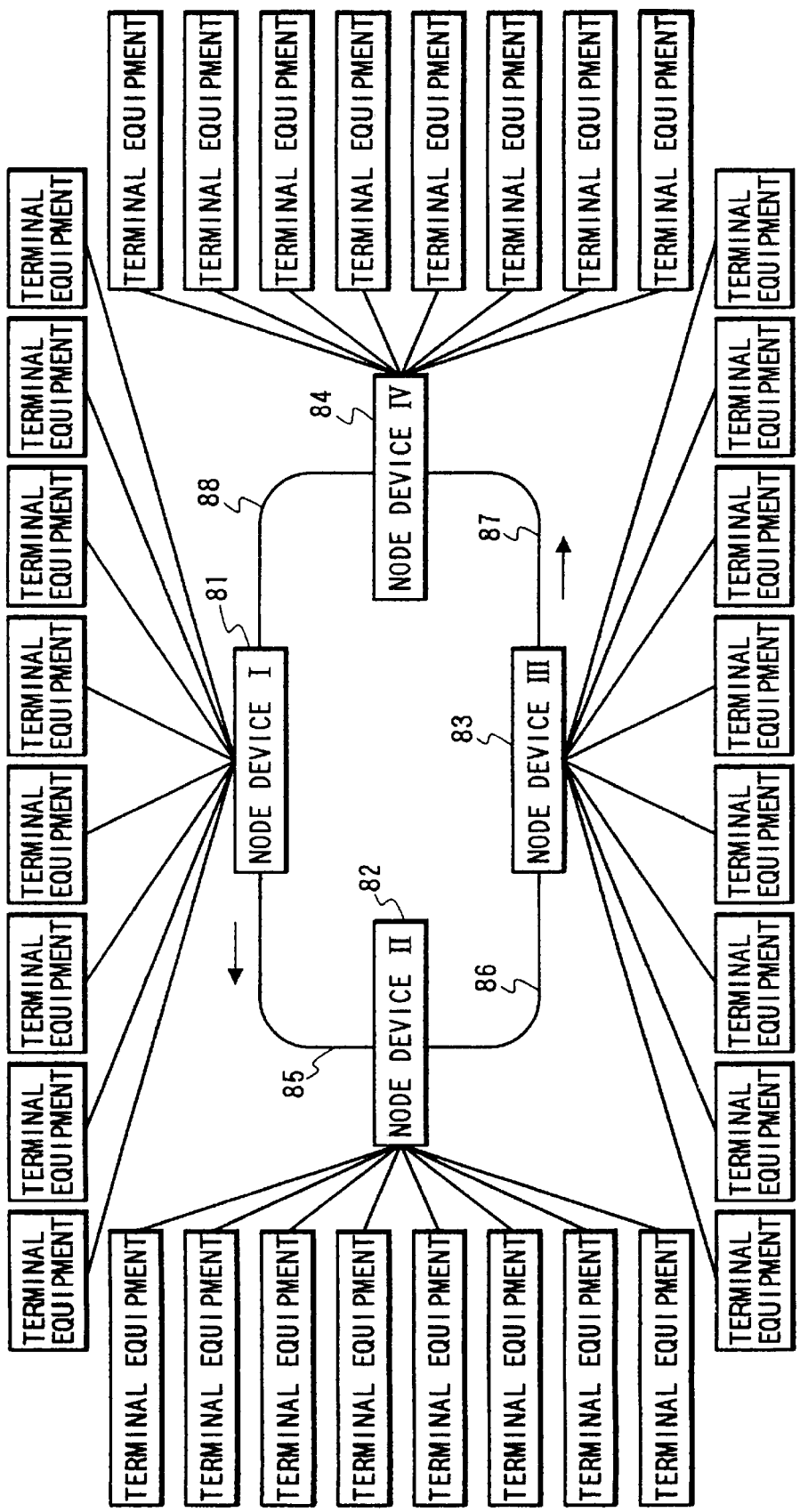
FIG. 1 is a diagram showing an example of the arrangement of a multihop network system.

The operation of the fourth embodiment will be described below with reference to FIGS. 14A, 14B, 15, 16, and 17 while taking as an example a case wherein data is to be transmitted from a terminal equipment I 53 connected to a sub transmission path I 45 of a node device I 81 to a destination terminal equipment V 57 connected to a sub transmission path V 49 of a node device IV 84 in the example of the multihop system shown in FIG. 1. In the following description, the same constituting elements in different node devices and terminal equipments will be denoted by the same reference numerals in FIGS. 14A, 14B, 16, and 17 for the sake of convenience.

Prior to data transmission, the source terminal equipment I 53 that transmits data to the terminal equipment V 57 sends an inquiry packet to the node device I 81 to request for a grant for connection establishment and to inquire as to the values of the number of relayings and the wavelength in use required for transmitting data to the destination terminal equipment V 57. For this purpose, a packet processing unit II 130 in the terminal equipment I 53 assembles an inquiry packet by writing a value "8" in a section 98 for designation of the wavelength in use, setting "1" in a section 97 for indication of the number of relayings, setting a value designating an "inquiry packet" in a section 99 for identification of the kind of packet, and setting, as a data portion 100, identification number "11" of the own terminal equipment, identification number "45" of the terminal equipment V 57 as a destination terminal equipment connected to the sub transmission path V 49 of the node device IV 84, and a required communication band width value Tw. Then, the terminal equipment I 53 outputs the inquiry packet onto the sub transmission path 45 via an I/F unit III 129. The inquiry packet output onto the sub transmission path 45 is input to an I/F unit B 76 of a separation-insertion unit I 18 connected to the sub transmission path I 45 of the node device I 81.

The I/F unit B 76 of the separation-insertion unit 18 of the node device I 81 sequentially writes the inquiry packet transmitted via the sub transmission path I 45 in a FIFO D 78. Upon completion of the writing operation of the inquiry packet in the FIFO D 78, an insertion control unit B 77 detects an end of a packet flow which is being read out from a FIFO E 79, and switches the input from the FIFO to be output from a selector B 80 to the input from the FIFO D 78, stops the reading operation of the FIFO E 79, and starts a reading operation of the FIFO D 78. Upon completion of the reading operation of the inquiry packet written in the FIFO D 78, the insertion control unit B 77 switches the input from the FIFO to be output from the selector B 80 to the input from the FIFO E 79 again, stops the reading operation of the FIFO D 78, and restarts a reading operation of the FIFO E 79. The inquiry packet output from the selector B 80 is input to a buffer I 26.

A demultiplexer VI 131 in the buffer I 26 outputs the header portion of the inquiry packet output from the separation-insertion unit I 18 to a decoder 132 and a latch VI 133, and the data portion 100 to a shift register 135. The decoder 132 decodes the header portion of the inquiry packet. In this packet, since the value in the section 97 for indication of the number of relayings is "1", and the value in the section 99 for identification of the kind of packet indicates an inquiry packet, the decoder 132 determines that the memory area in which the packet is to be written is an area VIII, and outputs the writing start address value of the area VIII to a writing address counter 137.

The latch VI 133 stores the header portion of the inquiry packet, and outputs it to a subtraction processing unit 134. In the header portion of the inquiry packet output from the latch VI 133, the value "1" in the section 97 for indication of the number of relayings is decremented to "0" by the subtraction processing unit 134, and the header portion with the decremented value in the section 97 for indication of the number of relayings is output to a selector V 136. The shift register 135 delays the data portion 100 of the inquiry packet output from the demultiplexer VI 131 by a predetermined period of time, and outputs the delayed data portion 100 to the selector V 136. The selector V 136 re-assembles the inquiry packet with the decremented value "0" in the section 97 for indication of the number of relayings by sequentially selecting the header portion including the value, decremented by the subtraction processing unit 134, in the section 97 for indication of the number of relayings, and the delayed data portion 100 of the inquiry packet output from the shift register 135, and outputs the inquiry packet to a dual port memory 139.

On the other hand, the writing address counter 137 sets the writing start address of the dual port memory 139 in which the inquiry packet is to be written to be A8 in correspondence with the decode result of the inquiry packet output from the decoder 132, and sequentially outputs writing address signals of the packet to the dual port memory 139. Since the input port of the dual port memory 139 receives the re-assembled inquiry packet via the selector V 136, the inquiry packet is sequentially written in the memory area VIII in accordance with the addresses output from the writing address counter 137.

After the inquiry packet is written in the memory area VIII in this manner, when a ROM counter 1709 in a connection alteration control unit 1402 simultaneously outputs a reading address value "7" to connection control tables I to VIII, the contents of the connection control tables are read out in accordance with this address value.

The contents read out at that time are as shown in Table 4 above. More specifically, from the connection control table I, a selection signal for connecting the output terminal I to the input terminal II is read out. Likewise, from the connection control tables II, III, IV, V, VI, VII, and VIII, selection signals for respectively connecting the output terminals II, III, IV, V, VI, VII, and VIII to the input terminals III, IV, V, VI, VII, VIII, and I are read out. These selection signals are input to the selectors I to VIII to select predetermined input terminals, and the selected input terminals are connected to the output terminals.

At the same time, the reading address value "7" output from the ROM counter 1709 in the connection alteration control unit 1402 is input to the buffer control tables in a buffer control unit 1401. The contents of buffer control tables I to VIII are read out in accordance with this address value. The contents read out at that time are as shown in Table 6 above. That is, from the buffer control table I, the offset value A8 corresponding to a memory area VIII is read out. Likewise, from the buffer control tables II, III, IV, V, VI, VII, and VIII, the offset values A1, A2, A3, A4, A5, A6, and A7 respectively corresponding to memory areas I, II, III, IV, V, VI, and VII are read out. These offset values are output to reading address counters 138 of the buffers I 26 to VIII 33, respectively. Upon reception of these control signals, in the buffer I 26, the reading address counter 138 loads the offset value A8 output from a buffer control table I 1601, and sequentially generates addresses for reading out a packet written in the memory area VIII by incrementing a counter. The counter 138 outputs the addresses to the dual port memory 139. Based on these reading addresses, the inquiry packet written in the memory area VIII is sequentially read out from the output port of the dual port memory 139, and is output to the input terminal I of the connection alteration unit.

The inquiry packet read out from the buffer I at this time is output to a distribution processing unit I 25 since the input terminal I is connected to the output terminal VIII.

A latch B 66 in the distribution processing unit I 25 stores the value in the section 97 for indication of the number of relayings in the inquiry packet output from a connection alteration unit 1403, and outputs the stored value to a comparator B 65. Since the value in the section 97 for indication of the number of relayings in the inquiry packet output from the latch B 66 is "0", the comparator B 65 outputs a separation instruction to a demultiplexer B 67. Upon reception of the separation instruction from the comparator B 65, the demultiplexer B 67 outputs the input inquiry packet to a latch A 64 and a demultiplexer A 62. The latch A 64 stores the value in the section 99 for identification of the kind of packet in the inquiry packet, and outputs the stored value to a comparator A 63. Since the value in the section 99 for identification of the kind of packet in the inquiry packet output from the latch A 64 is "0", the comparator A 63 outputs a separation instruction to the demultiplexer A 62. Upon reception of the separation instruction from the comparator A 63, the demultiplexer A 62 outputs the input inquiry packet to a packet processing unit I 3.

The packet processing unit I 3 searches the connection management table for a currently available communication band width, and compares the obtained value with the required communication band width value Tw described in the data portion in the inquiry packet. Then, the packet processing unit I 3 assembles a notification packet to be transmitted to a packet processing unit I 3 in a neighboring node device II 82 at the downstream side in the transmission direction by writing grant or deny information as communication grant/deny indication information in its data portion depending on whether or not the currently available communication band width has a margin for a new communication. At this time, the unit 3 writes an arbitrary value ("1" in this case) other than "8" in a section 98 for designation of the wavelength in use, sets "2" in a section 97 for indication of the number of relayings, and sets a value indicating a "notification packet" in a section 99 for identification of the kind of packet. The communication grant/deny indication information is appended with the identification number of the node device I 81 as the source that transmits these kinds of information. Simultaneously with the assembly of the notification packet, the terminal equipment I 53 connected to the sub transmission path I 45 of the source node device I 81, the terminal equipment V 57 connected to the sub transmission path V 49 of the destination node device IV 84, and the use communication band width value Tw, which are designated in the notification packet, are registered in a connection management table.

The notification packet assembled by the packet processing unit I 3 is written in a FIFO C 71 in the distribution processing unit 25. In the following description, a case will be explained first wherein the required communication band width value Tw is assured, and communication grant indication information is written in the data portion, and a case wherein communication deny indication information is written in the data portion will be described later. The notification packet written in the FIFO C 71 is inserted into a packet flow output from the demultiplexer B 67 under the control of an insertion control unit A 68, and is output from the selector A 72 to a buffer VIII 33.

A demultiplexer VI 131 in the buffer VIII 33 outputs the header portion in the notification packet output from the distribution processing unit I 25 to a decoder 132 and a latch VI 133, and a data portion 100 to a shift register 135, respectively. The decoder 132 decodes the header portion of the notification packet. Since the value in the section 97 for indication of the number of relayings is "2" and the value in the section 98 for designation of the wavelength in use is "1", the decoder 132 determines that the memory area in which the packet is to be written is an area I, and outputs the writing start address value of the area I to a writing address counter 137.

The latch VI 133 stores the header portion of the notification packet, and outputs the stored value to a subtraction processing unit 134. In the header portion of the notification packet output from the latch VI 133, the value "2" in the section 97 for indication of the number of relayings is decremented to "1" by the subtraction processing unit 134, and the decremented value is output to a selector V 136. The shift register 135 delays the data portion 100 of the notification packet output from the demultiplexer VI 131 by a predetermined period of time in the same manner as in the above-mentioned processing of the inquiry packet, and outputs the delayed data portion to the selector V 136. The selector V 136 re-assembles the notification packet with the decremented value "1" in the section 97 for indication of the number of relayings by sequentially selecting the header portion including the value, decremented by the subtraction processing unit 134, in the section 97 for indication of the number of relayings, and the delayed data portion 100 of the notification packet output from the shift register 135, and outputs the notification packet to a dual port memory 139.

On the other hand, the writing address counter 137 sets the writing start address of the dual port memory 139, in which the notification packet is to be written, to be A1 in correspondence with the writing start address value of the memory area I, in which the notification packet is to be written and which is output from the decoder 132, and sequentially outputs writing address signals of the packet to the dual port memory 139. Since the input port of the dual port memory 139 receives the re-assembled notification packet via the selector V 136, the notification packet is sequentially written in the memory area I in accordance with the addresses output from the writing address counter 137.

In this fashion, the notification packet written in the memory area I is sequentially read out according to addresses output from the reading address counter 138 when the input terminal VIII of the connection alteration unit 1403, which terminal is connected to the buffer VIII 33, is connected to the output terminal I connected to a fixed wavelength transmission unit I 1404 under the control of the connection alteration control unit 1402 in a control section 4. Then, the packet is output from the fixed wavelength transmission unit I 1404 as an optical signal of the wavelength λ1, and is multiplexed with optical signals of the wavelengths λ2 to λ7 transmitted from other fixed wavelength transmission units. The multiplexed optical signal is output onto an optical fiber 44, and is input to a divider 9 in the neighboring node device II 82 at the downstream side in the transmission direction.

The multiplexed optical signal of the wavelengths λ1 to λ7 input to the divider 9 is divided, and the divided signals are respectively input to fixed wavelength reception units I 10 to VII 16. In this case, since the notification packet is optical signal light of the wavelength λ1, it is received by the fixed wavelength reception unit I 10 which receives only an optical signal of λ1.

The notification packet received by the fixed wavelength reception unit I 10 is output to a separation-insertion unit I 18. A latch C 74 of the separation-insertion unit I 18 stores the value in the section 97 for indication of the number of relayings in the notification packet output from the fixed wavelength reception unit I 10, and outputs the stored value to a comparator C 73. Since the value in the section 97 for indication of the number of relayings in the notification packet output from the latch C 74 is "1", the comparator C 73 outputs a relaying instruction to a demultiplexer C 75. Upon reception of the relaying instruction from the comparator C 74, the demultiplexer C 75 outputs the input notification packet to a FIFO E 79. The notification packet input to the FIFO E 79 is read out under the control of an insertion control unit B 77, and is output to a buffer I 26 via a selector B 80.

A demultiplexer VI 131 in the buffer I 26 outputs the header portion in the notification packet output from the separation-insertion unit I 18 to a decoder 132 and a latch VI 133, and the data portion 100 to the shift register 135, respectively. The decoder 132 decodes the header portion of the notification packet. Since the value in the section 97 for indication of the number of relayings is "1" and the value in the section 99 for identification of the kind of packet indicates a notification packet, the decoder 132 determines that the memory area in which the packet is to be rewritten is an area VIII. In the header portion of the notification packet output from the latch VI 133, the value "1" in the section 97 for indication of the number of relayings is decremented to "0" by a subtraction processing unit 134.

With the above processing, the notification packet is written in the memory area VIII, and thereafter, is sequentially read out in accordance with addresses output from a reading address counter 138 when the input terminal I of a connection alteration unit 1403, which terminal is connected to the buffer I 26, is connected to the output terminal VIII connected to a distribution processing unit I 25 under the control of a connection alteration control unit 1402 in a control section 4, and is then output to the distribution processing unit I 25. In the distribution processing unit I 25, since the value in the section 97 for indication of the number of relayings in the notification packet is "0", a separation instruction is output to a demultiplexer B 67, and the notification packet is output to a latch A 64 and a demultiplexer A 62. The latch A 64 stores the value in the section 99 for identification of the kind of packet of the notification packet. Since the value in the section 99 for identification of the kind of packet of the notification packet is "0", a comparator A 63 outputs a separation instruction to the demultiplexer A 62. With this processing, the demultiplexer A 62 outputs the notification packet to the packet processing unit I 3.

As in the node device I 81, the packet processing unit I 3 in the node device II 82 searches the connection management table for a currently available communication band width for the relaying transmission operation of the node device II 82, and compares the obtained value with the required communication band width value Tw described in the data portion of the notification packet. After the unit I 3 assembles a notification packet to be transmitted to a packet processing unit I 3 in a node device III 83 by appending communication grant/deny indication information and the identification number of the node device II 82 to the data portion of the received notification packet, it transmits the notification packet. At the same time, the terminal equipment I 53 connected to the sub transmission path I 45 of the source node device I 81, the terminal equipment V 57 connected to the sub transmission path V 49 of the destination node device IV 84, and the use communication band width value Tw, which are designated in the notification packet, are registered in a connection management table.

The notification packet assembled as described above is transmitted in the same manner as in transmission from the packet processing unit I 3 in the node device I 81 to that in the node device II 82, and is received by the packet processing unit I 3 in the node device III 83.

The packet processing unit I 3 in the node device III 83 searches the connection management table for a currently available communication band width for the relaying transmission operation of the node device III 83, and compares the obtained value with the required communication band width value Tw. Thereafter, the unit I 3 appends communication grant indication information or communication deny indication information, and the identification number of the node device III 83 to the data portion of the notification packet, and sends the notification packet to a node device IV 84.

Upon reception of the notification packet, the node device IV 84 searches the data portion for a plurality of pieces of communication grant/deny indication information appended by the respective node devices, i.e., the source node device I 81 to the destination node device IV 84. If all the pieces of information are grant information, a response packet addressed to the terminal equipment I 53 connected to the sub transmission path I 45 of the source node device I 81 is assembled by appending communication start instruction information, data for instructing, as the wavelength in use, λ5 as the reception wavelength of a fixed wavelength reception unit V 14 which outputs a packet to a separation-insertion unit V 22 connected to the destination terminal equipment V 57 of the node device IV 84 via the sub transmission path V 49, and a value "3" in the section 97 for indication of the number of relayings corresponding to the terminal equipment V 57 as the destination terminal equipment connected to the node device IV 84. The response packet is output to a distribution processing unit I 25. At this time, a value "1" indicating the reception wavelength of the fixed wavelength reception unit I 10, which outputs a packet to the separation-insertion unit I 18 to which the terminal equipment I 53 of the node device I 81 is connected via the sub transmission path I 45, is written in the section 98 for designation of the wavelength in use, a value "1" is written in the section 97 for indication of the number of relayings, and a value designating a "response packet" is set in the section 99 for identification of the kind of packet.

The response packet transmitted from a packet processing unit I 3 in the node device IV 84 is input to a buffer VIII 33 via the distribution processing unit I 25, and the value in the section 97 for indication of the number of relayings is rewritten to "0". Thereafter, the response packet is transmitted from a fixed wavelength transmission unit I as an optical signal of the wavelength λ1, and is relayed, as described above. The response packet is received by a fixed wavelength reception unit I 10 in the node device I 81, and is output to the separation-insertion unit I 18. In the separation-insertion unit I 18, since the value in the section 97 for indication of the number of relayings is "0", the response packet is separated by the demultiplexer C 75, and is sent to the packet processing unit II 130 in the terminal equipment I 53 connected to the sub transmission path I 45 via the I/F unit B 76.

Since the communication start instruction information is appended to the data portion of the received response packet, the packet processing unit II 130 in the terminal equipment I 53 starts transmission of a data packet to the terminal equipment V 57 connected to the sub transmission path V 49 of the node device IV 84 as a destination, as will be described later.

On the other hand, when a plurality of pieces of communication grant/deny indication information appended by the respective node devices, i.e., from the source node device I 81 to the destination node device IV 84 to the data portion of the notification packet received by the packet processing unit I 3 in the node device IV 84, include information indicating denial of a communication, the packet processing unit I 3 appends communication stop instruction information to a response packet, and transmits the packet to the source terminal equipment I 53 connected to the sub transmission path I 45 of the node device I 81. When the packet processing unit II in the terminal equipment I 53 receives the response packet appended with the communication stop instruction information, it does not start transmission of a data packet.

At the same time, the packet processing unit I 3 in the node device IV 84 assembles a notification packet by writing a cancel instruction, and the source terminal equipment, the destination terminal equipment, and the required communication band width value Tw registered in the connection management table upon relaying the notification packet, and transmits the notification packet to the node device I 81. This notification packet is relayed as described above, and is received by the packet processing unit I 3 in the node device I 81. The packet processing unit I 3 reads the data portion, and corrects the contents of the connection management table. The packet processing unit I 3 in the node device I 81 further transmits the received notification packet to the node device II 82. Similarly, the contents of the connection management tables in the node devices II 82 and III 83 are corrected, and the notification packet is relayed.

Upon transmitting a data packet from the terminal equipment I 53 connected to the sub transmission path I 45 of the node device I 81 to the terminal equipment V 57 connected to the sub transmission path V 49 of the node device IV 84, the packet processing unit II 130 in the terminal equipment I 53 assembles a data packet by creating a header portion using a value "3" in a section 97 for indication of the number of relayings corresponding to the terminal equipment V 57 connected to the node device IV 84 as a destination terminal equipment appended to the data portion of the received response packet, and a value "5" in a section 98 for designation of the wavelength in use, setting a value indicating a data packet in a section 99 for identification of the kind of packet, and appending the header portion to data to be transmitted. The packet processing unit II 130 then outputs the data packet to the I/F unit III 129. The I/F unit III 129 transmits the data packet to the separation-insertion unit I 18 of the node device I 81 via the sub transmission path I 45. The I/F unit B 76 in the separation-insertion unit I 18 of the node device I 81 sequentially writes the data packet in the FIFO D 78. Subsequently, as in the above-mentioned transmission of the notification packet, the data packet is read out under the control of the insertion control unit B 77, and is output to the buffer I 26 via the selector B 80.

In the data packet input to the buffer I 26, the value in the section 97 for indication of the number of relayings is decremented to "2", and thereafter, the data packet is written in a memory area V in correspondence with the value "5" in the section 98 for designation of the wavelength in use. Then, the data packet is transmitted from a fixed wavelength transmission unit V 1408 to the neighboring node device II 82 at the downstream side as an optical signal of the wavelength λ5 under the control of the control section 4. In the node device II 82, the data packet is subjected to relaying transmission processing, as will be described below. The data packet output from the node device I 81 as an optical signal of the wavelength λ5 is divided by the divider 9 in the node device II 82, and is received by the fixed wavelength reception unit V 14 that receives only an optical signal of the wavelength λ5. The data packet received by the fixed wavelength reception unit V 14 is output to a separation-insertion unit V 22. In the separation-insertion unit V 22, since the value in the section 97 for indication of the number of relayings is "2", the comparator C 74 outputs a relaying instruction to the demultiplexer C 75, and the data packet is temporarily written in the FIFO E 79. Thereafter, the data packet is output from the selector B 80 to a buffer V 30 under the control of the insertion control unit B 77. The data packet input to the buffer V 30 is input to a subtraction processing unit 134, and the value in the section 97 for indication of the number of relayings is decremented to "1" as in the buffer I 26 in the node device I 81. Thereafter, the packet is re-assembled, and is written in a memory area V in a dual port memory 139. As in the node device I 81, the data packet is transmitted from a fixed wavelength transmission unit V 1408 as an optical signal of the wavelength λ5 to the neighboring node device III 83 at the downstream side. The data packet which is received by the node device III 83 as an optical signal of the wavelength λ5 is subjected to the same relaying transmission processing as in the node device II 82, and is transmitted to the node device IV 84 as an optical signal of the wavelength λ5. At this time, the value in the section 97 for indication of the number of relayings has been decremented to "0".

The data packet which is received by the node device IV 84 as an optical signal of the wavelength λ5 is received by the fixed wavelength reception unit V 14 in the node device IV 84, and is output to a separation-insertion unit V 22. A latch C 74 in the separation-insertion unit V 22 stores the value in the section 97 for indication of the number of relayings of the data packet output from a fixed wavelength reception unit V 14, and outputs the stored value to a comparator C 73. Since the value in the section 97 for indication of the number of relayings of the data packet output from the latch C 74 is "0", the comparator C 73 outputs a separation instruction to a demultiplexer C 75. Upon reception of the separation instruction from the comparator C 73, the demultiplexer C 75 outputs the input data packet to an I/F unit B 76. The data packet output to the I/F unit B 76 is transmitted along the sub transmission path V 49, and is received by the terminal equipment V 57 as a destination. After the header portion is removed from the data packet, only the data portion is extracted, and is subjected to required processing.

In this manner, the data packet transmitted from the source terminal equipment I 53 connected to the sub transmission path I 45 of the node device I 81 toward the terminal equipment V 57 connected to the sub transmission path V 49 of the node device IV 84 is output from the variable wavelength transmission unit I 34 in the node device I 81 as an optical signal of the wavelength $\lambda 5$, and thereafter, is relayed by the node devices II 82 and III 83 as an optical signal of the wavelength $\lambda 5$ while the value in the section 97 for indication of the number of relayings is decremented. Thereafter, the separation-insertion unit V 22 in the node device IV 84 detects that the value in the section 97 for indication of the number of relayings is "0", and the data packet is separated and transmitted onto the sub transmission path V 49. Then, the data packet is received by the terminal equipment V 57.

(Fifth Embodiment)

Figure 18B:
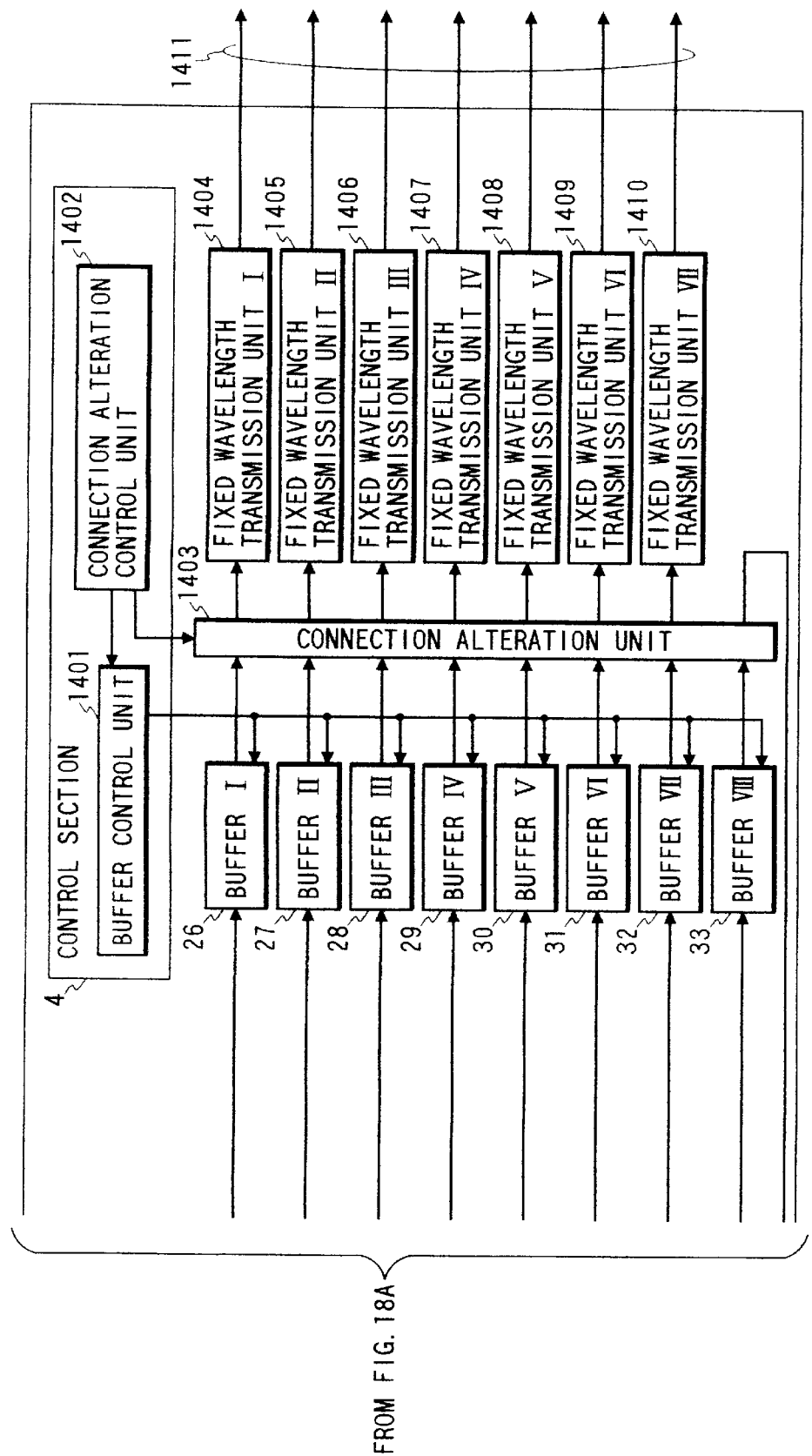
FIG. 18 which comprised of FIGS. 18A and 18B is a block diagram showing the arrangement of a node device according to the fifth embodiment of the present invention.

In the fourth embodiment, adjacent node devices are connected via a single wavelength multiplex transmission path. Alternatively, in this embodiment, as shown in FIGS. 18A and 18B, adjacent node devices are connected via seven optical fibers (which respectively serve as independent channels). In particular, this embodiment uses a ribbon fiber 1411 as a bundle of seven transmission paths (seven optical fibers). Since the arrangement of the fourth embodiment uses the connection alteration unit, the fixed wavelength transmission units in a given node device can have one-to-one correspondence with the fixed wavelength reception units in the neighboring node device, and they may be connected to each other using independent transmission paths. Of course, at this time as well, the transmission paths are bundled (i.e., so-called spatial multiplex), thus allowing easy layout of wiring lines between adjacent node devices.

In this embodiment, the connection alteration unit or the like processes packets in the state of electrical signals, and adjacent node devices exchange packets in the form of optical signals. For this reason, transmission units for converting an electrical signal into an optical signal, reception units for converting an optical signal into an electrical signal, and the like are used. However, when adjacent node devices exchange a packet in the form of an electrical signal, such transmission and reception units may be omitted. In such case, since the signal level to be processed by the connection alteration unit or the like is normally different from that transmitted between adjacent node devices, devices such as drivers or the like are preferably arranged as transmission units.

(Sixth Embodiment)

Figure 19B:
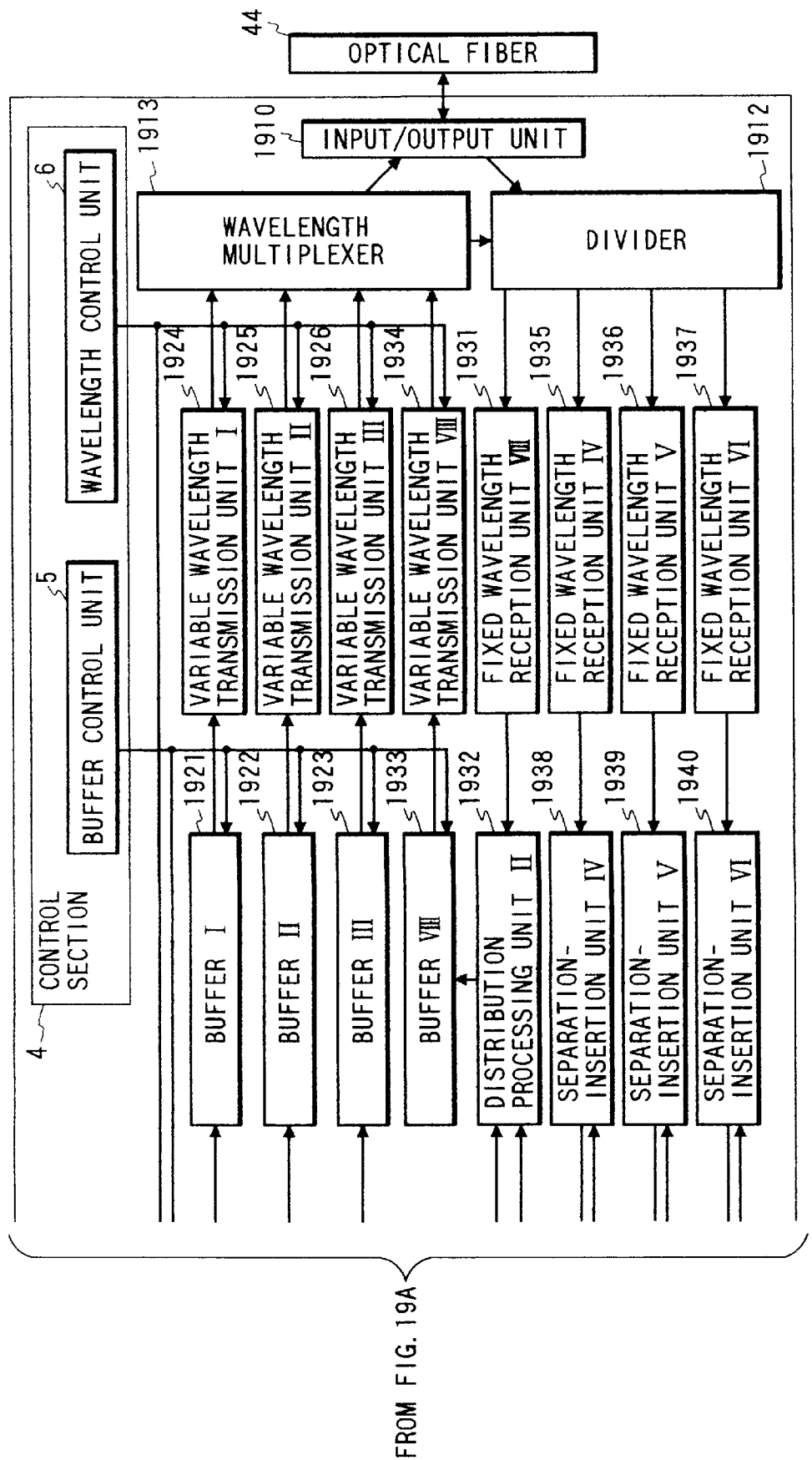
FIG. 19 which comprised of FIGS. 19A and 19B is a block diagram showing the arrangement of a node device according to the sixth embodiment of the present invention.

FIGS. 19A and 19B show the sixth embodiments of a node device according to the present invention, and exemplifies a case wherein eight sub transmission paths are connected to a ring-shaped optical wavelength multiplex transmission path. One terminal equipment is connected to each sub transmission path.

Referring to FIGS. 19A and 19B, an input/output processing unit 1, a connection management unit 2, a packet processing unit I 3, a control section 4, a buffer control unit 5, a wavelength control unit 6, an optical fiber 7, an optical fiber 44, sub transmission paths 45 to 52, and terminal equipments 53 to 60 have the same functions as those in the node device in the above embodiments.

Input/output units 1909 and 1910 respectively output optical signals transmitted via the optical fibers 7 and 44 to dividers 1911 and 1912, and output optical signals output from wavelength multiplexers 1913 and 1914 onto the optical fibers 7 and 44. Each of the dividers 1911 and 1912 divides an optical signal output from a corresponding one of the input/output units 1909 and 1910, and outputs divided signals to four fixed wavelength reception units. Each of the wavelength multiplexers 1913 and 1914 multiplexes optical signals output from four variable wavelength transmission units, and outputs the multiplexed signal to a corresponding one of the input/output units 1909 and 1910.

Fixed wavelength reception units I 1915 to III 1917 serve as first fixed wavelength reception means using photodiodes. Each of the fixed wavelength reception units I 1915 to III 1917 receives only a packet transmitted as an optical signal of a corresponding one of wavelengths $\lambda 1$ to $\lambda 3$. Separation-insertion units I 1918 to III 1920 serve as first separation-insertion means. Each of the separation-insertion units I 1918 to III 1920 has a function of separating a packet to be transmitted onto a corresponding sub transmission path from a packet flow output from a corresponding one of the fixed wavelength reception units 1915 to 1917 and outputting the separated packet onto the sub transmission path, and inserting a packet output from the sub transmission path into a packet flow output from a corresponding one of the fixed wavelength reception units 1915 to 1917. The internal arrangement of the separation-insertion unit will be described later. Buffers I 1921 to III 1923 serve as first buffer means, and have a function of temporarily storing packets output from the separation-insertion units 1918 to 1920. The internal arrangement of the buffer is substantially the same as that shown in FIG. 7, except that the decode operation of a decoder 132 is set as follows.

The memory area designated by the decoder 132 in the buffer is set as follows in this embodiment.

(1) When the value in a section 98 for designation of the wavelength in use in a packet does not indicate the transmission wavelength of a variable wavelength transmission unit to which the own buffer outputs a packet, the decoder 132 designates a memory area corresponding to a loopback transmission wavelength that can be transmitted by the variable wavelength transmission unit.

(2)-1 When the value in a section 98 for designation of the wavelength in use in a packet indicates the loopback transmission wavelength of a variable wavelength transmission unit to which the own buffer outputs a packet, and the value in a section 97 for indication of the number of relayings in this packet is not "1", the decoder 132 designates a memory area corresponding to any one of arbitrary wavelengths other than the loopback transmission wavelengths ($\lambda 7$ and $\lambda 8$) that can be transmitted by the variable wavelength transmission unit.

(2)-2 In a case other than the above-mentioned case, the decoder 132 designates a memory area corresponding to the wavelength described in a section 98 for designation of the wavelength in use in a packet.

Variable wavelength transmission units I 1924 to III 1926 serve as first variable wavelength transmission means using tunable laser diodes (TLDs). Each of these variable wavelength transmission units I 1924 to III 1926 converts a packet output from a corresponding one of the buffers 1921 to 1923 into an optical signal of a predetermined one of the wavelengths $\lambda 1$ to $\lambda 3$ under the control of the wavelength control unit 6, and outputs the converted signal onto the optical fiber 44 serving as the optical wavelength multiplex transmission path via the wavelength multiplexer 1913 and the input/output unit 1910 as an optical signal which is to be transmitted in the first direction. Note that the fixed wavelength reception unit I 1915, the separation-insertion unit I 1918, the buffer I 1921, and the variable wavelength transmission unit I 1924 constitute a set of first basic communication means, and a packet received by the fixed wavelength reception unit I 1915 is processed in this set but is never processed by other sets. Similarly, the fixed wavelength reception unit II 1916, the separation-insertion unit II 1919, the buffer II 1922, and the variable wavelength transmission unit II 1925 also constitute another set of first basic communication means, and the fixed wavelength reception unit III 1917, the separation-insertion unit III 1920, the buffer III 1923, and the variable wavelength transmission unit III 1926 constitute still another set of first basic communication means.

A fixed wavelength reception unit VII 1927 serves as a third fixed wavelength reception means, and receives only a packet transmitted in the first direction as an optical signal of the wavelength λ8 output from the divider 1911. A distribution processing unit I 1928 has a function of separating a packet to be transmitted onto the sub transmission path from a packet flow output from the fixed wavelength reception unit VII 1927 and outputting the separated packet onto the sub transmission path, and of inserting a packet transmitted from the sub transmission path into a packet flow output from the fixed wavelength reception unit VII 1927, and a function of separating a packet to be output to the packet processing unit I 3 from a packet flow output from the fixed wavelength reception unit VII 1927 and outputting the separated packet to the packet processing unit I 3, and of inserting a packet output from the packet processing unit I 3 into a packet flow output from the fixed wavelength reception unit VII 1927. A buffer VII 1929 temporarily stores a packet. A variable wavelength transmission unit VII 1930 serves as a third variable wavelength transmission means. The variable wavelength transmission unit VII 1930 converts a packet output from the buffer VII 1929 into an optical signal of a predetermined one of wavelengths λ4, λ5, λ6, and λ7 under the control of the wavelength control unit 6, and outputs the converted signal onto the optical fiber 7 via the wavelength multiplexer 1914 and the input/output unit 1909 so as to be transmitted in the second direction. The fixed wavelength reception unit VII 1927, the distribution processing unit I 1928, the buffer VII 1929, and the variable wavelength transmission unit VII 1930 constitute a first loopback communication means.

A fixed wavelength reception unit VIII 1931 serves as a fourth fixed wavelength reception means, and receives only a packet transmitted in the second direction as an optical signal of the wavelength λ7 output from the divider 1912. A distribution processing unit II 1932 has the same functions as those of the distribution processing unit I 1928. A buffer VIII 1933 temporarily stores a packet. A variable wavelength transmission unit VIII 1934 serves as a fourth variable wavelength transmission means. The variable wavelength transmission unit VIII 1934 converts a packet output from the buffer VIII 1933 into an optical signal of a predetermined one of wavelengths λ1, λ2, λ3, and λ8 under the control of the wavelength control unit 6, and outputs the converted signal onto the optical fiber 44 via the wavelength multiplexer 1913 and the input/output unit 1910 so as to be transmitted in the first direction. The fixed wavelength reception unit VIII 1931, the distribution processing unit II 1932, the buffer VIII 1933, and the variable wavelength transmission unit VIII 1934 constitute a second loopback communication means.

Fixed wavelength reception units IV 1935 to VI 1937 serve as second fixed wavelength reception means. Each of the fixed wavelength reception units IV 1935 to VI 1937 receives only a packet transmitted as an optical signal of a corresponding one of the wavelengths λ4 to λ6. Separation-insertion units IV 1938 to VI 1940 serve as second separation-insertion means. Buffers IV 1941 to VI 1943 serve as second buffer means. Variable wavelength transmission units IV 1944 to VI 1946 serve as second variable wavelength transmission means. Each of the variable wavelength transmission units IV 1944 to VI 1946 converts a packet output from a corresponding one of the buffers 1941 to 1943 into an optical signal of a predetermined one of the wavelengths λ4 to λ6, and λ7 under the control of the wavelength control unit 6, and outputs the converted signal as an optical signal to be transmitted in the second direction onto the optical fiber 7 as the optical wavelength multiplex transmission path via the wavelength multiplexer 1914 and the input/output unit 1909. The fixed wavelength reception unit VI 1935, the separation-insertion unit IV 1938, the buffer IV 1941, the variable wavelength transmission unit IV 1944 constitute a set of second basic communication means. A packet received by the fixed wavelength reception unit IV 1935 is processed in this set but is never processed in other sets. Likewise, the fixed wavelength reception unit V 1936, the separation-insertion unit V 1939, the buffer V 1942, and the variable wavelength transmission unit V 1945 also constitute another set of second basic communication means, and the fixed wavelength reception unit VI 1937, the separation-insertion unit VI 1940, the buffer VI 1943, and the variable wavelength transmission unit VI 1946 constitute still another set of second basic communication means.

The distribution processing units I 1928 and II 1932 preferably use the arrangement shown in FIG. 9.

The separation-insertion units I 1918 to VI 1940 preferably use the arrangement shown in FIG. 10.

Transmission of a packet between the packet processing units in a terminal equipment and a node device and between node devices in the example of the multihop system shown in FIG. 1 will be explained below in accordance with the operation of the sixth embodiment of the present invention with reference to FIGS. 19A, 19B, 9, 10, 3, 6, and 7. In the following description, the same constituting elements in different node devices and terminal equipments will be denoted by the same reference numerals in FIGS. 19A, 19B, 9, 10, 6, and 7 for the sake of convenience.

A case will be explained below wherein an inquiry packet is to be transmitted from a terminal equipment I 53 connected to a node device I 81 via a sub transmission path I 45 to a packet processing unit I 3 in the node device I 81. As will be described below, this inquiry packet is temporarily transmitted to a node device II 82, and is looped back by a loopback communication means. Thereafter, the inquiry packet is received by a fixed wavelength reception unit VIII 1931 in the node device I 81, and is output to the packet processing unit I 3 via a distribution processing unit II 1932.

For this purpose, a packet processing unit II 130 in the terminal equipment I 53 assembles an inquiry packet by writing a value "7" indicating the reception wavelength of a fixed wavelength reception unit VIII 1931 connected to the distribution processing unit II 1932 that outputs a packet to the packet processing unit I 3 in the node device I 81 in a section 98 for designation of the wavelength in use, setting a value "2" indicating two relaying operations, i.e., the relaying transmission operation in the own node device and the loopback relaying operation in the neighboring node device II 82 at the downstream side in the transmission direction (that is, the packet is relayed by two variable wavelength transmission units) in a section 97 for indication of the number of relayings, setting a value designating an "inquiry packet" ("0" in this case) in a section 99 for identification of the kind of packet, and setting, as a data portion 100, identification number "11" of the own terminal equipment and required management information. Then, the packet processing unit II outputs the packet onto the sub transmission path 45 via an I/F unit III 129. The inquiry packet output onto the sub transmission path 45 is input to an I/F unit B 76 in a separation-insertion unit I 1918 connected to the node device I 81 via the sub transmission path 45.

The I/F unit B 76 in the separation-insertion unit 1918 in the node device I 81 sequentially writes the inquiry packet transmitted via the sub transmission path I 45 in a FIFO D 78. Upon completion of the writing operation of the inquiry packet in the FIFO D 78, an insertion control unit B 77 detects an end of a packet flow, which is being read out from a FIFO E 79, switches the input from the FIFO to be output from a selector B 80 to the input from the FIFO D 78, stops the reading operation of the FIFO E 79, and starts a reading operation of the FIFO D 78. Upon completion of the reading operation of the inquiry packet written in the FIFO D 78, the insertion control unit B 77 switches the input from the FIFO to be output from the selector B 80 to the input from the FIFO E 79 again, stops the reading operation of the FIFO D 78, and restarts a reading operation of the FIFO E 79. The inquiry packet output from the selector B 80 is input to a buffer I 1921.

A demultiplexer VI 131 in the buffer I 1921 outputs the header portion of the inquiry packet output from the separation-insertion unit I 1918 to a decoder 132 and a latch VI 133, and the data portion 100 to a shift register 135. The decoder 132 decodes the header portion of the inquiry packet. In this packet, since the value "7" in the section 98 for designation of the wavelength in use is not the transmission wavelength (the wavelengths $\lambda 1, \lambda 2, \lambda 3$, and $\lambda 8$) of a variable wavelength transmission unit I 1924 to which the own buffer I 1921 outputs a packet, the decoder 132 determines that the memory area in which the packet is to be written is a memory area VIII corresponding to the loopback transmission wavelength $\lambda 8$ that can be transmitted by the variable wavelength transmission unit I 1924, and outputs the writing start address value of the area VIII to a writing address counter 137.

The latch VI 133 stores the header portion of the inquiry packet, and outputs it to a subtraction processing unit 134. In the header portion of the inquiry packet output from the latch VI 133, the value "2" in the section 97 for indication of the number of relayings is decremented to "1" by the subtraction processing unit 134, and the header portion with the decremented value is output to a selector V 136. The shift register 135 delays the data portion 100 of the inquiry packet output from the demultiplexer VI 131 by a predetermined period of time, and outputs the delayed data portion 100 to the selector V 136. The selector V 136 re-assembles the inquiry packet with the decremented value "1" in the section 97 for indication of the number of relayings by sequentially selecting the header portion including the value, decremented by the subtraction processing unit 134, in the section 97 for indication of the number of relayings, and the delayed data portion 100 of the inquiry packet output from the shift register 135, and outputs the inquiry packet to a dual port memory 139.

On the other hand, the writing address counter 137 sets the writing start address of the dual port memory 139 in which the inquiry packet is to be written to be A8 in correspondence with the writing start address value of the memory area VIII, in which the inquiry packet is to be written and which is output from the decoder 132, and sequentially outputs writing address signals of the packet to the dual port memory 139. Since the input port of the dual port memory 139 receives the re-assembled inquiry packet via the selector V 136, the inquiry packet is sequentially written in the memory area VIII in accordance with the addresses output from the writing address counter 137.

After the inquiry packet is written in the memory area VIII in this manner, when the transmission wavelength of the variable wavelength transmission unit I 1924 is set to be $\lambda 8$ under the control of the wavelength control unit 6 in the control section 4, the buffer control unit 5 in the control section 4 outputs an offset value A8 corresponding to the memory area VIII to a reading address counter 138 in the buffer I 1921. Based on the offset value A8, the reading address counter 138 sequentially generates addresses for reading out the inquiry packet stored in the memory area VIII by incrementing a counter, and outputs the addresses to the dual port memory 139. The inquiry packet is read out from the output port of the dual port memory 139 in accordance with the reading addresses, and is output to the variable wavelength transmission unit I 1924. Since the transmission wavelength of the variable wavelength transmission unit I 1924 is set to be $\lambda 8$, the inquiry packet is output from the variable wavelength transmission unit I 1924 to a wavelength multiplexer 1913 as an optical signal of the wavelength $\lambda 8$. In the wavelength multiplexer 1913, the inquiry packet is multiplexed with optical signals of different wavelengths, i.e., the wavelengths $\lambda 1$ to $\lambda 3$ output from other variable wavelength transmission units II 1925, III 1926, and VIII 1934, and the multiplexed optical signal is output onto an optical fiber 44 via an input/output unit 1910. Then, the optical signal is transmitted to the neighboring node device II 82.

The inquiry packet transmitted to the node device II 82 is divided by an input/output unit 1909, and is further divided by a divider 1911 to fixed wavelength reception units I 1915, II 1916, III 1917, and VII 1927. Since the inquiry packet is optical signal of the wavelength $\lambda 8$, it is received by the fixed wavelength reception unit VII 1927 that receives only an optical signal of $\lambda 8$. The inquiry packet received by the fixed wavelength reception unit VII 1927 is output to a distribution processing unit I 1928. A latch B 66 in the distribution processing unit I 1928 stores the value in the section 97 for indication of the number of relayings in the inquiry packet output from the fixed wavelength reception unit VII 1927, and outputs the stored value to a comparator B 65. Since the value in the section 97 for indication of the number of relayings in the inquiry packet output from the latch B 66 is "1", the comparator B 65 outputs a relaying instruction to a demultiplexer B 67. Upon reception of the relaying instruction from the comparator B 65, the demultiplexer B 67 writes the input inquiry packet in a FIFO B 70. The inquiry packet written in the FIFO B 70 is read out under the control of an insertion control unit A 68, and is output to a buffer VII 1929 via a selector A 72.

A demultiplexer VI 131 in the buffer VII 1929 outputs the header portion of the inquiry packet output from the distribution processing unit I 1928 to a decoder 132 and a latch VI 133, and the data portion 100 to a shift register 135 as in the above-mentioned buffer I 1921. The decoder 132 decodes the header portion of the inquiry packet. Since the value "7" in the section 98 for designation of the wavelength in use indicates λ7 as one of transmission wavelengths (λ4, λ5, λ6, and λ7) of a variable wavelength transmission unit VII 1930 to which the own buffer VII 1929 outputs a packet, the decoder 132 determines that the memory area in which the packet is to be written is a memory area VII, and outputs the writing start address value of the area VII to a writing address counter 137. At the same time, a selector V 136 outputs a re-assembled inquiry packet, in which the value in the section 97 for indication of the number of relayings has been decremented to "0" by a subtraction processing unit 134, to a dual port memory 139.

On the other hand, the writing address counter 137 outputs address values corresponding to the memory area VII, in which the inquiry packet is to be written and which is output from the decoder 132, and the inquiry packet is written in the memory area VII. After the inquiry packet is written in the memory area VII in this way, when the transmission wavelength of the variable wavelength transmission unit VII 1930 is set to be λ7 under the control of a wavelength control unit 6 in a control section 4, the inquiry packet is read out in the same manner as described above under the control of a buffer control unit 5 in the control section 4, and is output from the variable wavelength transmission unit VII 1930 to a wavelength multiplexer 1914 as an optical signal of the wavelength λ7. In the wavelength multiplexer 1914, the inquiry packet is multiplexed with optical signals of different wavelengths, i.e., wavelengths λ4 to λ6 output from other variable wavelength transmission units IV 1944, V 1945, and VI 1946, and the multiplexed signal is output onto an optical fiber 7 via the input/output unit 1909. In this manner, the inquiry packet is loopback-transmitted to the node device I 81.

After being loopback-transmitted from the node device II 82 to the node device I 81 as an optical signal of the wavelength λ7, the inquiry packet is divided by a divider 1912 to fixed wavelength reception units IV 1935, V 1936, VI 1937, and VIII 1931 via the input/output unit 1910. Since the inquiry packet is optical signal of the wavelength λ7, it is received by the fixed wavelength reception unit VIII 1931 that receives only an optical signal of λ7. The inquiry packet received by the fixed wavelength reception unit VIII 1931 is output to the distribution processing unit II 1932.

A latch B 66 in the distribution processing unit II 1932 stores the value in the section 97 for indication of the number of relayings in the inquiry packet output from the fixed wavelength reception unit VIII 1932, and outputs the stored value to a comparator B 65. Since the value in the section 97 for indication of the number of relayings in the inquiry packet output from the latch B 66 is "0", the comparator B 65 outputs a separation instruction to a demultiplexer B 67. Upon reception of the separation instruction from the comparator B 65, the demultiplexer B 67 outputs the input inquiry packet to a latch A 64 and a demultiplexer A 62.

The latch A 64 stores the value in the section 99 for identification of the kind of packet in the inquiry packet, and outputs the stored value to the comparator A 63. Since the value in the section 99 for identification of the kind of packet in the inquiry packet output from the latch A 64 is "0", the comparator A 63 outputs a separation instruction to the demultiplexer A 62. Upon reception of the separation instruction from the comparator A 63, the demultiplexer A 62 outputs the input inquiry packet to the packet processing unit I 3. In the packet processing unit I 3, the header portion of the packet is removed, and the data portion is extracted. The data portion is output to the connection management unit 2. In the connection management unit 2, predetermined processing is performed based on the received data.

When an inquiry packet is transmitted from a terminal equipment VIII 60 connected to a sub transmission path VIII 52 of the node device I 81 to its packet processing unit I 3, the inquiry packet is also temporarily transmitted to the node device .II 82, and is looped back by a first loopback communication means. Thereafter, the inquiry packet is received by the fixed wavelength reception unit VIII 1931 of the node device I 81, and is output from the distribution processing unit II 1932 to the packet processing unit I 3.

On the other hand, when an inquiry packet is transmitted from one of terminal equipments 56 to 59 connected to sub transmission paths 48 to 51 of the node device I 81 to its packet processing unit I 3, the inquiry packet is temporarily transmitted to a node device IV 84, and is looped back by a second loopback communication means. Thereafter, the inquiry packet is received by the fixed wavelength reception unit VII 1927 of the node device I 81, and is output from a distribution processing unit I 1928 to the packet processing unit I 3.

A case will be described below wherein a response packet is sent back from the packet processing unit I 3 in the node device I 81 to the terminal equipment I 53 connected to the sub transmission path I 45 of the node device I 81.

The packet processing unit I 3 assembles a response packet in which data to be sent to the terminal equipment I 53 is written. At this time, "1" as the reception wavelength of the fixed wavelength reception unit I 1915 that outputs a packet to the separation-insertion unit I 1918 to which the terminal equipment I 53 is connected via the sub transmission path I 45 is written in a section 98 for designation of the wavelength in use, "2" is set in a section 97 for indication of the number of relayings, and a value designating a "response packet" ("1" in this case) is set in a section 99 for identification of the kind of packet. The response packet assembled by the packet processing unit I 3 is written in a FIFO C 71 in the distribution processing unit I 1928. The response packet written in the FIFO C 71 is inserted into a packet flow output from a demultiplexer B 67 under the control of an insertion control unit A 68, and is output to a buffer VII 1929 via a selector A 72.

A demultiplexer VI 131 in the buffer VII 1929 outputs the header portion of the response packet output from the distribution processing unit I 1928 to a decoder 132 and a latch VI 133 and a data portion 100 to a shift register 135. The decoder 132 decodes the header portion of the response packet. In this case, since the value "1" in the section 98 for designation of the wavelength in use corresponds to none of the transmission wavelengths (λ4, λ5, λ6, and λ7) of a variable wavelength transmission unit VII 1930 to which the own buffer VII 1929 outputs a packet, the decoder 132 determines that the memory area in which the packet is to be written is a memory area VII corresponding to the loopback transmission wavelength λ7 that can be transmitted by the variable wavelength transmission unit VII 1930, and outputs the writing start address value of the area VII to a writing address counter 137. At the same time, a selector V 136 outputs a re-assembled response packet in which the value in the section 97 for indication of the number of relayings has been decremented to "0" by a subtraction processing unit 134 to a dual port memory 139, in the same manner as described above.

On the other hand, the writing address counter 137 outputs address values corresponding to the memory area VII, in which the response packet is to be written, output from the decoder 132, and the response packet is written in the memory area VII. In this manner, the response packet written in the memory area VIII is read out under the control of the buffer control unit 5 in the control section 4, and is transmitted from the variable wavelength transmission unit VII 1930 to a wavelength multiplexer 1914 as an optical signal of the wavelength λ7. In the wavelength multiplexer 1914, the response packet is multiplexed with optical signals of different wavelengths, i.e., the wavelengths λ4 to λ6 output from other variable wavelength transmission units IV 1944, V 1945, and VI 1946, and the multiplexed signal is output onto the optical fiber 7 via an input/output unit 1909. The response packet is then transmitted to the node device IV 84.

The response packet transmitted from the node device I 81 to the node device IV 84 as an optical signal of the wavelength λ7 is received by a fixed wavelength reception unit VIII 1931 that receives only an optical signal of the wavelength λ7, in the same manner as described above. The response packet received by the fixed wavelength reception unit VIII 1931 is output to a distribution processing unit II 1932. In the distribution processing unit II 1932, since the value in the section 97 for indication of the number of relayings in the response packet is "1", a comparator B 65 outputs a relaying instruction, and the response packet is output to a buffer VIII 1933.

A decoder 132 in the buffer VIII 1933 decodes the header portion of the response packet. Since the value "1" in the section 98 for designation of the wavelength in use is λ1 as one of the transmission wavelengths (λ1, λ2, λ3, and λ8) of a variable wavelength transmission unit VIII 1934 to which the own buffer VIII 1933 outputs a packet, the decoder 132 determines a memory area I as one in which the packet is to be written, and outputs the writing start address value of the area I to a writing address counter 137. At the same time, a selector V 136 outputs a re-assembled response packet in which the value in the section 97 for indication of the number of relayings has been decremented to "0" by a subtraction processing unit 134 to a dual port memory 139, in the same manner as described above.

On the other hand, the writing address counter 137 outputs address values corresponding to the memory area I, in which the response packet is to be written, output from the decoder 132, and the response packet is written in the memory area I. In this way, the response packet written in the memory area I is then read out, as described above, and is transmitted to the node device I 81 as an optical signal of the wavelength λ1.

The response packet transmitted from the node device IV 84 to the node device I 81 as an optical signal of the wavelength λ1 is divided by a divider 1911 via an input/output unit 1909, and is received by the fixed wavelength reception unit I 1915 that receives only an optical signal of the wavelength λ1. The response packet received by the fixed wavelength reception unit I 1915 is output to the separation-insertion unit I 1918.

In the separation-insertion unit I 1918, since the value in the section 97 for indication of the number of relayings in the response packet is "0", a separation instruction is output to the demultiplexer C 75, and the response packet is separated to the I/F unit B 76. Then, the response packet is transmitted to the. terminal equipment I 53 via the sub transmission path 45. In the terminal equipment I 53, the transmitted response packet is output to a packet processing unit II 130 via the I/F unit III 129, and the header portion of the packet is removed to extract the data portion. Based on the extracted data, predetermined processing is performed.

When a response packet is to be transmitted from the packet processing unit I of the node device I 81 to the terminal equipment VII 59 connected to the sub transmission path VII 51, the response packet is temporarily transmitted to the node device IV 84, and is looped back by a second loopback communication means. Thereafter, the response packet is received by the fixed wavelength reception unit VII 1927 of the node device I 81, and is output from the distribution processing unit I 1928 to the terminal equipment VII 59.

When a response packet is to be transmitted from the packet processing unit I of the node device I 81 to one of the terminal equipments 56 to 58 and 60 connected to the sub transmission paths 48 to 50 and 52, the response packet is temporarily transmitted to the node device II 82, and is looped back by a first loopback communication means. Thereafter, the response packet is received by one of the fixed wavelength reception units 1931 and 1935 to 1937, and is output from one of separation-insertion units 1938 to 1940 or the distribution processing unit I 1928 to one of the terminal equipments 56 to 58 and 60.

Subsequently, a case will be described below wherein a notification packet for transmitting internode management information and the like is to be sent from the packet processing unit I 3 in the node device I 81 to a packet processing unit I 3 in the node device II 82.

The packet processing unit I 3 in the node device I 81 assembles a notification packet by writing, in a section 98 for designation of the wavelength in use, a value "8" as the reception wavelength of the fixed wavelength reception unit VII 1927 connected to the distribution processing unit I 1928 that outputs a packet to the packet processing unit I 3 in the node device II 82, setting "1" indicating only the own node device in a section 97 for indication of the number of relayings, and setting a value "0" indicating a "notification packet" in a section 99 for identification of the kind of packet, and required internode management information in a data portion 100. Then, the packet processing unit I 3 writes the notification packet in a FIFO C 71 in the distribution processing unit II 1932. The notification packet written in the FIFO C 71 is inserted into a packet flow output from a demultiplexer B 67 under the control of an insertion control unit A 68, and is output to a buffer VIII 1933 via a selector A 72.

A demultiplexer VI 131 in the buffer VIII 1933 outputs the header portion of the notification packet output from the distribution processing unit II 1932 to a decoder 132 and a latch VI 133 and the data portion 100 to a shift register 135. The decoder 132 decodes the header portion of the notification packet. In this case, since the value "8" in the section 98 for designation of the wavelength in use is the loopback transmission wavelength (λ8) of the variable wavelength transmission unit VIII 1934 to which the own buffer VIII 1933 outputs a packet, and the value in the section 97 for indication of the number of relayings is "1", the decoder determines a memory area VIII corresponding to the transmission wavelength λ8 as a memory area in which the packet is to be written, and outputs the writing start address value of the area VIII to a writing address counter 137. As in the above processing, a selector V 136 outputs a re-assembled notification packet in which the value in the section 97 for indication of the number of relayings has been decremented to "0" by a subtraction processing unit 134 to a dual port memory 139.

On the other hand, the writing address counter 137 outputs address values corresponding to the memory area VIII, in which the notification packet is to be written and which is output from the decoder 132, and the notification packet is written in the memory area VIII. In this manner, the notification packet written in the memory area VIII is read out as in the above processing, and is transmitted from the node device I 81 to the node device II 82 as an optical signal of the wavelength λ8. Then, the notification packet is received by the fixed wavelength reception unit VII 1927 that receives only an optical signal of the wavelength λ8. The notification packet received by the fixed wavelength reception unit VII 1927 is output to the distribution processing unit I 1928.

In the distribution processing unit I 1928, since the value in the section 97 for indication of the number of relayings in the notification packet output from the fixed wavelength reception unit VII 1927 is "0", a comparator B 65 outputs a separation instruction to a demultiplexer B 67, and the notification packet is output to a latch A 64 and a demultiplexer A 62. The latch A 64 stores the value in the section 99 for identification of the kind of packet in the notification packet, and outputs the stored value to a comparator A 63. Since the value in the section 99 for identification of the kind of packet in the notification packet output from the latch A 64 is "0", the comparator A 63 outputs a separation instruction to the demultiplexer A 62. Upon reception of the separation instruction from the comparator A 63, the demultiplexer A 62 outputs the input notification packet to the packet processing unit I 3. In the packet processing unit I 3, the header portion of the packet is removed to extract the data portion, and the data portion is output to a connection management unit 2. In the connection management unit 2, predetermined processing is performed on the basis of the received data.

When a notification packet for transmitting internode management information and the like is to be sent from the packet processing unit I 3 of the node device I 81 to a packet processing unit I 3 in a non-adjacent, remote node device, a value indicating the number of node devices including the own node device and node devices to be hopped may be designated in a section 97 for indication of the number of relayings. In this case, a decoder in a node device to be hopped designates a memory area in accordance with case (2)-1 above.

(Seventh Embodiment)

Figure 20:
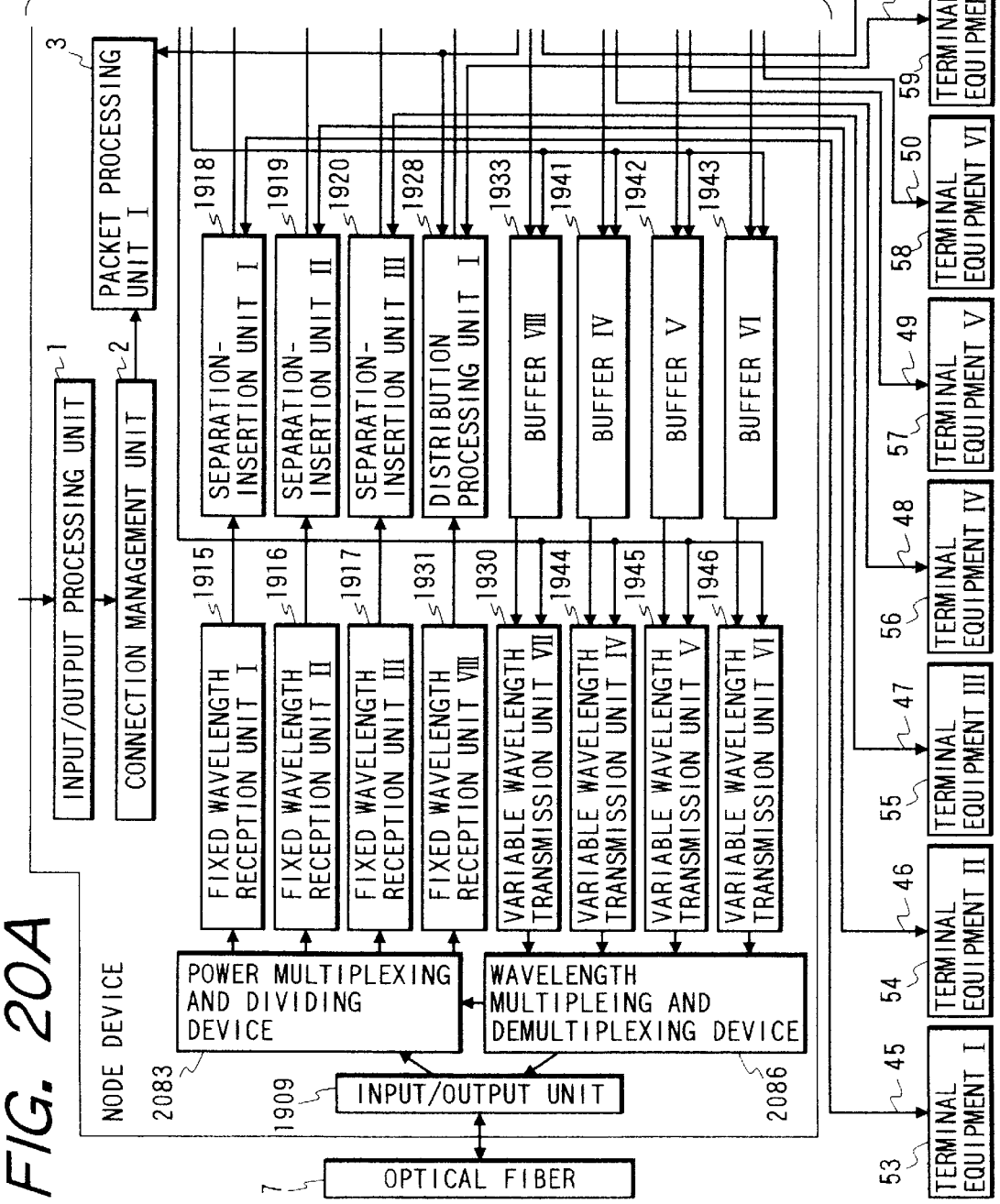
FIG. 20 which comprised of FIGS. 20A and 20B is a block diagram showing the arrangement of a node device according to the seventh embodiment of the present invention.
Figure 20B:
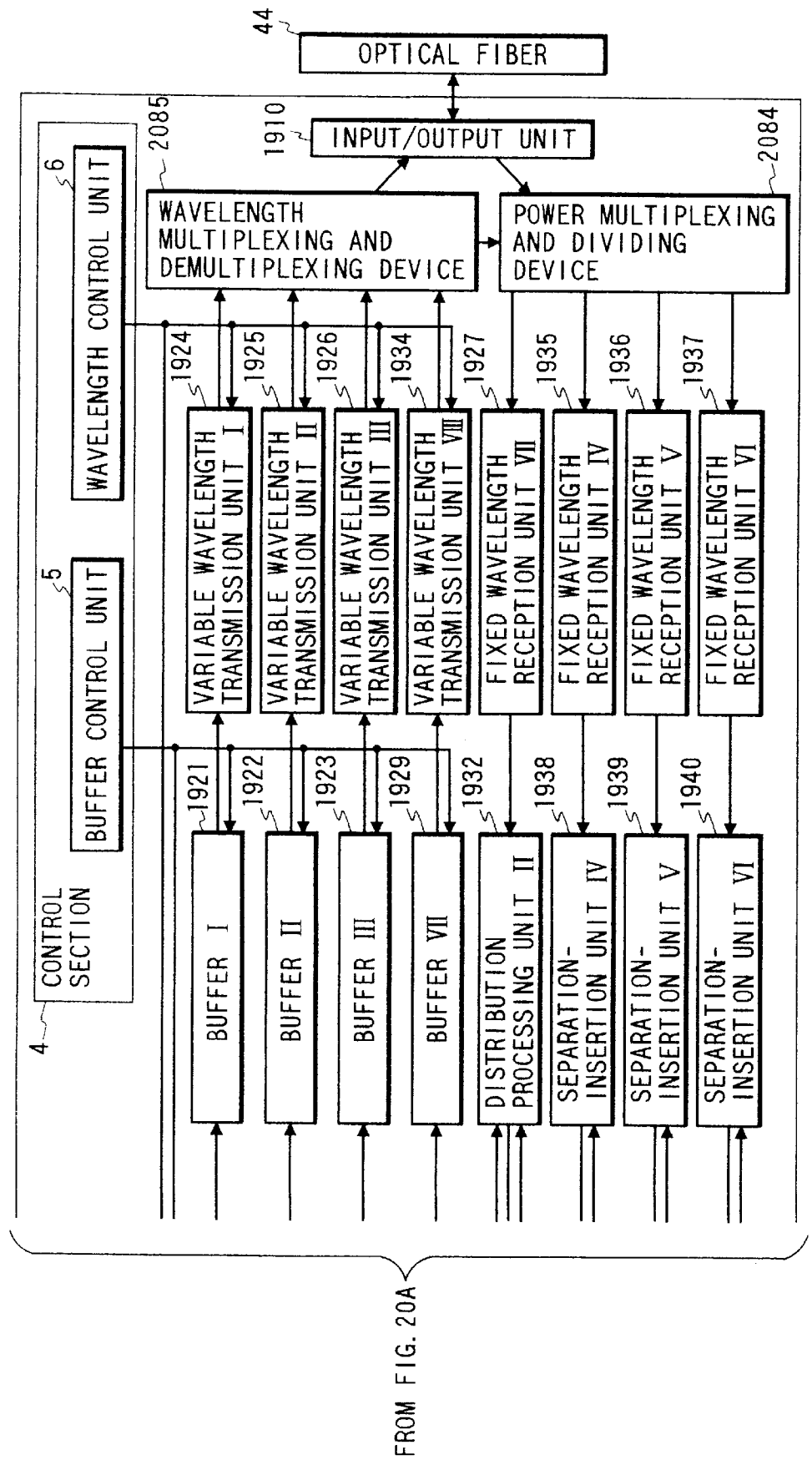

FIGS. 20A and 20B show the seventh embodiments of a node device according to the present invention, and exemplifies an arrangement that can perform loopback transmission in the own node device.

Referring to FIGS. 20A and 20B, blocks denoted by the same reference numerals as in FIGS. 19A and 19B have the same functions. A power multiplexing and dividing device 2083 multiplexes an optical signal of a wavelength λ7 output from a wavelength multiplexing and demultiplexing device 2086 with optical signals of wavelengths λ4 to λ6 output from an input/output unit 1909, thereafter divides the multiplexed signal, and outputs the divided signals to four fixed wavelength reception units 1915 to 1917 and 1931. A power multiplexing and dividing device 2084 also multiplexes an optical signal of a wavelength λ8 output from a wavelength multiplexing and demultiplexing device 2085 with optical signals of wavelengths λ1 to λ3 output from an input/output unit 1910, thereafter divides the multiplexed signal, and outputs the divided signals to four fixed wavelength reception units 1927 and 1935 to 1937.

The wavelength multiplexing and demultiplexing device 2085 multiplexes optical signals of the wavelengths λ1 to λ3 and λ8 output from four variable wavelength transmission units 1924 to 1926 and 1934, thereafter demultiplexes only an optical signal of the wavelength λ8, outputs the demultiplexed optical signal to the power multiplexing and dividing device 2084, and outputs other optical signals to the input/output unit 1910. The wavelength multiplexing and demultiplexing device 2086 also multiplexes optical signals of the wavelengths λ4 to λ6 and λ7 output from four variable wavelength transmission units 1930 and 1944 to 1946, thereafter demultiplexes only an optical signal of the wavelength λ7, outputs the demultiplexed optical signal to the power multiplexing and dividing device 2083, and outputs other optical signals to the input/output unit 1909.

In this embodiment, an optical signal of the wavelength λ8 output from the variable wavelength transmission unit I 1924, II 1925, III 1926, or VIII 1934 is subjected to loopback transmission since it is demultiplexed by the wavelength multiplexing and demultiplexing device 2085, is output to and divided by the power multiplexing and dividing device 2084, and is then received by the fixed wavelength reception unit VII 1927. Likewise, an optical signal of the wavelength λ7 output from the variable wavelength transmission unit IV 1944, V 1945, VI 1946, or VII 1930 is subjected to loopback transmission since it is demultiplexed by the wavelength multiplexing and demultiplexing device 2086, is output to and divided by the power multiplexing and dividing device 2083, and is then received by the fixed wavelength reception unit VIII 1931. As another arrangement, an optical signal of λ8 demultiplexed by the wavelength multiplexing and demultiplexing device 2085 may be input to the fixed wavelength reception unit VII 1927 without going through the power multiplexing and dividing device 2084. Similarly, an optical signal of λ7 output from the wavelength multiplexing and demultiplexing device 2086 may be input to the fixed wavelength reception unit VIII 1931 without going through the power multiplexing and dividing device 2083.

Figure 7:
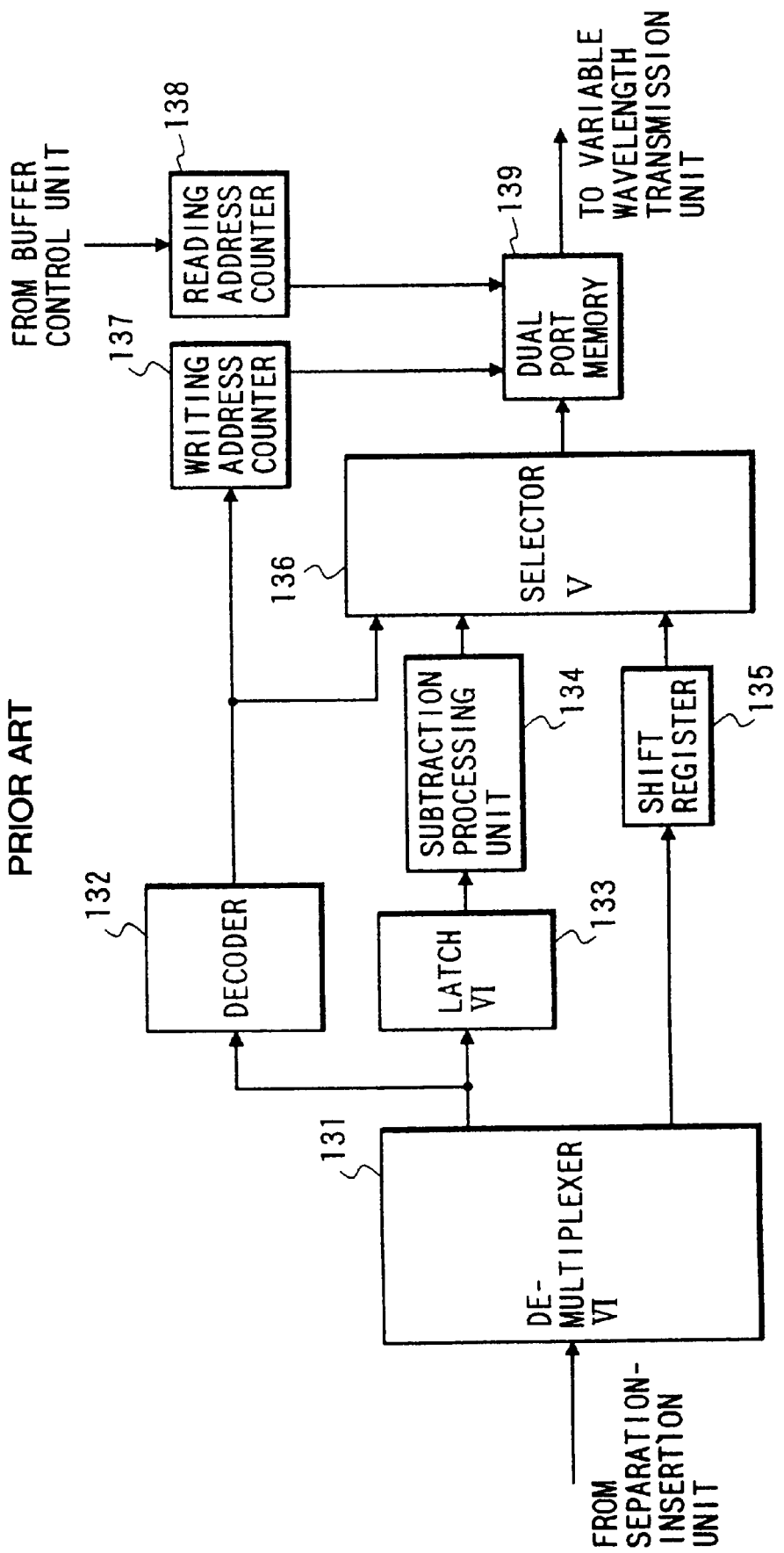
FIG. 7 is a block diagram showing the arrangement of a buffer.

In the seventh embodiment of the present invention as well, the arrangement of each buffer is the same as that shown in FIG. 7, except that the decoding operation of a decoder 132 is set as follows.

The memory area to be designated by the decoder 132 in each buffer is set as follows in this embodiment.

(1) When the value in a section 98 for designation of the wavelength in use in a packet is not the transmission wavelength of a variable wavelength transmission unit to which the own buffer outputs a packet, the decoder 132 designates a memory area corresponding to the loopback transmission wavelength that can be transmitted by the variable wavelength transmission unit.

(2)-1 When the value in a section 98 for designation of the wavelength in use in a packet is the loopback transmission wavelength of a variable wavelength transmission unit to which the own buffer outputs a packet, and the value in a section 97 for indication of the number of relayings in this packet is not "1", the decoder 132 designates a memory area corresponding to any one of arbitrary wavelengths other than the loopback transmission wavelength that can be transmitted by the variable wavelength transmission unit.

(2)-2 In a case other than the above-mentioned cases, the decoder 132 designates a memory area corresponding to the wavelength described in a section 98 for designation of the wavelength in use in a packet.

A case will be described below wherein an inquiry packet is to be transmitted from a terminal equipment I 53 connected to a node device I 81 via a sub transmission path I 45 to a packet processing unit I 3 in the node device I 81 (the value in a section 99 for identification of the kind of packet in an inquiry packet is "0"). An inquiry packet transmitted from the terminal equipment I 53 is transmitted from a variable wavelength transmission unit I 1924 as an optical signal of the wavelength λ8, is demultiplexed by a wavelength multiplexing and demultiplexing device 2085, is divided by a power multiplexing and dividing device 2084, is received by a fixed wavelength reception unit VII 1927, and is output from a distribution processing unit II 1932 to the packet processing unit I 3. The same applies to a case wherein terminal equipments 54, 55, and 59 of the node device I 81 transmit inquiry packets to the packet processing unit I 3 in the node device I 81. On the other hand, when terminal equipments 56 to 58 and 60 of the node device I 81 transmit inquiry packets to the packet processing unit I 3 in the node device I 81, an inquiry packet is transmitted as an optical signal of the wavelength λ7 from a corresponding one of the variable wavelength transmission units 1944 to 1946 and 1930, is demultiplexed by a wavelength multiplexing and demultiplexing device 2086, is divided by a power multiplexing and dividing device 2083, is received by a fixed wavelength reception unit VIII 1931, and is output from a distribution processing unit I 1928 to the packet processing unit I 3.

Next, a case will be explained below wherein the packet processing unit I 3 in the node device I 81 sends back a response packet to the terminal equipment I 53 connected to the node device I 81 via the sub transmission path I 45 (the value in a section 99 for identification of the kind of packet in a response packet is "1"). The packet processing unit I 3 in the node device I 81 outputs the response packet to the distribution processing unit II 1932. The response packet output to the distribution processing unit II 1932 is temporarily stored in a buffer VIII 1933, and thereafter, is transmitted to a node device IV 84 at a wavelength (e.g., the wavelength λ4) other than the loopback transmission wavelength λ7. The response packet is received by a fixed wavelength reception unit IV 1935 in the node device IV 84, and is then transmitted from a variable wavelength transmission unit IV 1944 using the loopback wavelength λ7. The response packet is received by a fixed wavelength reception unit VIII 1931 in the node device IV 84. With this processing, the transmission direction is reversed, and the response packet is transmitted from a variable wavelength transmission unit VIII 1934 to the node device I 81 as an optical signal of the wavelength λ1 that can be received by the terminal equipment I 53. The response packet is received by the fixed wavelength reception unit I 1915, is separated by a separation-insertion unit I 1918, and is transmitted to the terminal equipment I 53. The same applies to a case wherein the packet processing unit I 3 in the node device I 81 transmits a response packet to one of the terminal equipments 54, 55, and 59. On the other hand, when the packet processing unit I 3 in the node device I 81 transmits a response packet to one of the terminal equipments 56 to 58 and 60, the response packet is output to the distribution processing unit I 1928. The response packet output to the distribution processing unit I 1928 is temporarily stored in a buffer VI 1929, and thereafter, is transmitted to a node device II 82 using a wavelength (e.g., the wavelength λ1) other than the loopback transmission wavelength λ8. After the response packet is received by a fixed wavelength reception unit I 1915 in the node device II 82, it is transmitted from a variable wavelength transmission unit I 1924 using the loopback wavelength λ8, and is received by a fixed wavelength reception unit VII 1927 in the node device II 82. With this processing, the transmission direction is reversed, and the response packet is transmitted from a variable wavelength transmission unit VII 1930 to the node device I 81 as an optical signal of a wavelength that can be received by a corresponding one of the terminal equipments 56 to 58 and 60. The response packet is received by a corresponding one of the fixed wavelength reception units 1935 to 1937 and 1927, is separated by a corresponding one of separation-insertion units 1938 to 1940 and the distribution processing unit 1932, and is transmitted to a corresponding one of the terminal equipments 56 to 58 and 60.

Subsequently, a case will be explained below wherein a notification packet for transmitting internode management information and the like is to be sent from the packet processing unit I 3 in the node device I 81 to a packet processing unit I 3 in the node device II 82 (the value in a section 99 for identification of the kind of packet in a notification packet is "0"). The packet processing unit I 3 in the node device I 81 outputs a notification packet to the distribution processing unit I 1928. The notification packet output from the distribution processing unit I 1928 is temporarily stored in the buffer VII 1929, is transmitted to the node device II 82 using a wavelength (e.g., the wavelength λ1) other than the loopback transmission wavelength λ8, and is received by the fixed wavelength reception unit I 1915 in the node device II 82. The notification packet is then transmitted from the variable wavelength transmission unit I 1924 using the loopback wavelength λ8, and is received by the fixed wavelength reception unit VII 1927 in the node device II 82. Then, the notification packet is output to the packet processing unit I 3 via a distribution processing unit II 1932.

When the packet processing unit I 3 in the node device I 81 sends a notification packet for transmitting internode management information or the like to that in a non-adjacent, remote node device, a value indicating the number of node devices including the own node device and node devices to be hopped may be designated in a section 97 for indication of the number of relayings. In this case, a decoder in a node device to be hopped designates a memory area in accordance with case (2)-1 above, as in the sixth embodiment.

(Eighth Embodiment)

Figure 21B:
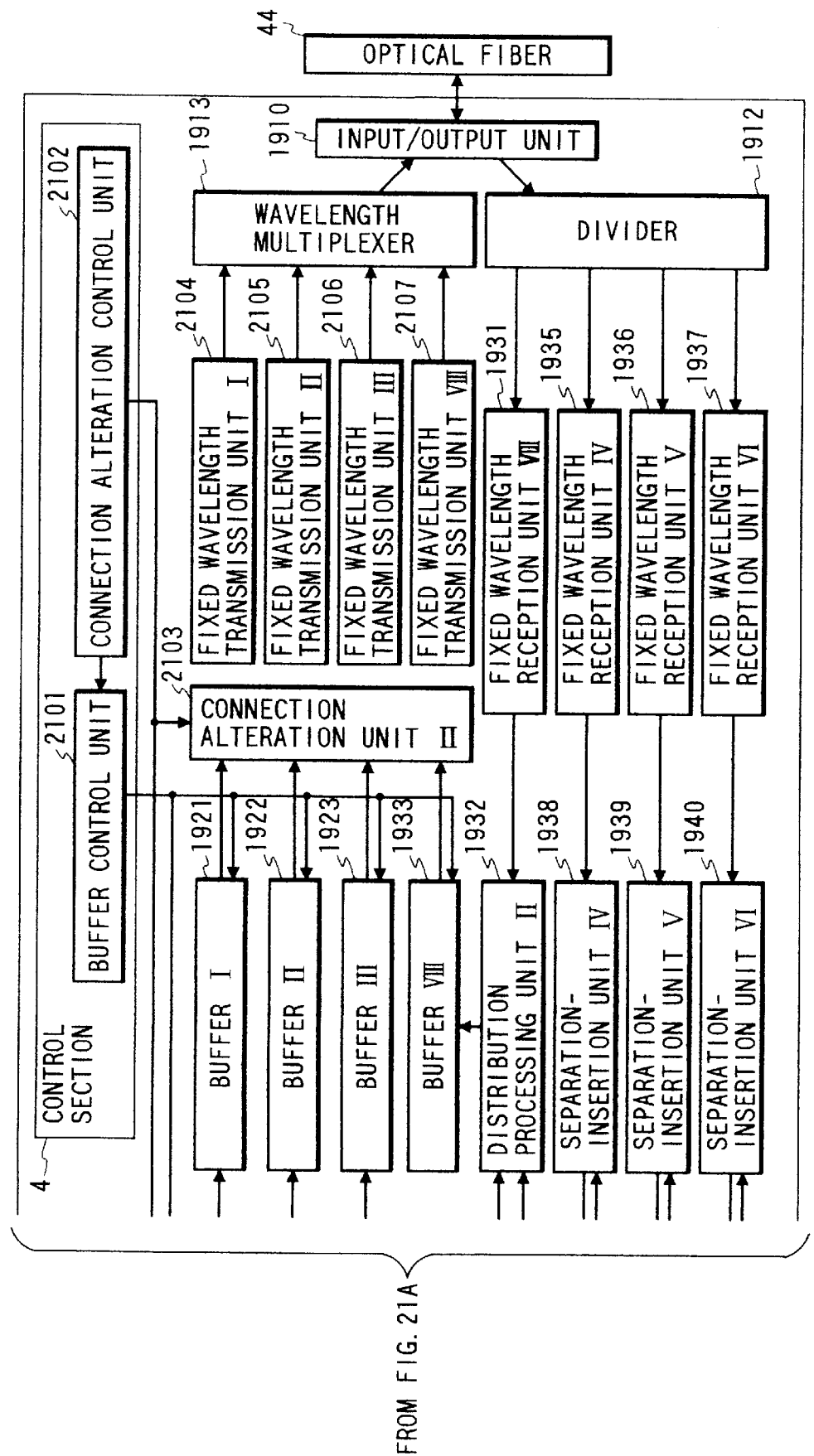
FIG. 21 which comprised of FIGS. 21A and 21B is a block diagram showing the arrangement of a node device according to the eighth embodiment of the present invention.

FIGS. 21A and 21B show the eighth embodiments of a node device according to the present invention, which is used in a wavelength multiplex network system using eight wavelengths, i.e., wavelengths λ1 to λ8.

Referring to FIGS. 21A and 21B, a buffer control unit 2101 serves as a buffer control means, and controls the reading operations of packets stored in buffers I to VIII in accordance with the connection relationship between the input and output terminals of connection alteration units II 2103 and I 2108 set by a connection alteration control unit 2102. The control contents of the buffer control units will be explained later.

The connection alteration control unit 2102 controls the connection relationship between the input and output terminals of the connection alteration units II 2103 and I 2108 in accordance with a predetermined connection alteration pattern (to be described later).

The connection alteration unit II 2103 serves as a connection alteration means, its input terminals I to IV are respectively connected to the buffers I 1921, II 1922, III 1923, and VIII 1933, and its output terminals I to IV are respectively connected to fixed wavelength transmission units I 2104 to III 2106 and VIII 2107. The fixed wavelength transmission units I 2104 to III 2106 and VIII 2107 serve as transmission means using semiconductor lasers. Each fixed wavelength transmission unit converts a packet output from the connection alteration unit II into an optical signal of a predetermined wavelength, and outputs the converted optical signal onto an optical fiber 44 as a physical medium of the optical wavelength multiplex transmission path via a wavelength multiplexer 1913 and an input/output unit 1910. As the semiconductor laser, a DFB (Distributed Feed Back) type laser having a multi-electrode structure is used. By controlling the injection current amounts of the respective electrodes of the DFB lasers, the fixed wavelength transmission units I, II, III, and VIII are respectively assigned transmission wavelengths λ1, λ2, λ3, and λ8.

The connection alteration unit I 2108 serves as a connection alteration means, its input terminals I to VI are respectively connected to buffers IV 1943, V 1942, VI 1941, and VII 1929, and its output terminals I to IV are respectively connected to fixed wavelength transmission units IV 2112, V 2111, VI 2110, and VII 2109. The fixed wavelength transmission units IV 2112, V 2111, VI 2110, and VII 2109 serve as transmission means using semiconductor lasers. Each fixed wavelength transmission unit converts a packet output from the connection alteration unit I into an optical signal of a predetermined wavelength, and outputs the converted optical signal onto an optical fiber 7 as a physical medium of the optical wavelength multiplex transmission path via a wavelength multiplexer 1914 and an input/output unit 1909. As the semiconductor laser, a DFB (Distributed Feed Back) type laser having a multi-electrode structure is used. By controlling the injection current amounts of the respective electrodes of the DFB lasers, the fixed wavelength transmission units IV to VII are respectively assigned transmission wavelengths λ4 to λ7.

Figure 22:
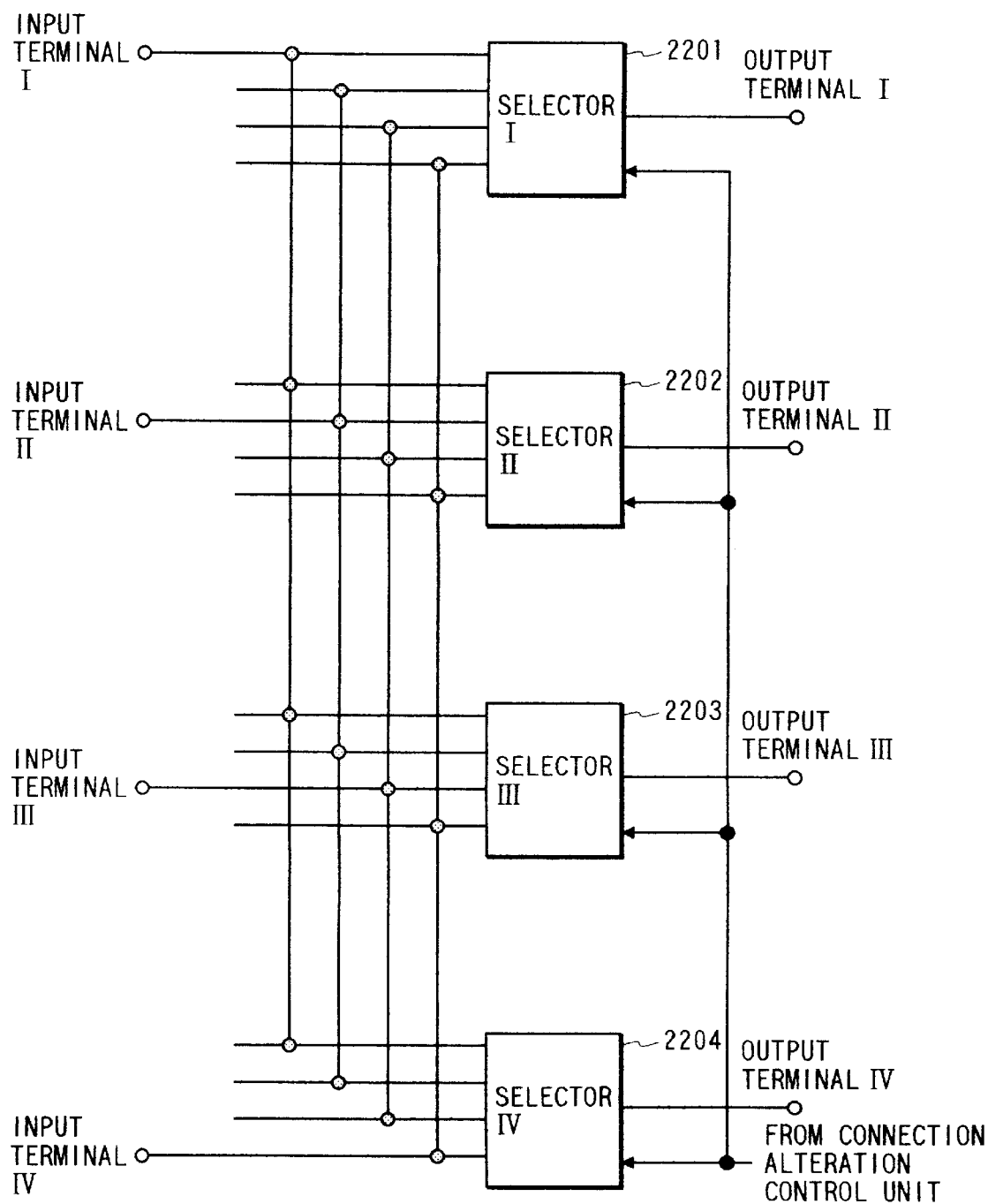
FIG. 22 is a block diagram showing the arrangement of a connection alteration unit according to the eighth embodiment of the present invention.

FIG. 22 shows the internal arrangement of each of the connection alteration units I and II used in the eighth embodiment of the present invention. Each of the connection alteration units I and II has four input terminals and four output terminals. Referring to FIG. 22, each of selectors 2201 I to 2204 IV receives four signals input from the input terminals I to IV as input signals, and outputs a packet input from a predetermined input terminal to the corresponding output terminal on the basis of a selection signal (to be described later) output from the connection alteration control unit. In this manner, the connection relationship between the input and output terminals is set.

The buffer control unit used in the eighth embodiment of the present invention preferably has the same arrangement as that shown in FIG. 16.

Figure 23:
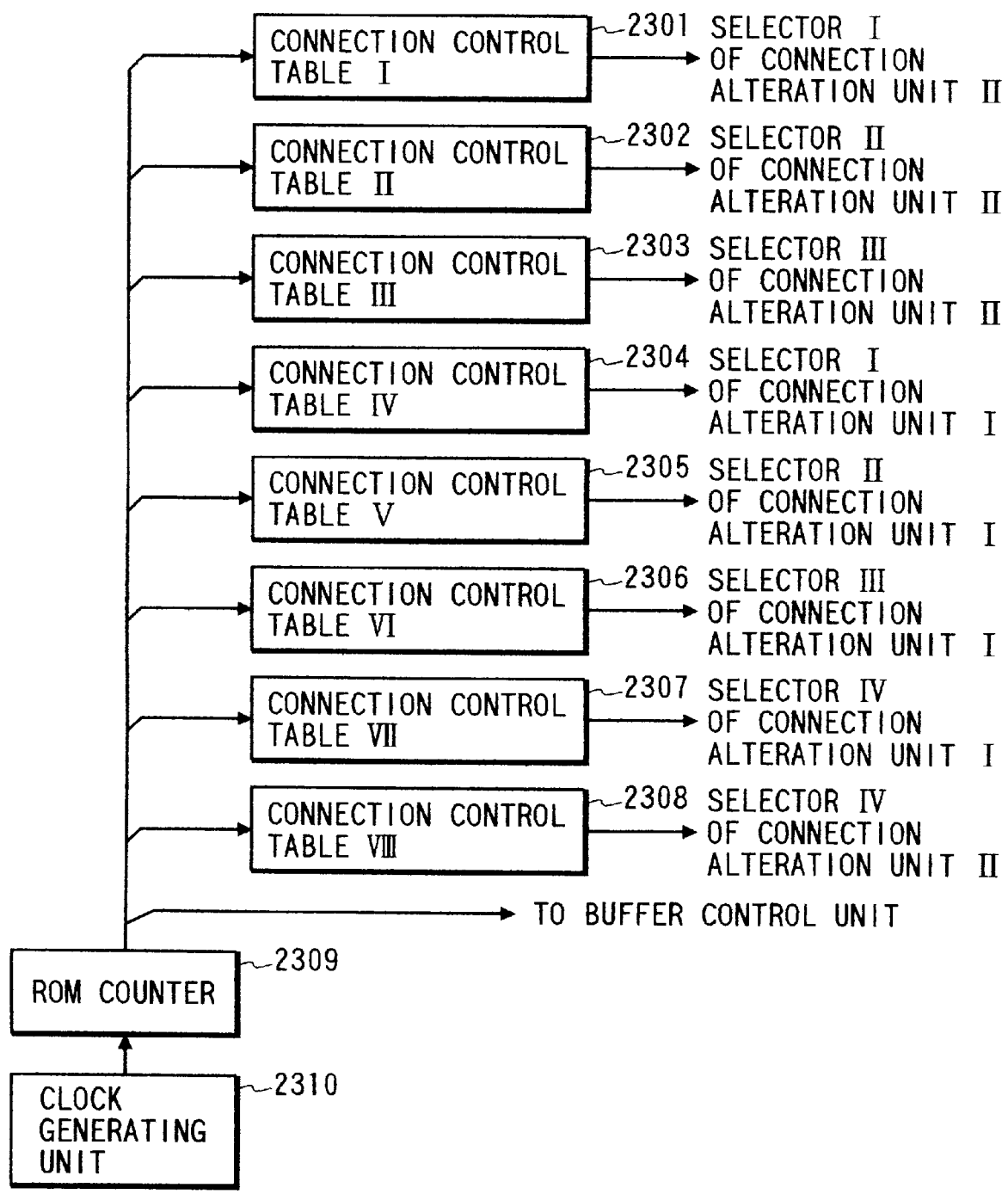
FIG. 23 is a block diagram showing the arrangement of a connection control unit according to the eighth embodiment of the present invention.

FIG. 23 shows the internal arrangement of the connection alteration control unit used in the eighth embodiment of the present invention. Referring to FIG. 23, connection control tables I 2301 to VIII 2308 are sequentially read out by an address value output from a 2-bit ROM counter 2309, and output predetermined selection signals to the selectors of the connection alteration units I and II. These tables comprise read-only memories (ROMs). The contents of the connection control tables I to VIII will be described later. The 2-bit ROM counter 2309 counts clock signals output from a clock generator 2310, and outputs a 2-bit address signal to the connection control tables I to VIII and buffer control tables I to VIII in the buffer control unit. The clock generator 2310 generates a predetermined clock signal, supplies it to the buffer control unit, frequency-divides the clock signal, and supplies them to the ROM counter.

In the eighth embodiment, the contents of the connection control tables I to VIII are set as shown in Table 7 below.

Table 7 below shows the input terminals to be selected by the selectors I to IV in the connection alteration units I and II under the control of the connection alteration unit. Since the selectors I to IV are connected to the output terminals I to IV, the connection relationship between the input and output terminals is determined based on Table 7. Also, Table 7 is set so that more than one input terminals are not simultaneously connected to a single output terminal.

Table 8 below shows the relationship between the input and output terminals set by the connection control tables I to VIII in units of output address values from the ROM counter.

On the other hand, the offset values of the buffer control tables I to VIII are set as shown in Table 9 below. These 16 tables are synchronously and cyclically read out by the ROM counter. Therefore, the connection relationship between the input and output terminals forms a cyclic pattern in which the output terminals to be connected to each input terminal are cyclically set.

In Tables 7, 8, and 9, when the connection destination of each input terminal is the output terminal I, the offset value for reading out data in a dual port memory in a buffer is assigned a value A1 corresponding to a memory area I. Likewise, when the connection destinations of each input terminal are respectively the output terminals II, III, and IV, the offset values are respectively assigned values corresponding to memory areas II, II, and IV.

Therefore, packets written in the memory areas I to IV in each buffer are controlled to be read out from the buffer when they are connected to the corresponding output terminals.

TABLE 7

| | | Address | | | |
|---|---|---|---|---|---|
| Table Name | | 0 | 1 | 2 | 3 |
| Connection Alteration Unit I | Connection Control Table I | I | II | III | IV |
| | Connection Control Table II | II | III | IV | I |
| | Connection Control Table III | IV | I | II | III |
| | Connection Control Table VIII | III | IV | I | II |
| Connection Alteration Unit II | Connection Control Table IV | I | II | III | IV |
| | Connection Control Table V | II | III | IV | I |
| | Connection Control Table VI | IV | I | II | III |
| | Connection Control Table VII | III | IV | I | II |

TABLE 8

Relationship Between Input and Output Terminals Connected by Connection Control Table

| | | Address | | | |
|---|---|---|---|---|---|
| Input Terminal | | 0 | 1 | 2 | 3 |
| Connection Alteration Unit I | Input Terminal I | I | III | IV | II |
| | Input Terminal II | II | I | III | IV |
| | Input Terminal III | IV | II | I | III |
| | Input Terminal IV | III | IV | II | I |
| Connection Alteration Unit II | Input Terminal I | I | III | IV | II |
| | Input Terminal II | II | I | III | IV |
| | Input Terminal III | IV | II | I | III |
| | Input Terminal IV | III | IV | II | I |

TABLE 9

| Table Name | Address | | | |
|---|---|---|---|---|
| | 0 | 1 | 2 | 3 |
| Buffer Control Table I | A1 | A3 | A8 | A2 |
| Buffer Control Table II | A2 | A1 | A3 | A8 |
| Buffer Control Table III | A8 | A2 | A1 | A3 |
| Buffer Control Table IV | A4 | A6 | A7 | A5 |
| Buffer Control Table V | A5 | A4 | A6 | A7 |
| Buffer Control Table VI | A7 | A5 | A4 | A6 |
| Buffer Control Table VII | A6 | A7 | A5 | A4 |
| Buffer Control Table VIII | A3 | A8 | A2 | A1 |

The operation of the eighth embodiment of the present invention will be explained below while taking as an example transmission of a packet between a terminal equipment and a packet processing unit in a node device, and between node devices in the example of the multihop system shown in FIG. 1, with reference to FIGS. 21A, 21B, 22, 16, and 23. In the following description, the same constituting elements in different node devices and terminal equipments will be denoted by the same reference numerals in FIGS. 9, 10, 6, and 7 for the sake of convenience.

A case will be explained below wherein an inquiry packet is to be transmitted from a terminal equipment I 53 connected to a node device I 81 via a sub transmission path I 45 to a packet processing unit I 3 in the node device I 81. As will be described below, the inquiry packet is temporarily transmitted to a node device II 82, and is looped back by a loopback communication means. Thereafter, the inquiry packet is received by a fixed wavelength reception unit VIII 1931 in the node device I 81, and is output to the packet processing unit I 3 via a distribution processing unit II 1932.

For this purpose, a packet processing unit II 130 in the terminal equipment I 53 assembles an inquiry packet by writing, in a section 98 for designation of the wavelength in use, a value "7" as the reception wavelength of the fixed wavelength reception unit VIII 1931 connected to the distribution processing unit II 1932 that outputs a packet to the packet processing unit I 3 in the node device I 81, setting, in a section 97 for indication of the number of relayings, "2" indicating two relaying operations including the relaying transmission operation in the own node device and the loopback relaying operation in the neighboring node device II 82 at the downstream side in the transmission direction, and a value designating an "inquiry packet" ("0", as described above) in a section 99 for identification of the kind of packet, and setting required management data in a data portion 100. The packet processing unit II 130 outputs the inquiry packet onto the sub transmission path 45 via an I/F unit III 129. The inquiry packet output onto the sub transmission path 45 is input to an I/F unit B 76 in a separation-insertion unit I 1918 connected to the node device I 81 via the sub transmission path I 45.

The I/F unit B 76 in the separation-insertion unit I 1918 in the node device I 81 sequentially writes the inquiry packet transmitted via the sub transmission path I 45 in a FIFO D 78. Upon completion of the writing operation of the inquiry packet into the FIFO D 78, an insertion control unit B 77 detects an end of a packet flow which is being read out from a FIFO E 79, switches the input from the FIFO to be output from a selector B 80 to the input from the FIFO D 78, stops the reading operation of the FIFO E 79, and starts a reading operation of the FIFO D 78. Upon completion of the reading operation of the inquiry packet written in the FIFO D 78, the insertion control unit B 77 switches the input from the FIFO to be output from the selector B 80 to the input from the FIFO E 79 again, stops the reading operation of the FIFO D 78, and restarts a reading operation of the FIFO E 79. The inquiry packet output from the selector B 80 is input to a buffer I 1921.

A demultiplexer VI 131 in the buffer I 1921 outputs the header portion of the inquiry packet output from the separation-insertion unit I 1918 to a decoder 132 and a latch VI 133, and the data portion 100 to a shift register 135. The decoder 132 decodes the header portion of the inquiry packet. In this packet, since the value "7" in the section 98 for designation of the wavelength in use does not indicate a channel (wavelength of selectable fixed wavelength transmission means) that can be selected by a connection alteration unit II 2103 to which the own buffer 1921 outputs a packet, the decoder 132 determines a memory area VIII corresponding to a loopback transmission wavelength λ8 that can be selected by the connection alteration unit II 2103 as a memory area in which the packet is to be written, and outputs the writing start address value of the area VIII to a writing address counter 137.

The latch VI 133 stores the header portion of the inquiry packet, and outputs it to a subtraction processing unit 134. In the header portion of the inquiry packet output from the latch VI 133, the value "2" in the section 97 for indication of the number of relayings is decremented to "1" by the subtraction processing unit 134, and the decremented value is output to a selector V 136. The shift register 135 delays the data portion 100 of the inquiry packet output from the demultiplexer VI 131 by a predetermined period of time, and outputs the delayed data portion 100 to the selector V 136. The selector V 136 re-assembles the inquiry packet with the decremented value "1" in the section 97 for indication of the number of relayings by sequentially selecting the header portion including the value, decremented by the subtraction processing unit 134, in the section 97 for indication of the number of relayings, and the delayed data portion 100 of the inquiry packet output from the shift register 135, and outputs the inquiry packet to a dual port memory 139.

On the other hand, the writing address counter 137 sets the writing start address of the dual port memory 139 in which the inquiry packet is to be written to be A8 in correspondence with the memory area VIII, in which the inquiry packet is to be written and which is output from the decoder 132, and sequentially outputs writing address signals of the packet to the dual port memory 139. Since the input port of the dual port memory 139 receives the re-assembled inquiry packet via the selector V 136, the inquiry packet is sequentially written in the memory area VIII in accordance with the addresses output from the writing address counter 137.

In this manner, after the inquiry packet is written in the memory area VIII, when a ROM counter 2309 in a connection alteration control unit 2102 simultaneously outputs "2" as a reading address value to connection control tables I to VIII, the contents of the connection control tables are read out based on the address value.

The contents read out at that time are as shown in Table 7 above. That is, as for the connection alteration unit II, a selection signal for connecting the output terminal I to the input terminal III is read out from the connection control table I. Similarly, selection signals for respectively connecting the output terminals II, III, and IV to the input terminals IV, II, and I are read out from the connection control tables II, III, and VIII.

These selection signals are input to the selectors I to IV to select predetermined input terminals, which are connected to the output terminals.

At the same time, the reading address value "2" output from the ROM counter 2309 in the connection alteration control unit 2102 is input to the buffer control tables in the buffer control unit 2101. Based on this address value, the contents of the buffer control tables I to VIII are read out.

The contents read out at that time are as shown in Table 9 above. That is, an offset value A8 corresponding to a memory area VIII is read out from the buffer control table I. Similarly, offset values A3, A1, A7, A6, A4, A5, and A2 corresponding to memory areas III, I, VII, VI, IV, V, and II are respectively read out from the buffer control tables II, III, IV, V, VI, VII, and VIII.

The offset values are output to reading address counters 138 of buffers I 1921 to VIII 1933. Upon reception of these control signals, in the buffer I 1921, the reading address counter 138 loads the offset value A8 output from the buffer control table I, sequentially generates addresses for reading out a packet written in the memory area VIII by incrementing a counter, and outputs these addresses to the dual port memory 139. Based on the reading addresses, the inquiry packet written in the memory area VIII is sequentially output from the output port of the dual port memory 139 to the input terminal I of the connection alteration unit.

The inquiry packet read out from the buffer I is transmitted from a fixed wavelength transmission unit VIII 2107 to a wavelength multiplexer 1913 as an optical signal of the wavelength $\lambda 8$ since the input terminal I is connected to the output terminal IV. The inquiry packet is multiplexed with optical signals of different wavelengths, i.e., wavelengths $\lambda 1$ to $\lambda 3$ output from other fixed wavelength transmission units I 2104, II 2105, and III 2106. The multiplexed signal is output onto an optical fiber 44 via an input/output unit 1910, and is transmitted to the neighboring node device II 82.

The inquiry packet transmitted to the node device II 82 is input via an input/output unit 1909, and is divided to fixed wavelength reception units I 1915, II 1916, III 1917, and VII 1927 by a divider 1911. In this case, since the inquiry packet is optical signal of the wavelength $\lambda 8$, it is received by the fixed wavelength reception unit VII 1927 that receives only an optical signal of the wavelength $\lambda 8$. The inquiry packet received by the fixed wavelength reception unit VII 1927 is output to a distribution processing unit I 1928. A latch B 66 in the distribution processing unit I 1928 stores the value in the section 97 for indication of the number of relayings in the inquiry packet output from the fixed wavelength reception unit VII 1927, and outputs the stored value to a comparator B 65. Since the value in the section 97 for indication of the number of relayings in the inquiry packet output from the latch B 66 is "1", the comparator B 65 outputs a relaying instruction to a demultiplexer B 67. Upon reception of the relaying instruction from the comparator B 65, the demultiplexer B 67 writes the input inquiry packet in a FIFO B 70. The inquiry packet written in the FIFO B 70 is read out under the control of an insertion control unit A 68, and is output to a buffer VII 1929 via a selector A 72.

A demultiplexer VI 131 in the buffer VII 1929 outputs the header portion of the inquiry packet output from the distribution processing unit I 1928 to a decoder 132 and a latch VI 133, and the data portion 100 to a shift register 135 as in the above-mentioned buffer I 1921. The decoder 132 decodes the header portion of the inquiry packet. In this case, since the value "7" in the section 98 for designation of the wavelength in use indicates $\lambda 7$ as one of transmission wavelengths ($\lambda 4$, $\lambda 5$, $\lambda 6$, and $\lambda 7$) of fixed wavelength transmission units IV 2112, V 2111, VI 2110, and VII 2109 that can be selected by an alteration connection unit I 2108 to which the own buffer VII 1929 outputs a packet, the decoder 132 determines a memory area VII as a memory area in which the packet is to be written, and outputs the writing start address value of the area VII to a writing address counter 137. At the same time, a selector V 136 outputs a re-assembled inquiry packet in which the value in the section 97 for indication of the number of relayings has been decremented to "0" by a subtraction processing unit 134 to a dual port memory 139.

On the other hand, the writing address counter 137 outputs address values corresponding to the memory area VII, in which the inquiry packet is to be written and which is output from the decoder 132, and the inquiry packet is written in the memory area VII. After the inquiry packet is written in the memory area VII, when the input terminal IV of a connection alteration unit I 2108 connected to the buffer VII 1929 is connected to the output terminal IV connected to a fixed wavelength transmission unit VII 2109 under the control of a connection alteration control unit 2102 in a control section 4, as described above, the inquiry packet is sequentially read out in accordance with the addresses output from a reading address counter 138, and is transmitted as an optical signal of the wavelength $\lambda 7$ from the fixed wavelength transmission unit VII 2109. In a wavelength multiplexer 1914, the inquiry packet is multiplexed with optical signals of different wavelengths, i.e., the wavelengths $\lambda 4$ to $\lambda 6$, output from other fixed wavelength transmission units IV 2110, V 2111, and VI 2112, and the multiplexed signal is output onto an optical fiber 7 via the input/output unit 1909. In this manner, the inquiry packet is loopback-transmitted to the node device I 81.

The inquiry packet loopback-transmitted from the node device II 82 to the node device I 81 as an optical signal of the wavelength $\lambda 7$ is input via the input/output unit 1910, and is divided to fixed wavelength reception units IV 1935, V 1936, VI 1937, and VIII 1931 by a divider 1912. In this case, since the inquiry packet is optical signal of the wavelength $\lambda 7$, it is received by the fixed wavelength reception unit VIII 1931, and is then output to the distribution processing unit II 1932.

A latch B 66 in the distribution processing unit II 1932 stores the value in the section 97 for indication of the number of relayings in the inquiry packet output from the fixed wavelength reception unit VIII 1931, and outputs the stored value to a comparator B 65. Since the value in the section 97 for indication of the number of relayings in the inquiry packet output from the latch B 66 is "0", the comparator B 65 outputs a separation instruction to a demultiplexer B 67. Upon reception of the separation instruction, the demultiplexer B 67 outputs the input inquiry packet to a latch A 64 and a demultiplexer A 63.

The latch A 64 stores the value in the section 99 for identification of the kind of packet in the inquiry packet, and outputs the stored value to the comparator A 63. Since the value in the section 99 for identification of the kind of packet in the inquiry packet output from the latch A 64 is "0", the comparator A 63 outputs a separation instruction to the demultiplexer A 62. Upon reception of the separation instruction from the comparator A 63, the demultiplexer A 62 outputs the input inquiry packet to the packet processing unit I 3. In the packet processing unit I 3, the header portion of the input packet is removed to extract the data portion, and the extracted data portion is output to a connection management unit 2. In the connection management unit 2, predetermined processing is performed based on the received data.

Also, when an inquiry packet is to be transmitted from a terminal equipment VIII 60 connected to the node device I 81 via a sub transmission path VIII 52 to the packet processing unit I 3 of this node device, the inquiry packet is temporarily transmitted to the node device II 82, and is looped back by a first loopback communication means. Thereafter, the inquiry packet is received by a fixed wavelength reception unit VIII 1911, and is output to the packet processing unit I 3 via the distribution processing unit II 1932.

When an inquiry packet is to be transmitted from one of terminal equipments connected to the node device I via sub transmission paths 48 to 51 to the packet processing unit I 3 of this node device, the inquiry packet is temporarily transmitted to a node device IV 84, and is looped back by a second loopback communication means. Thereafter, the inquiry packet is received by a fixed wavelength reception unit VII 1927 in the node device I 81, and is output to the packet processing unit I 3 via a distribution processing unit I 1928.

A case will be explained below wherein a response packet is to be sent back from the packet processing unit I 3 in the node device I 81 to the terminal equipment I 53 connected to the node device I 81 via the sub transmission path I 45.

The packet processing unit I 3 assembles a response packet in which data to be sent to the terminal equipment I 53 is written. At this time, a value "1" as the reception wavelength of a fixed wavelength reception unit I 1915 that outputs a packet to the separation-insertion unit I 1918 to which the terminal equipment I 53 is connected via the sub transmission path I 45 is written in a section 98 for designation of the wavelength in use, a value "2" is set in a section 97 for indication of the number of relayings, and a value designating a "response packet" ("1", as described above) is set in a section 99 for identification of the kind of packet. The response packet assembled by the packet processing unit I 3 is written in a FIFO C 71 in the distribution processing unit I 1928. The response packet written in the FIFO C 71 is inserted into a packet flow output from the demultiplexer B 67 under the control of an insertion control unit A 68, and is output to a buffer VII 1929 via a selector A 72.

A demultiplexer VI 131 in the buffer VII 1929 respectively outputs the header portion in the response packet output from the distribution processing unit I 1928 to a decoder 132 and a latch VI 133, and a data portion 100 to a shift register 135. The decoder 132 decodes the header portion of the response packet. In this case, since the value "1" in the section 98 for designation of the wavelength in use indicates none of channels (wavelengths λ4, λ5, λ6, and λ7) to which the own buffer VI 1929 is connected, the decoder 132 determines a memory area VII corresponding to a loopback transmission wavelength λ7 that can be transmitted by the fixed wavelength transmission unit VII 2109 as a memory area in which the packet is to be written, and outputs the writing start address value of the area VII to a writing address counter 137. At the same time, a selector V 136 outputs a re-assembled response packet in which the value in the section 97 for indication of the number of relayings has been decremented to "1" by a subtraction processing unit 134 to a dual port memory 139.

On the other hand, the writing address counter 137 outputs address values corresponding to the memory area VII, in which the response packet is to be written, output from the decoder 132, and the response packet is written in the memory area VII.

The response packet written in the memory area VII is read out under the control of the buffer control unit 2101 when the input terminal IV of the connection alteration unit I to which the buffer VII 1929 is connected is connected to the fixed wavelength transmission unit VII 2109 under the control of the connection alteration control unit 2102 in the control section 4. Then, the readout response packet is output from the fixed wavelength transmission unit VII 2109 to a wavelength multiplexer 1914 as an optical signal of the wavelength λ7. In the wavelength multiplexer 1914, the response packet is multiplexed with optical signals of different wavelengths, i.e., the wavelengths λ4 to λ6, output from other fixed wavelength transmission units IV 2110, V 2111, and VI 2112, and the multiplexed signal is output onto the optical fiber 7 via an input/output unit 1909. Then, the response packet is transmitted to the node device IV 84.

The response packet transmitted from the node device I 81 to the node device IV 84 as an optical signal of the wavelength λ7 is received by a fixed wavelength reception unit VIII 1931 that receives only an optical signal of the wavelength λ7, as in the above-mentioned processing. The response packet received by the fixed wavelength reception unit VIII 1931 is output to a distribution processing unit II 1932. In the distribution processing unit II 1932, since the value in the section 97 for indication of the number of relayings in the response packet is "1", a comparator B 65 outputs a relaying instruction, and the response packet is output to a buffer VIII 1933.

A decoder 132 in the buffer VIII 1933 decodes the header portion in the response packet. In this case, since the value "1" in the section 98 for designation of the wavelength in use indicates λ1 as one of channels (wavelengths λ1, λ2, λ3, and λ8) to which the own buffer VIII is connected, the decoder 132 determines a memory area I as a memory area in which the packet is to be written, and outputs the writing start address value of the area I to a writing address counter 137. At the same time, a selector V 136 outputs a re-assembled response packet in which the value in the section 97 for indication of the number of relayings has been decremented to "0" by a subtraction processing unit 134 to a dual port memory 139.

On the other hand, the writing address counter 137 outputs address values corresponding to the memory area I, in which the inquiry packet is to be written and which is output from the decoder 132, and the inquiry packet is written in the memory area I. The response packet written in the memory area I is read out, as described above, and is transmitted to the node device I 81 as an optical signal of the wavelength λ1.

The response packet transmitted from the node device IV 84 to the node device I 81 as an optical signal of the wavelength λ1 is input via the input/output unit 1909, is divided by the divider 1911, and is received by the fixed wavelength reception unit I 1915 that receives only an optical signal of the wavelength λ1. The response packet received by the fixed wavelength reception unit I 1915 is output to the separation-insertion unit I 1918.

In the separation-insertion unit I 1918, since the value in the section 97 for indication of the number of relayings in the response packet is "0", a separation instruction is output to the demultiplexer C 75, and the response packet is separated to the I/F unit B 76, and is transmitted to the terminal equipment I 53 via the sub transmission path 45. In the terminal equipment I 53, the transmitted response packet is output to the packet processing unit II 130 via the I/F unit III 129, and the header portion of the packet is removed to extract the data portion. Thereafter, predetermined processing is performed based on the data portion.

Similarly, when a response packet is to be sent from the packet processing unit I 3 in the node device I 81 to the terminal equipment VII 59 connected to the sub transmission path VII 51 of this node device, the response packet is temporarily transmitted to the node device IV 84, and is looped back by a second loopback communication means. Thereafter, the response packet is received by the fixed wavelength reception unit VII 1927 in the node device I 81, and is output to the terminal equipment VII 59 via the distribution processing unit I 1928.

When a response packet is to be sent from the packet processing unit I 3 in the node device I 81 to one of the terminal equipments 56 to 58 and 60 connected to the sub transmission paths 48 to 50 and 52 of this node device, the response packet is temporarily transmitted to the node device II 82, and is looped back by a first loopback communication means. Thereafter, the response packet is received by a corresponding one of fixed wavelength reception units 1931 and 1935 to 1937, and is output to a corresponding one of the terminal equipments 56 to 58 and 60 via one of separation-insertion units 1938 to 1940 or the distribution processing unit I 1932.

A case will be explained below wherein a notification packet for transmitting internode management information or the like is transmitted from the packet processing unit I 3 in the node device I 81 to a packet processing unit I 3 in the node device II 82.

The packet processing unit I 3 in the node device I 81 assembles a notification packet by writing, in a section 98 for designation of the wavelength in use, a value "8" as the reception wavelength of the fixed wavelength reception unit VII 1927 connected to the distribution processing unit I 1928 that outputs a packet to the packet processing unit I 3 in the node device II 82, setting a value "1" indicating only the own node device in a section 97 for indication of the number of relayings, a value "0" indicating a "notification packet" in a section 99 for identification of the kind of packet, and setting required internode management information in a data portion 100. The packet processing unit I 3 then writes the assembled notification packet in a FIFO C 71 in the distribution processing unit II 1932. The notification packet written in the FIFO C 71 is inserted into a packet flow output from a demultiplexer B 67 under the control of an insertion control unit A 68, and is output to a buffer VIII 1933 via a selector A 72.

A demultiplexer VI 131 in the buffer VIII 1933 outputs the header portion in the notification packet output from the distribution processing unit II 1932 to a decoder 132 and a latch VI 133, and the data portion 100 to a shift register 135. The decoder 132 decodes the header portion of the notification packet. In this case, since the value "8" in the section 98 for designation of the wavelength in use indicates the loopback transmission wavelength (λ8) of the fixed wavelength transmission unit VIII 2107 to which the own buffer VIII 1933 can be connected, and the value in the section 97 for indication of the number of relayings is "1", the decoder 132 determines a memory area VIII corresponding to the transmission wavelength λ8 as a memory area in which the packet is to be written, and outputs the writing start address value of the area VIII to the writing address counter 137. As in the above-mentioned processing, the selector V 136 outputs a re-assembled notification packet in which the value in the section 97 for indication of the number of relayings has been decremented to "0" by the subtraction processing unit 134 to the dual port memory 139.

On the other hand, the writing address counter 137 outputs address values corresponding to the memory area VIII, in which the inquiry packet is to be written and which is output from the decoder 132, and the inquiry packet is written in the memory area VIII. The notification packet written in the memory area VIII is read out in the same manner as in the above-mentioned processing, and is transmitted from the node device I 81 to the node device II 82 as an optical signal of the wavelength λ8, and is received by the fixed wavelength reception unit VII 1927 that receives only an optical signal of the wavelength λ8. The notification packet received by the fixed wavelength reception unit VII 1927 is output to the distribution processing unit I 1928.

In the distribution processing unit I 1928, since the value in the section 97 for indication of the number of relayings in the notification packet output from the fixed wavelength reception unit VII 1927 is "0", the comparator B 65 outputs a separation instruction to the demultiplexer B 67, and the notification packet is output to a latch A 64 and a demultiplexer A 62. The latch A 64 stores the value in the section 99 for identification of the kind of packet in the notification packet, and outputs the stored value to a comparator A 63. In this case, since the value in the section 99 for identification of the kind of packet in the notification packet output from the latch A 64 is "0", the comparator A 63 outputs a separation instruction to the demultiplexer A 62. Upon reception of the separation instruction from the comparator A 63, the demultiplexer A 62 outputs the input notification packet to the packet processing unit I 3. In the packet processing unit I 3, the header portion of the packet is removed to extract the data portion, and the data portion is output to a connection management unit 2. In the connection management unit, predetermined processing is performed based on the received data.

When a notification packet for transmitting internode management information and the like is to be sent from the packet processing unit I 3 of the node device I 81 to a packet processing unit I 3 in a non-adjacent, remote node device, a value indicating the number of node devices including the own node device and node devices to be hopped may be designated in a section 97 for indication of the number of relayings. In this case, a decoder in a node device to be hopped designates a memory area in accordance with case (2)-1 above.

(Ninth Embodiment)

Figure 24B:
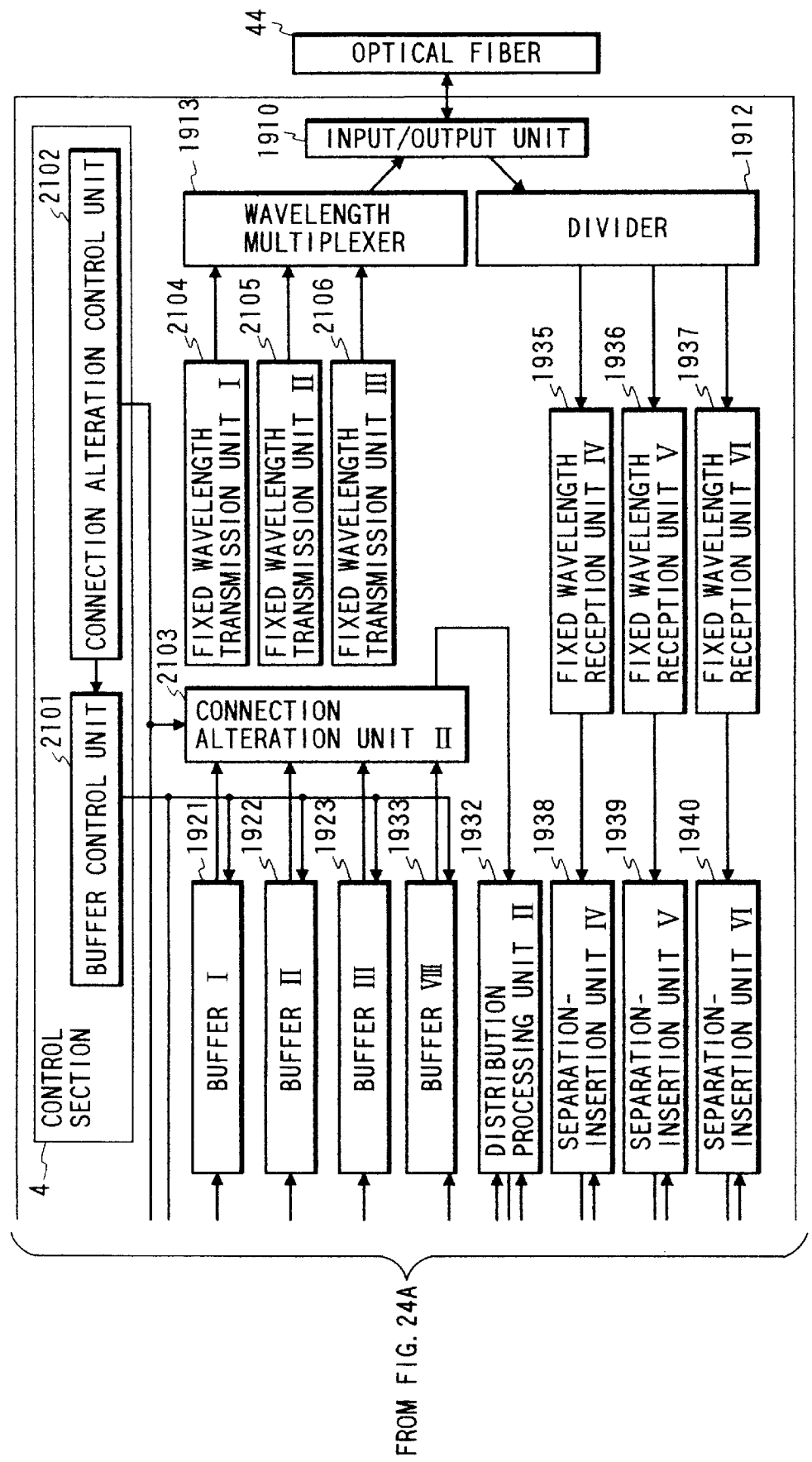
FIG. 24 which comprised of FIGS. 24A and 24B is a block diagram showing the arrangement of a node device according to the ninth embodiment of the present invention.

FIGS. 24A and 24B show the ninth embodiments of a node device according to the present invention, in which loopback processing can be performed.

In FIGS. 24A and 24B, blocks denoted by the same reference numerals as in FIGS. 21A and 21B have the same functions as those in FIGS. 21A and 21B.

In FIGS. 24A and 24B, in a connection alteration unit II, input terminals I to IV of are respectively connected to buffers I, II, III, and VIII, output terminals I to III are respectively connected to fixed wavelength transmission units I to III, and an output terminal IV is connected to a distribution processing unit II. In a connection alteration unit I, input terminals I to IV are respectively connected to buffers IV, V, VI, and VII, output terminals I to III are respectively connected to fixed wavelength transmission units IV, V, VI, and VII, and an output terminal IV is connected to a distribution processing unit I. The output from the distribution processing unit II is connected to the buffer VII, and the output from the distribution processing unit I is connected to the buffer VIII.

In this embodiment, a packet which requires loopback transmission processing and is output from the buffer I, II, III, or VIII is loopback-transmitted to the distribution processing unit II via the connection alteration unit II. Likewise, a packet which requires loopback transmission processing and is output from the buffer IV, V, VI, or VII is loopback-transmitted to the distribution processing unit I via the connection alteration unit I.

In the ninth embodiment of the present invention as well, the arrangement of each buffer is substantially the same as that shown in FIG. 7, except that the decoding operation of a decoder 132 is set as follows.

The memory area to be designated by the decoder 132 in each buffer is set as follows in this embodiment.

When the value in a section 98 for designation of the wavelength in use in a packet does not correspond to a channel (transmission wavelength) to which the own buffer can be connected, the decoder designates a memory area corresponding to a channel, which is connected to the distribution processing unit, of those that can be selected by the connection alteration unit.

(3)-1 When the value in a section 98 for designation of the wavelength in use in a packet corresponds to a channel, which is connected to the distribution processing unit, of those that can be selected by the connection alteration unit to which the own buffer outputs a packet, and the value in a section 97 for indication of the number of relayings in this packet is not "1", the decoder 132 designates a memory area corresponding to any one of arbitrary channels (wavelengths) other than the channel to which the distribution processing unit is connected.

(3)-2 In a case other than the above-mentioned cases, the decoder 132 designates a memory area corresponding to a channel (wavelength) described in a section 98 for designation of the wavelength in use in a packet.

A case will be explained below wherein an inquiry packet is to be transmitted from a terminal equipment I 53 connected to a node device I 81 via a sub transmission path I 45 to a packet processing unit I 3 in the node device I 81 (the value in a section 99 for identification of the kind of packet in the inquiry packet is "0").

The inquiry packet transmitted from the terminal equipment I 53 is output from a distribution processing unit II 1932 to the packet processing unit I 3 via a buffer I 1921 and a connection alteration unit II 2103.

The same applies to a case wherein an inquiry packet is to be transmitted from each of terminal equipments 54, 55, and 59 to the packet processing unit I 3 in the node device I 81. When an inquiry packet is to be transmitted from one of terminal equipments 56 to 58 and 60 to the packet processing unit I 3 in the node device I 81, the inquiry packet is output from a distribution processing unit I 1928 to the packet processing unit I 3 via a buffer IV 1943, V 1942, VI 1941, or VII 1929 and a connection alteration unit I 2108.

A case will be explained below wherein a response packet is sent back from the packet processing unit I 3 in the node device I 81 to the terminal equipment I 53 connected to the node device I 81 via the sub transmission path I 45 (the value in a section 99 for identification of the kind of packet in the response packet is "1"). The packet processing unit I 3 in the node device I 81 outputs the response packet to the distribution processing unit I 1932. The response packet output to the distribution processing unit II 1932 is temporarily stored in the buffer VII 1929, and thereafter, is transmitted to a node device IV 84 using a wavelength λ4. The response packet is received by a fixed wavelength reception unit IV 1935 in the node device IV 84, and is output to a distribution processing unit I 1928 via a buffer IV 1941 and a connection alteration unit I 2108. Thus, the transmission direction is reversed, and the response packet is output from a buffer VIII 1933 to a fixed wavelength transmission unit I 2104 that outputs an optical signal of the wavelength λ1 which can be received by the terminal equipment I 53. Thereafter, the response packet is transmitted from the fixed wavelength transmission unit I 2104 to the node device I 81 as an optical signal of the wavelength λ1, and is received by a fixed wavelength reception unit I 1915. The response packet is separated by a separation-insertion unit I 1918, and is transmitted to the terminal equipment I 53. The same applies to a case wherein the packet processing unit I 3 in the node device I 81 transmits a response packet to the terminal equipments 54 and 55 in the node device I 81.

When the packet processing unit I 3 in the node device I 81 transmits a response packet to one of the terminal equipments 56 to 58 in the node device I 81, it outputs the response packet to the distribution processing unit I 1928. The response packet output to the distribution processing unit I 1928 is temporarily stored in a buffer VIII, and is then transmitted to a node device II 82 using, e.g., a wavelength λ1. The response packet is received by a fixed wavelength reception unit I 1915 in the node device II 82, and its transmission direction is reversed by a connection alteration unit II 2103. Thereafter, the response packet is transmitted from a corresponding one of fixed wavelength transmission units IV 2110, V 2111, and VI 2112 to the node device I 81 as an optical signal of a wavelength which can be received by a corresponding one of the terminal equipments 56 to 58, and is received by a corresponding one of fixed wavelength reception units 1935 to 1937. Then, the response packet is separated by a corresponding one of separation-insertion units 1938 to 1940, and is transmitted to a corresponding one of the terminal equipments 56 to 58.

When the packet processing unit I 3 in the node device I 81 transmits a response packet to the terminal equipment III 59 in this node device, it outputs the response packet to the distribution processing unit II 1932. The response packet output to the distribution processing unit II 1932 is temporarily stored in the buffer VII 1929, and is output to the distribution processing unit I 1928 via the connection alteration unit I 2108. Thereafter, the response packet is separated to the terminal equipment 59.

Similarly, when the packet processing unit I 3 in the node device I 81 transmits a response packet to the terminal equipment 60 of this node device, it outputs the response packet to the distribution processing unit I 1928. The response packet output to the distribution processing unit 1928 is temporarily stored in the buffer VIII 1933, and is output to the distribution processing unit II 1932 via the connection alteration unit II 2103. Thereafter, the response packet is separated to the terminal equipment 60.

A case will be described below wherein a notification packet for transmitting internode management information or the like is to be transmitted from the packet processing unit I 3 in the node device I 81 to a packet processing unit I 3 in the node device II 82 (the value in a section 99 for identification of the kind of packet in the notification packet is "0"). The packet processing unit I 3 in the node device I 81 outputs a notification packet to the distribution processing unit I 1928. The notification packet output to the distribution processing unit I 1928 is temporarily stored in the buffer VIII 1933, and is then transmitted to the node device II 82 using a wavelength (e.g., a wavelength λ1) other than the loopback transmission wavelength λ8. After the notification packet is received by the fixed wavelength reception unit I 1915 in the node device II 82, the notification packet is loopback-transmitted to the distribution processing unit II 1932 via the connection alteration unit II 2103, and is then output to the packet processing unit I 3.

When a notification packet for transmitting internode management information and the like is to be sent from the packet processing unit I 3 of the node device I 81 to a packet processing unit I 3 in a non-adjacent, remote node device, a value indicating the number of node devices including the own node device and node devices to be hopped may be designated in a section 97 for indication of the number of relayings. In this case, a decoder in a node device to be hopped designates a memory area in accordance with case (3)-1 above, as in the eighth embodiment.

As described above, according to the present invention, since a packet to be output to a packet processing unit is output using a specific channel, and the channel is connected to the packet processing unit, a specific packet can be delivered to the packet processing unit with a simple arrangement and easy processing. As has been described in various modes of the above embodiments, an arrangement for temporarily transmitting a specific packet via another node device and changing a specific channel to another specific channel in the other node device, or transmitting a packet to another node device using an arbitrary channel and changing the channel to a specific channel in the other node device, an arrangement for connecting the specific channel to the packet processing unit side in the own node device without outputting a packet onto the transmission path, and the like are available. As the specific channel, in a bidirectional transmission type network, a channel for changing the transmission direction from the first direction to the second direction (i.e., a channel for outputting a packet from a buffer that stores a packet transmitted in the first direction to a buffer that can output the packet in the second direction), or vice versa may be used.

Note that the channel indicates an output route selected by a selection means (e.g., a variable wavelength transmission unit or connection alteration unit) for selecting the output destination from a buffer, and a plurality of channels must be distinguished from each other. As the method of distinguishing a plurality of channels, various methods are available. For example, the channels may be distributed using different positions (e.g., in different transmission paths or different signal routes). Also, the channels may be distinguished from each other by two light transmission directions of a single wavelength. Also a signal route guided toward the packet processing unit side in a node device is one of channels.

As described above, in the arrangement of the present invention, basically, both a management packet and a data packet can be similarly processed via a buffer and a selection means for selecting a channel to which the buffer is connected, and a simple arrangement and easy, high-speed relaying processing can be realized.

What is claimed is:

1. A network system which is constituted by a plurality of node devices and a transmission path for connecting the node devices, and performs a communication using a packet, comprising:
  a transmission path for connecting the node devices; and
  a node device including:
    packet processing means for processing a packet applied to an input of said racket processing means;
    a buffer having an input coupled to an output of said packet processing means, said buffer for temporarily storing the packet;
    selection means for selecting a channel, to which an output of said buffer is connected, from a plurality of different channels; and
    buffer control means having an output coupled to said buffer, said buffer control means for controlling said buffer to read out from said buffer a packet using the selected channel,
    wherein the plurality of channels include a first channel connected to another node device via said transmission path, and a second channel connected to said packet processing means in the node device, and wherein a packet to be output to said packet processing means in the node device is read out from said buffer when said buffer is connected to the second channel.

2. A system according to claim 1, wherein the second channel is input to another node device via said transmission path, is looped back by said other node device, is input to the node device, and is connected to said packet processing means.

3. A system according to claim 1, wherein said selection means sequentially changes the channel to be selected.

4. A system according to claim 1, wherein said node device comprises a plurality of buffers equivalent to said buffer, and said selection means selects the channels to which said plurality of buffers are connected so that said plurality of buffers are simultaneously connected to different channels.

5. A system according to claim 4, wherein said selection means comprises a plurality of variable channel transmission means arranged in correspondence with said plurality of buffers.

6. A system according to claim 5, wherein said node device comprises means for multiplexing outputs from said plurality of variable channel transmission means and extracting an output corresponding to the second channel from the multiplexed output.

7. A system according to claim 4, wherein said selection means comprises connection alteration means which has input terminals respectively corresponding to said plurality of buffers and output terminals respectively corresponding to the plurality of channels, and can change a connection relationship between the input and output terminals.

8. A system according to claim 1, wherein said buffer receives a packet transmitted from a sub transmission path connected to the node device, a packet transmitted from another node device, or a packet transmitted from said packet processing means.

9. A system according to claim 1, wherein said node device comprises insertion means for selecting one of a packet transmitted from a sub transmission path connected to the node device and a packet transmitted from another node device, and for inputting the selected packet to said buffer.

10. A system according to claim 1, wherein said node device comprises insertion means for selecting one of a packet transmitted from a sub transmission path connected to the node device, a packet transmitted from another node device, and a packet transmitted from said packet processing means, and for inputting the selected packet to said buffer.

11. A system according to claim 1, wherein said node device comprises separation means for separating to a sub transmission path side a packet to be output onto a sub transmission path connected to the node device from packets input from another node device.

12. A system according to claim 1, wherein said node device comprises separation means for separating to a sub transmission path side a packet to be output onto a sub transmission path connected to the node device from packets transmitted using the second channel.

13. A system according to claim 1, wherein said transmission path transmits a packet in a first direction, and a second direction opposite to the first direction, and
  said node device comprises at least two buffers equivalent to said buffer, one of said buffers is a first buffer with which the first channel connected is connected to another node device at a downstream side in the first direction, and the other buffer is a second buffer with which the first channel connected is connected to another node device at a downstream side in the second direction, and further comprises, as said selection means, first selection means corresponding to said first buffer and second selection means corresponding to said second buffer.

14. A system according to claim 13, wherein said node device further comprises third and fourth buffers, said third buffer temporarily stores a packet to be output to another node device of packets output from said first buffer using the second channel, a channel to which said third buffer is connected is selected by said second selection means, said second selection means selects channels to which said second and third buffers are connected, so that said second and third buffers are simultaneously connected to different channels, said fourth buffer temporarily stores a packet to be output to another node device of packets output from said second buffer using the second channel, a channel to which said fourth buffer is connected is selected by said first selection means, and said first selection means selects channels to which said first and fourth buffers are connected, so that said first and fourth buffers are simultaneously connected to different channels.

15. A system according to claim 13, wherein said node device comprises a plurality of first buffers equivalent to said first buffer, and a plurality of second buffers equivalent to said second buffer.

16. A system according to claim 15, wherein said first selection means selects channels to which said plurality of first buffers are connected so that said plurality of first buffers are simultaneously connected to different channels, and said second selection means selects channels to which said plurality of second buffers are connected so that said plurality of second buffers are simultaneously connected to different channels.

17. A system according to claim 1, wherein said packet processing means performs processing of a management packet for communication management.

18. A system according to claim 1, wherein the plurality of node devices are connected in a ring pattern via said transmission path.

19. A network system which is constituted by a plurality of node devices and a transmission path for connecting the node devices, and performs a communication using a packet, comprising:

a transmission path for connecting the node devices;

a first node device including:
  a buffer for temporarily storing the packet in response to the packet being applied to an input of said buffer;
  selection means for selecting a channel to which an output of said buffer is connected from a plurality of different channels; and
  buffer control means having an output coupled to said buffer, said buffer control means for controlling said buffer to read out from said buffer a packet using the selected channel; and a second node device including:
  packet processing means for processing a packet,
  wherein the plurality of channels include a first channel connected to said second node device via said transmission path, the first channel further being connected to a sub transmission path connected to one of said second node device and another node device via said second node device, the plurality of channels further including a second channel connected via said transmission path to said packet processing means in said second node device, and wherein a packet to be output to said packet processing means in said second node device is read out from said buffer when said buffer is connected to the second channel.

20. A system according to claim 19, wherein said selection means sequentially changes the channel to be selected.

21. A system according to claim 19, wherein said first node device comprises a plurality of buffers equivalent to said buffer, and said selection means selects channels to which said plurality of buffers are connected so that said plurality of buffers are simultaneously connected to different channels.

22. A system according to claim 21, wherein said selection means comprises a plurality of variable channel transmission means arranged in correspondence with said plurality of buffers.

23. A system according to claim 19, wherein said second node device comprises means for extracting the second channel from the plurality of channels transmitted from said first node device via said transmission path.

24. A system according to claim 21, wherein said selection means comprises connection alteration means which has input terminals respectively corresponding to said plurality of buffers and output terminals respectively corresponding to the plurality of channels, and can change a connection relationship between the input and output terminals.

25. A system according to claim 19, wherein said buffer receives one of a packet transmitted from a sub transmission path connected to said first node device, a packet transmitted from another node device, and a packet transmitted from said packet processing means.

26. A system according to claim 19, wherein said first node device comprises insertion means for selecting one of a packet transmitted from a sub transmission path connected to said first node device and a packet transmitted from another node device, and inputting the selected packet to said buffer.

27. A system according to claim 19, wherein said first node device further comprises packet processing means, and insertion means for selecting one of a packet transmitted from a sub transmission path connected to said first node device, a packet transmitted from another node device, and a packet transmitted from said packet processing means of said first node device, and inputting the selected packet to said buffer.

28. A system according to claim 19, wherein said first node device comprises separation means for separating a packet to be output onto a sub transmission path connected to said first node device from packets input from another node device as a separated packet and for outputting the separated packet to the sub transmission path.

29. A system according to claim 19, wherein said second node device comprises separation means for separating a packet to be output onto a sub transmission path connected to said second node device from packets input from another node device as a separated packet and for outputting the separated packet to the sub transmission path.

30. A system according to claim 19, wherein said transmission path transmits a packet in a first direction, and a second direction opposite to the first direction, and said first node device comprises at least two buffers equivalent to said buffer, one of said buffers is a first buffer with which the first channel connected is connected to said second node device at a downstream side in the first direction, and the other buffer is a second buffer with which the first channel connected is connected to said second node device at a downstream side in the second direction, and further comprises, as said selection means, first selection means corresponding to said first buffer and second. selection means corresponding to said second buffer.

31. A system according to claim 30, wherein said first node device further comprises third and fourth buffers, said third buffer temporarily stores a packet to be output to another node device of packets output from said first buffer using the second channel, a channel to which said third buffer is connected is selected by said second selection means, said second selection means selects channels to which said second and third buffers are connected, so that said second and third buffers are simultaneously connected to different channels, said fourth buffer temporarily stores a packet to be output to another node device of packets output from said second buffer using the second channel, a channel to which said fourth buffer is connected is selected by said first selection means, and said first selection means selects channels to which said first and fourth buffers are connected, so that said first and fourth buffers are simultaneously connected to different channels.

32. A system according to claim 30, wherein said first node device comprises a plurality of first buffers equivalent to said first buffer, and a plurality of second buffers equivalent to said second buffer.

33. A system according to claim 32, wherein said first selection means selects channels to which said plurality of first buffers are connected so that said plurality of first buffers are simultaneously connected to different channels, and said second selection means selects channels to which said plurality of second buffers are connected so that said plurality of second buffers are simultaneously connected to different channels.

34. A system according to claim 19, wherein said packet processing means performs processing of a management packet for communication management.

35. A system according to claim 19, wherein the plurality of node devices including said first and second node devices are connected in a ring pattern via said transmission path.

36. A communication method in a network system which is constituted by a plurality of node devices and a transmission path for connecting the node devices, and performs a communication using a packet, comprising:

a transmission path for connecting the node devices; and a node device including:

packet processing means for processing a packet applied to an input of said packet processing means;

a buffer having an input coupled to an output of said packet processing means, said buffer for temporarily storing the packet;

selection means for selecting a channel to which an output of said buffer is connected, from a plurality of different channels; and buffer control means having an output coupled to said buffer, said buffer control means for controlling said buffer to read out from said buffer a packet using the selected channel, said method comprising the steps of:

selecting a second channel by said selection means, the plurality of channels including a first channel connected to another node device via said transmission path, and the second channel connected to said packet processing means in the node device; and controlling said buffer by said buffer control means to read out a packet to be output to said packet processing means in the node device and stored in said buffer while said selection means selects the second channel.

37. A method according to claim 36, wherein said selection means sequentially changes the channel to be selected.

38. A method according to claim 36, wherein said node device comprises a plurality of buffers equivalent to said buffer, and said selection means selects the channels to which said plurality of buffers are connected so that said plurality of buffers are simultaneously connected to different channels.

39. A method according to claim 36, wherein said packet processing means performs processing of a management packet for communication management.

40. A method according to claim 39, wherein a terminal equipment is connected to said node device via a sub transmission path, and the management packet includes a packet used by said terminal equipment for inquiring of address information of another terminal equipment, or a packet for responding to the inquiry packet.

41. A method according to claim 39, wherein the management packet is a packet for managing a connection between the node devices.

42. A method according to claim 36, wherein the packet has relaying number information indicating the number of times the packet is relayed via said selection means in one or a plurality of node devices until the packet reaches a destination, and a channel to which said buffer is connected while the packet is read out is determined with reference to the relaying number information.

43. A method according to claim 36, wherein the packet has channel designation information indicating a channel to which a destination of the packet is connected, and a channel to which said buffer is connected while the packet is read out is determined with reference to the channel designation information.

44. A method according to claim 36, wherein the packet has packet kind information indicating whether said packet processing unit is an intended destination of the packet.

45. A method according to claim 42, wherein said node device processes the relaying number information of a packet to be output so that the number of times the packet is relayed via said selection means can be discriminated later based on the relaying number information.

46. A method according to claim 42, wherein the packet has channel designation information indicating a channel to which a destination of the packet is connected, and a packet in which the relaying number information indicates that the packet is to be relayed via said selection means once more is read out from said buffer while said buffer is connected to a channel indicated by the channel designation information of the packet.

47. A method according to claim 42, wherein a packet in which the relaying number information indicates that the packet is to be relayed via said selection means at least twice more is read out from said buffer while said buffer is connected to a channel other than the second channel.

48. A method according to claim 42, wherein the packet has packet kind information indicating whether said packet processing unit is an intended destination of the packet, and a packet in which the relaying number information indicates that the packet is to be relayed via said selection means once more, and the packet kind information indicates that the intended destination of the packet is said packet processing unit, is read out from said buffer while said buffer is connected to the second channel.

49. A communication method in a network system which is constituted by a plurality of node devices and a transmission path for connecting the node devices, and performs a communication using a packet, comprising:

a transmission path for connecting the node devices;
a first node device including:
a buffer for temporarily storing the packet in response to the Packet being applied to an input of said buffer;
selection means for selecting a channel to which an output of said buffer is connected, from a plurality of different channels; and
buffer control means having an output coupled to said buffer, said buffer control means for controlling said buffer to read out from said buffer a packet using the selected channel; and
a second node device including:
packet processing means for processing a packet,
said method comprising the steps of:
selecting a second channel by said selection means, the plurality of channels including a first channel connected to said second node device via said transmission path, the first channel further being connected to a sub transmission path connected to one of said second node device and another node device via said second node device, the plurality of channels further including the second channel connected via said transmission path to said packet processing means in said second node device; and
reading out a packet to be output to said packet processing means in said second node device and stored in said buffer while said selection means selects the second channel.

50. A method according to claim 49, wherein said selection means sequentially changes the channel to be selected.

51. A method according to claim 49, wherein said first node device comprises a plurality of buffers equivalent to said buffer, and said selection means selects the channels to which said plurality of buffers are connected so that said plurality of buffers are simultaneously connected to different channels.

52. A method according to claim 49, wherein said packet processing means performs processing of a management packet for communication management.

53. A method according to claim 52, wherein a terminal equipment is connected to said first node device via a sub transmission path, and the management packet includes a packet used by said terminal equipment for inquiring of another terminal equipment as to address information, or a packet for responding to the inquiry packet.

54. A method according to claim 52, wherein the management packet is a packet for managing a connection between the node devices.

55. A method according to claim 49, wherein the packet has relaying number information indicating the number of times the packet is relayed via said selection means in one or a plurality of node devices until the packet reaches a destination, and
a channel to which said buffer is connected while the packet is read out is determined with reference to the relaying number information.

56. A method according to claim 49, wherein the packet has channel designation information indicating a channel to which a destination of the packet is connected, and
a channel to which said buffer is connected while the packet is read out is determined with reference to the channel designation information.

57. A method according to claim 49, wherein the packet has packet kind information indicating whether said packet processing unit is an intended destination of the packet.

58. A method according to claim 55, wherein said first node device processes the relaying number information of a packet to be output so that the number of times the packet is relayed via said selection means can be discriminated later based on the relaying number information.

59. A method according to claim 55, wherein the packet-has channel designation information indicating a channel to which a destination of the packet is connected, and
a packet in which the relaying number information indicates that the packet is to be relayed via said selection means once more is read out from said buffer while said buffer is connected to a channel indicated by the channel designation information of the packet.

60. A method according to claim 55, wherein a packet in which the relaying number information indicates that the packet is to be relayed via said selection means at least twice more is read out from said buffer while said buffer is connected to a channel other than the second channel.

61. A method according to claim 55, wherein the packet has packet kind information indicating whether said packet processing unit is an intended destination of the packet, and
a packet in which the relaying number information indicates that the packet is to be relayed via said selection means once more, and the packet kind information indicates that the intended destination of the packet is said packet processing unit, is read out from said buffer while said buffer is connected to the second channel.

62. A node device for communicating through a transmission path, including:
packet processing means for processing a packet applied to an input of said packet processing means;
a buffer having an input coupled to an output of said packet processing means, said buffer for temporarily storing the packet;
selection means for selecting a channel, to which an output of said buffer is connected, from a plurality of different channels; and
buffer control means having an output coupled to said buffer, said buffer control means for controlling said buffer for reading out a packet using the selected channel,
wherein the plurality of channels include a first channel connected to another node device via said transmission path, and a second channel connected to said packet processing means in the node device, and wherein a packet to be output to said packet processing means in the node device is read out from said buffer when said buffer is connected to the second channel.

63. A node device according to claim 62, wherein the second channel is input to another node device via said transmission path, is looped back by said other node device, is input to the node device, and is connected to said packet processing means.

64. A node device according to claim 62, wherein said selection means sequentially changes the channel to be selected.

65. A node device according to claim 62, wherein said node device comprises a plurality of buffers equivalent to said buffer, and said selection means selects the channels to which said plurality of buffers are connected so that said plurality of buffers are simultaneously connected to different channels.

66. A node device according to claim 65 wherein said selection means comprises a plurality of variable channel transmission means arranged in correspondence with said plurality of buffers.

67. A node device according to claim 66, wherein said node device comprises means for multiplexing outputs from said plurality of variable channel transmission means and extracting an output corresponding to the second channel from the multiplexed output.

68. A node device according to claim 65, wherein said selection means comprises connection alteration means which has input terminals respectively corresponding to said plurality of buffers and output terminals respectively corresponding to the plurality of channels, and can change a connection relationship between the input and output terminals.

69. A node device according to claim 62, wherein said buffer receives a packet transmitted from a sub transmission path connected to the node device, a packet transmitted from another node device, or a packet transmitted from said packet processing means.

70. A node device according to claim 62, wherein said node device comprises insertion means for selecting one of a packet transmitted from a sub transmission path connected to the node device and a packet transmitted from another node device, and for inputting the selected packet to said buffer.

71. A node device according to claim 62, wherein said node device comprises insertion means for selecting one of a packet transmitted from a sub transmission path connected to the node device, a packet transmitted from another node device, and a packet transmitted from said packet processing means, and for inputting the selected packet to said buffer.

72. A node device according to claim 62, wherein said node device comprises separation means for separating a packet to be output onto a sub transmission path connected to the node device from packets input from another node device as a separated packet and for outputting the separated packet to the sub transmission path.

73. A node device according to claim 62, wherein said node device comprises separation means for separating a packet to be output onto a sub transmission path connected to the node device from packets transmitted using the second channel as a separated packet and for outputting the separated packet to the sub transmission path.

74. A node device according to claim 62, wherein said transmission path transmits a packet in a first direction, and a second direction opposite to the first direction, and said node device comprises at least two buffers equivalent to said buffer, one of said buffers is a first buffer with which the first channel connected is connected to another node device at a downstream side in the first direction, and the other buffer is a second buffer with which the first channel connected is connected to another node device at a downstream side in the second direction, and further comprises, as said selection means, first selection means corresponding to said first buffer and second selection means corresponding to said second buffer.

75. A node device according to claim 74, wherein said node device further comprises third and fourth buffers, said third buffer temporarily stores a packet output from said first buffer using the second channel, a channel to which said third buffer is connected is selected by said second selection means, said second selection means selects channels to which said second and third buffers are simultaneously connected to different channels, said fourth buffer temporarily stores a packet to be output to another node device of packets output from said second buffer using the second channel, a channel to which said fourth buffer is connected is selected by said first selection means, and said first selection means selects channels to which said first and fourth buffers are connected, so that said first and fourth buffers are simultaneously connected to different channels.

76. A node device according to claim 74, wherein said node device comprises a plurality of first buffers equivalent to said first buffer, and a plurality of second buffers equivalent to said second buffer.

77. A node device according to claim 76, wherein said first selection means selects channels to which said plurality of first buffers are connected so that said plurality of first buffers are simultaneously connected to different channels, and said second selection means selects channels to which said plurality of second buffers are connected so that said plurality of second buffers are simultaneously connected to different channels.

78. A node device according to claim 62, wherein said packet processing means performs processing of a management packet for communication management.

79. A node device according to claim 62, wherein the plurality of node devices are connected in a ring pattern via said transmission path.

80. A communication method using a node device for communicating through a transmission path, said node device including:

packet processing means for processing a packet applied to an input of the packet processing means;

a buffer having an input coupled to an output of said packet processing means, said buffer for temporarily storing the packet;

selection means for selecting a channel, to which an output of said buffer is connected, from a plurality of different channels; and buffer control means having an output coupled to said buffer, said buffer control means for controlling said buffer for reading out from said buffer a packet using the selected channel, said method comprising the steps of:

selecting a second channel by said selection means, the plurality of channels including a first channel connected to another node device via said transmission path, and the second channel connected to said packet processing means in the node device; and controlling said buffer by said buffer control means to read out a packet to be output to said packet processing means in the node device and stored in said buffer while said selection means selects the second channel.

81. A method according to claim 80, wherein the second channel is connected to said packet processing means in the node device.

82. A method according to claim 80, wherein the second channel is input to another node device via said transmission path, is looped back by said other node device, is input to the node device, and is connected to said packet processing means.

83. A method according to claim 81, wherein said selection means sequentially changes the channel to be selected.

84. A method according to claim 80, wherein said node device comprises a plurality of buffers equivalent to said buffer, and said selection means selects channels to which said plurality of buffers are connected so that said plurality of buffers are simultaneously connected to different channels.

85. A method according to claim 84, wherein said selection means comprises a plurality of variable channel transmission means arranged in correspondence with said plurality of buffers.

86. A method according to claim 85, wherein said node device comprises means for multiplexing outputs from said plurality of variable channel transmission means and extracting an output corresponding to the second channel from the multiplexed output.

87. A method according to claim 85, wherein said selection means comprises connection alteration means which has input terminals respectively corresponding to said plurality of buffers and output terminals respectively corresponding to the plurality of channels, and can change a connection relationship between the input and output terminals.

88. A method according to claim 80, wherein said buffer receives a packet transmitted from a sub transmission path connected to the node device, a packet transmitted from another node device, or a packet transmitted from said packet processing means.

89. A method according to claim 80, wherein said node device comprises insertion means for selecting one of a packet transmitted from a sub transmission path connected to the node device and a packet transmitted from another node device, and for inputting the selected packet to said buffer.

90. A method according to claim 81, wherein said node device comprises insertion means for selecting one of a packet transmitted from a sub transmission path connected to the node device, a packet transmitted from another node device, and a packet transmitted from said packet processing means, and for inputting the selected packet to said buffer.

91. A method according to claim 80, wherein said node device comprises separation means for separating a packet to be output onto a sub transmission path connected to the node device from packets input from another node device as a separated packet and for outputting the separated packet to the sub transmission path.

92. A method according to claim 80, wherein said node device comprises separation means for separating a packet to be output onto a sub transmission path connected to the node device from packets transmitted using the second channel as a separated packet and for outputting the separated packet to the sub transmission path.

93. A method according to claim 80, wherein said transmission path transmits a packet in a first direction, and a second direction opposite to the first direction, and said node device comprises at least two buffers equivalent to said buffer, one of said buffers is a first buffer with which the first channel connected is connected to another node device at a downstream side in the first direction, and the other buffer is a second buffer with which the first channel connected is connected to another node device at a downstream side in the second direction, and further comprises, as said selection means, first selection means corresponding to said first buffer and second selection means corresponding to said second buffer.

94. A method according to claim 93, wherein said node device further comprises third and fourth buffers, said third buffer temporarily stores a packet output from said first buffer using the second channel, a channel to which said third buffer is connected is selected by said second selection means, said second selection means selects channels to which said second and third buffers are simultaneously connected to different channels, said fourth buffer temporarily stores a packet to be output to another node device of packets output from said second buffer using the second channel, a channel to which said fourth buffer is connected is selected by said first selection means, and said first selection means selects channels to which said first and fourth buffers are connected, so that said first and fourth buffers are simultaneously connected to different channels.

95. A method according to claim 93, wherein said node device comprises a plurality of first buffers equivalent to said first buffer, and a plurality of second buffers equivalent to said second buffer.

96. A method according to claim 95, wherein said first selection means selects channels to which said plurality of first buffers are connected so that said plurality of first buffers are simultaneously connected to different channels, and said second selection means selects channels to which said plurality of second buffers are connected so that said plurality of second buffers are simultaneously connected to different channels.

97. A method according to claim 80, wherein said packet processing means performs processing of a management packet for communication management.

98. A method according to claim 80, wherein the plurality of node devices are connected in a ring pattern via said transmission path.

\* \* \* \* \*

UNITED STATES PATENT AND TRADEMARK OFFICE
CERTIFICATE OF CORRECTION

PATENT NO. : 6,005,862
DATED : December 21, 1999
INVENTOR(S) : MITSURU YAMAMOTO

It is certified that error appears in the above-identified patent and that said Letters Patent is hereby corrected as shown below:

COLUMN 14

Line 9, "comprised of" should read --comprises--;
    Line 19, "comprised of" should read --comprises--;
    Line 22, "comprised of" should read --comprises--;
    Line 29, "comprised of" should read --comprises--;
    Line 42, "comprised of" should read --comprises--;
    Line 45, "comprised of" should read --comprises--;
    Line 49, "comprised of" should read --comprises--;
    Line 53, "comprised of" should read --comprises--; and
    Line 65, "comprised of" should read --comprises--.

COLUMN 41

Line 63, "In" should read --¶ In--.

COLUMN 71

Line 57, "racket" should read --packet--.

COLUMN 75

Line 5, "second." should read --second--.

COLUMN 77

Line 6, "Packet" should read --packet--.

UNITED STATES PATENT AND TRADEMARK OFFICE
CERTIFICATE OF CORRECTION

PATENT NO. : 6,005,862
DATED : December 21, 1999
INVENTOR(S) : MITSURU YAMAMOTO

It is certified that error appears in the above-identified patent and that said Letters Patent is hereby corrected as shown below:

COLUMN 80

Line 56, "claim 81," should read --claim 80,--.

COLUMN 81

Line 6, "claim 85," should read --claim 84,--.

Signed and Sealed this

Sixteenth Day of January, 2001

Attest:

Attesting Officer

Q. TODD DICKINSON
Commissioner of Patents and Trademarks